(12) United States Patent
Tsurumi

(10) Patent No.: US 9,968,845 B2
(45) Date of Patent: May 15, 2018

(54) IMAGE PROCESSING DEVICE AND IMAGE PROCESSING METHOD, AND PROGRAM

(71) Applicant: SONY CORPORATION, Tokyo (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 181 days.

(21) Appl. No.: 14/751,609

(22) Filed: Jun. 26, 2015

(65) Prior Publication Data

US 2015/0294469 A1 Oct. 15, 2015

Related U.S. Application Data

(63) Continuation of application No. 13/749,755, filed on Jan. 25, 2013, now Pat. No. 9,098,770, which is a (Continued)

(30) Foreign Application Priority Data

Sep. 18, 2007 (JP) ................................ 2007-240497

(51) Int. Cl.
*A63F 13/213* (2014.01)
*G06K 9/32* (2006.01)
(Continued)

(52) U.S. Cl.
CPC .......... *A63F 13/213* (2014.09); *A63F 13/533* (2014.09); *G06K 9/3216* (2013.01);
(Continued)

(58) Field of Classification Search
USPC ........................................ 382/100, 305, 274
See application file for complete search history.

(56) References Cited

U.S. PATENT DOCUMENTS 5,652,849 A 7/1997 Conway et al.
6,088,018 A 7/2000 DeLeeuw et al.
(Continued)

FOREIGN PATENT DOCUMENTS

EP 1645944 4/2006
EP 1672470 6/2006
(Continued)

OTHER PUBLICATIONS

European Search Report from European Patent Office dated Dec. 22, 2008 for Application No. 08252450.5-2218 (3 pgs.).
(Continued)

*Primary Examiner* — Ishrat I Sherali
(74) *Attorney, Agent, or Firm* — Paratus Law Group, PLLC

(57) ABSTRACT

An image processing device for recognizing an object corresponding to a registered image registered beforehand from an imaged image, comprising: an obtaining unit configured to obtain the imaged image; a recognizing unit configured to recognize an object corresponding to the registered image from the imaged image; and a detecting unit configured to detect, based on a registered image corresponding to an object recognized from the imaged image thereof, an area where another object is overlapped with the object corresponding to the registered image thereof.

6 Claims, 37 Drawing Sheets

Related U.S. Application Data continuation of application No. 12/209,769, filed on Sep. 12, 2008, now Pat. No. 8,379,986.

(51) Int. Cl.
*A63F 13/533* (2014.01)
*G06K 9/62* (2006.01)
*G06T 7/73* (2017.01)

(52) U.S. Cl.
CPC .......... *G06K 9/3241* (2013.01); *G06K 9/6211* (2013.01); *G06K 9/6282* (2013.01); *G06T 7/73* (2017.01); *G06T 7/74* (2017.01); *A63F 2300/1087* (2013.01); *A63F 2300/308* (2013.01); *A63F 2300/8064* (2013.01); *G06T 2200/24* (2013.01)

(56) References Cited

U.S. PATENT DOCUMENTS

| | | | |
|---|---|---|---|
| 6,160,899 A | 12/2000 | Lee et al. | |
| 6,191,773 B1 | 2/2001 | Maruno et al. | |
| 6,286,036 B1* | 9/2001 | Rhoads | G06F 17/30876 380/201 |
| 6,445,409 B1 | 9/2002 | Ito et al. | |
| 6,501,515 B1 | 12/2002 | Iwamura | |
| 6,538,675 B2 | 3/2003 | Aratani et al. | |
| 6,749,432 B2 | 6/2004 | French et al. | |
| 6,922,202 B2 | 7/2005 | Shigeta et al. | |
| 7,016,532 B2* | 3/2006 | Boncyk | G06F 17/30256 382/165 |
| 7,091,949 B2 | 8/2006 | Hansen | |
| 7,301,662 B2 | 11/2007 | Mifune | |
| 7,308,112 B2 | 12/2007 | Fujimura et al. | |
| 7,477,780 B2* | 1/2009 | Boncyk | G06F 17/30256 382/165 |
| 7,551,782 B2 | 6/2009 | Haim Lev | |
| 7,598,942 B2 | 10/2009 | Underkoffler et al. | |
| 7,886,229 B2 | 2/2011 | Pachet | |
| 7,970,173 B2 | 6/2011 | Niwa et al. | |
| 8,073,207 B2 | 12/2011 | Ayaki et al. | |
| 8,199,117 B2 | 6/2012 | Izadi et al. | |
| 8,300,102 B2 | 10/2012 | Nam et al. | |
| 8,379,986 B2* | 2/2013 | Tsurumi | G06K 9/3216 345/156 |
| 8,432,357 B2* | 4/2013 | Ogura | G06K 9/00248 345/158 |
| 9,098,770 B2* | 8/2015 | Tsurumi | G06K 9/3216 |
| 2002/0060733 A1 | 5/2002 | Takanashi | |
| 2006/0150113 A1* | 7/2006 | Natsume | G06F 3/017 715/763 |
| 2006/0187196 A1 | 8/2006 | Underkoffler et al. | |
| 2007/0262965 A1 | 11/2007 | Hirai et al. | |
| 2007/0286528 A1 | 12/2007 | Podilchuk | |
| 2008/0126937 A1 | 5/2008 | Pachet | |
| 2008/0266323 A1 | 10/2008 | Biocca et al. | |
| 2009/0027337 A1 | 1/2009 | Hildreth | |
| 2009/0033654 A1 | 2/2009 | Sikka | |
| 2009/0092336 A1 | 4/2009 | Tsurumi | |
| 2009/0185033 A1 | 7/2009 | Nozaki | |
| 2013/0209069 A1 | 8/2013 | Ise et al. | |

FOREIGN PATENT DOCUMENTS

| | | |
|---|---|---|
| JP | 11-305910 | 5/1999 |
| JP | 2000-82107 A * | 6/1999 |
| JP | 2000-306099 | 11/2000 |
| JP | 2004-246578 | 9/2004 |
| JP | 2006-171958 | 6/2006 |

OTHER PUBLICATIONS

Japanese Office Action in corresponding Japanese Patent Application 2007-240497 dated Sep. 10, 2009 (2 pages).

J. Fredman, et al., "An Algorithm for Finding Best Matches in Logarithmic Expected Time", ACM Transactions on Mathematical Software, vol. 3, No. 3, pp. 209-226 (1977).

D. Lowe, "Distinctive Image Features from Scale-Invariant Keypoints", International Journal of Computer Vision, 60 (2), pp. 91-110 (2004).

R. Hartley, et al., "Multiple View Geometry in Computer Vision", Chapter 3, pp. 69-116, Cambridge University Press (2000).

K. Mikolajczyk, et al., "Indexing based on scale invariant interest points", International Conference on Computer Vision, pp. 525-531 (2001).

T. Lindeberg, "Scale-space theory: A basic tool for analyzing structures at difference scales", Journal of Applied Statistics, vol. 21, No. 2, pp. 225-270 (1994).

D. Lowe, "Object recognition from local scale-invariant features", Proc. International Conference on Computer Vision, vol. 2, pp. 1150-1157, Sep. 20-25, Confru, Greece (1999).

J. Bouguet, "Pyramidal Implementation of the Lucas Kanade Feature Tracker Description of the algorithm", Intel Corporation, Microprocessor Research Labs (2001).

* cited by examiner

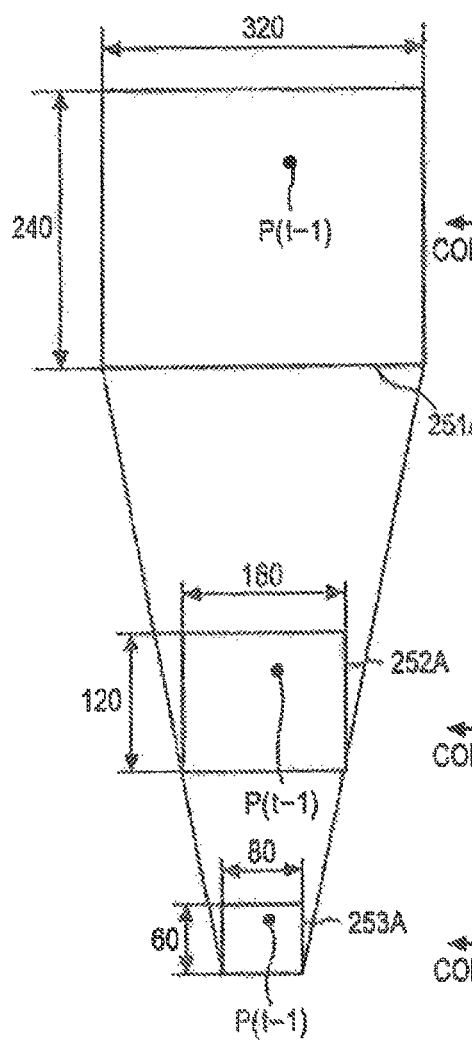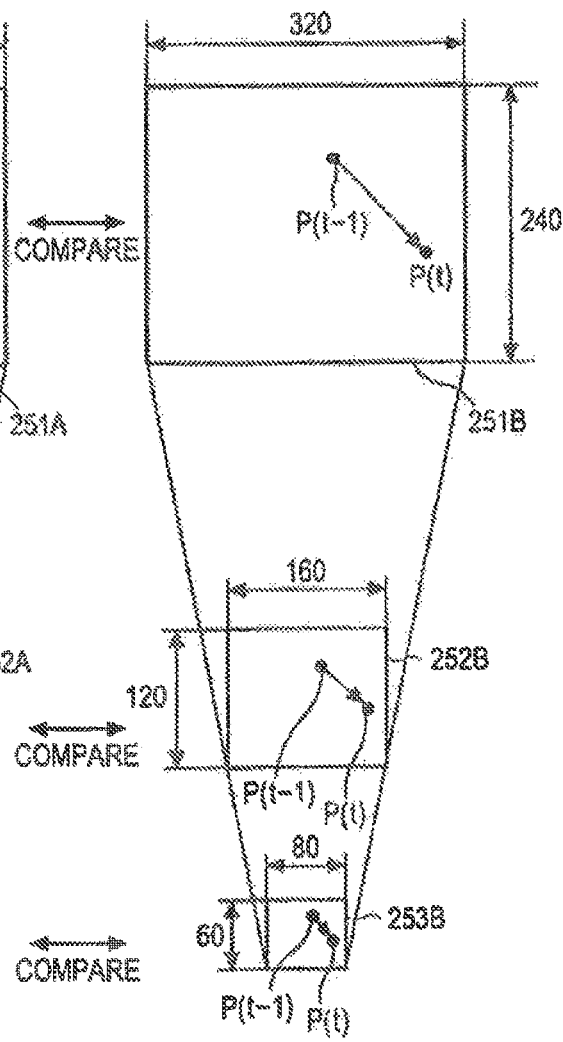

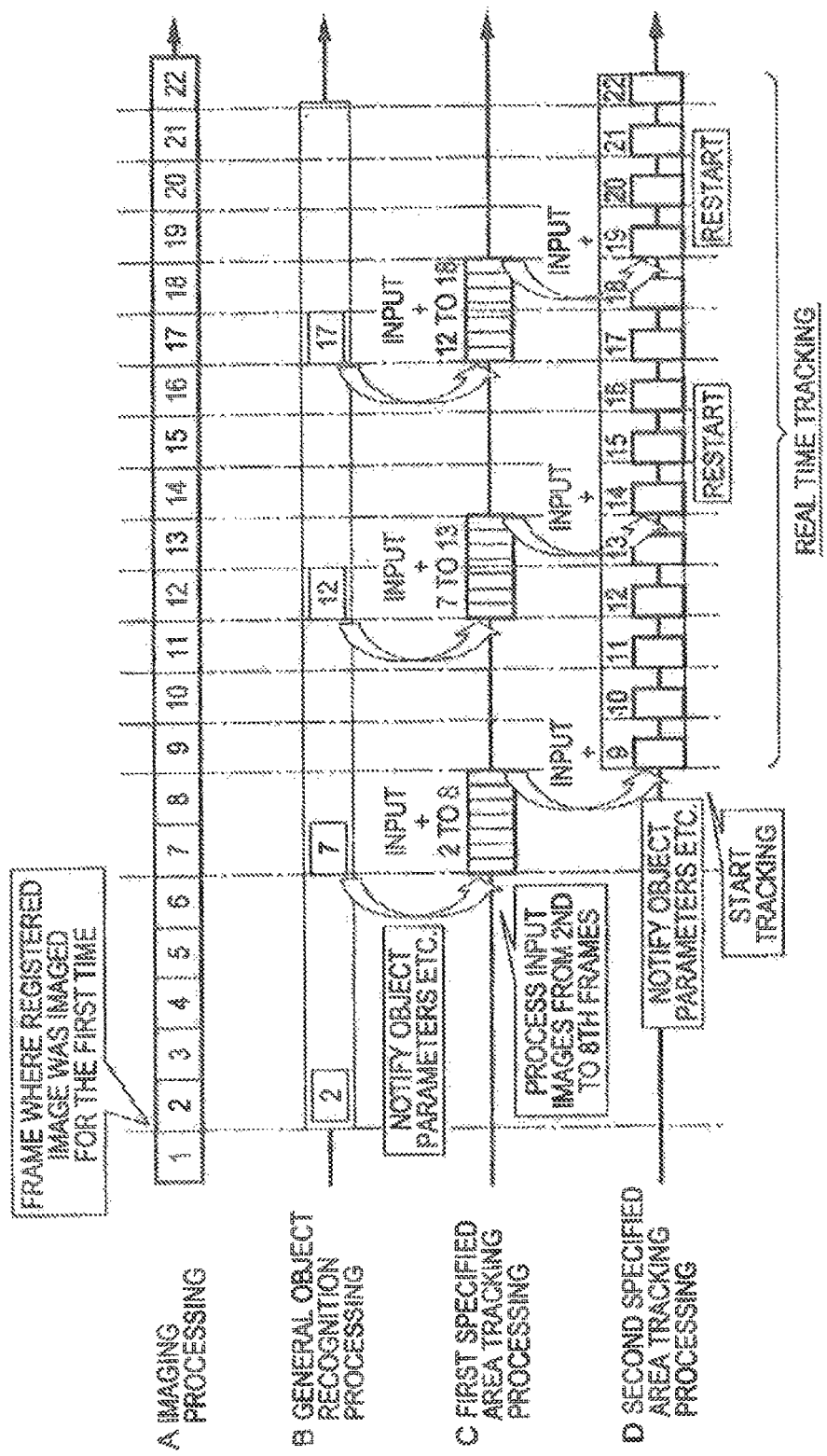

IMAGE PROCESSING DEVICE AND IMAGE PROCESSING METHOD, AND PROGRAM

CROSS REFERENCE TO PRIOR APPLICATION

This application is a continuation of U.S. patent application Ser. No. 13/749,755 (filed on Jan. 25, 2013), which is a continuation of U.S. patent application Ser. No. 12/209,769 (filed on Sep. 12, 2008), issued as U.S. Pat. No. 8,379,986 (issued on Feb. 19, 2013), which claims priority to Japanese Patent Application No. 2007-240497 (filed on Sep. 18, 2007), which are all hereby incorporated by reference in their entirety.

BACKGROUND OF THE INVENTION

1. Field of the Invention

The present invention relates to an image processing device and image processing method, and program, and particularly relates to an imaging processing device and image processing method, and program whereby overlapping of another object can be detected at arbitrary position of an object recognized from an imaged image.

2. Description of the Related Art

Heretofore, there has been an information processing device which recognizes a guide portion printed on a card included in an imaged image, and with the position thereof as reference, determines the position of a variable area where a variable area code of which the value is variable is formed, obtains which portion of the variable area thereof is hidden, and based on the portion thereof, executes a command (e.g., see Japanese Unexamined Patent Application Publication No. 2006-171958).

SUMMARY OF THE INVENTION

Note however, with the above-mentioned information processing device, the guide portion for recognizing the card from an imaged image, the variable area where hiding is detected, are provided separately, and hiding is detected only from the variable area, and accordingly, hiding of an arbitrary position on the card cannot be detected. As a result thereof, it has been difficult to provide various user interfaces to a user.

It has been recognized that there is a need to enable overlapping of another object at an arbitrary position of an object recognized from an imaged image to be detected.

According to an embodiment of the present invention, an image processing device for recognizing an object corresponding to a registered image registered beforehand from an imaged image includes: an obtaining unit configured to obtain the imaged image; a recognizing unit configured to recognize an object corresponding to the registered image from the imaged image; and a detecting unit configured to detect, based on a registered image corresponding to an object recognized from the imaged image thereof, an area where another object is overlapped with the object corresponding to the registered image thereof.

The image processing device may further include an issuing unit configured to issue a command corresponding to the overlapped area.

The image processing device may further include a display control unit configured to display the imaged image; with the display control unit displaying an icon corresponding to the command on an object corresponding to the registered image within the imaged image; and with the issuing unit issuing a command corresponding to an icon displayed on the overlapped area.

The display control unit may display the icon on, of an object corresponding to the registered image, an area other than an area with which an imaged image where the object thereof has been recognized for the first time is overlapped.

The detecting unit may detect a luminance approximate area which is a luminance area approximating the luminance of the other object, from an object area corresponding to the registered image within the imaged image; with the display control unit displaying the icon on an area other than the luminance approximate area, of the object corresponding to the registered image.

The object may include a mark corresponding to the command; with the issuing unit issuing a command corresponding to a mark exists on the overlapped area.

The image processing device may further include a correcting unit configured to correct at least one of the luminance of the object within the imaged image, and the luminance of the registered image such that the luminance of the object within the imaged image is identical to the luminance of the registered image; with the detecting unit detecting the overlapped area based on the difference between the luminance of an object within an imaged image and the luminance of a registered image, at least one of which the luminance has been corrected by the correcting unit.

The image processing device may further include a first specified area tracking unit configured to perform first specified area tracking processing for tracking a first specified area specified based on the recognition result by the recognizing unit; and a second specified area tracking unit configured to perform second specified area tracking processing for tracking a second specified area specified based on the result of the first specified area tracking processing; with the detecting unit detecting the overlapped area based on an image of the area based on the result of the second specified area tracking processing within the imaged image, and the registered image corresponding to an object recognized from the imaged image thereof.

According to an embodiment of the present invention, an image processing method for an image processing device for recognizing an object corresponding to a registered image registered beforehand from an imaged image, includes the steps of: obtaining the imaged image; recognizing an object corresponding to the registered image from the imaged image; and detecting, based on a registered image corresponding to an object recognized from the imaged image thereof, an area where another object is overlapped with the object corresponding to the registered image thereof.

According to an embodiment of the present invention, a program causing a computer to execute recognition processing for recognizing an object corresponding to a registered image registered beforehand from an imaged image, includes the steps of: obtaining the imaged image; recognizing an object corresponding to the registered image from the imaged image; and detecting, based on a registered image corresponding to an object recognized from the imaged image thereof, an area where another object is overlapped with the object corresponding to the registered image thereof.

According to an embodiment of the present invention, an imaged image is obtained, an object corresponding to a registered image is recognized from the imaged image, and based on the imaged image and the registered image corresponding to the object recognized from the imaged image thereof, an area where at the object corresponding to the registered image another object is overlapped is detected.

As described above, according to an embodiment of the present invention, at an arbitrary position of an object recognized from an imaged image overlapping of another object can be detected.

BRIEF DESCRIPTION OF THE DRAWINGS

FIG. 36A is a diagram of an image at a point-in-time t−1 for describing computation of an optical flow;

FIG. 36B is a diagram of an image at a point-in-time t for describing computation of an optical flow;

FIG. 41 is a diagram for describing processing timing with the image processing device shown in FIG. 31.

DESCRIPTION OF THE PREFERRED EMBODIMENTS

Figure 1:
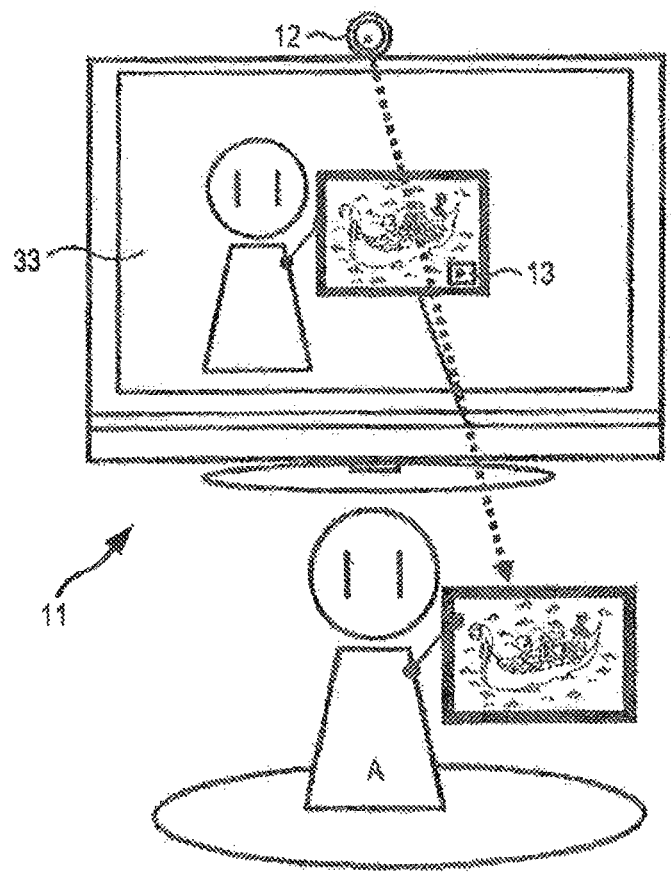
FIG. 1 is a diagram illustrating the overall of an image processing device to which an embodiment of the present invention has been applied.

Before describing an embodiment of the present invention, the correspondence between the features of the claims and the specific elements disclosed in an embodiment of the present invention, with or without reference to drawings, is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

According to an embodiment of the present invention, an image processing device (e.g., image processing device 11 shown in FIG. 2) for recognizing an object corresponding to a registered image-registered beforehand from an imaged image includes: an obtaining unit (e.g., image obtaining unit 21 shown in FIG. 2) configured to obtain the imaged image; a recognizing unit (e.g., recognition unit 23 shown in FIG. 2) configured to recognize an object corresponding to the registered image from the imaged image; and a detecting unit (e.g., image comparing unit 28 shown in FIG. 2) configured to detect, based on a registered image corresponding to an object recognized from the imaged image thereof, an area where another object is overlapped with the object corresponding to the registered image thereof.

The image processing device may further include an issuing unit (e.g., command issuing unit 30 shown in FIG. 2) configured to issue a command corresponding to the overlapped area.

The image processing device may further include a display control unit (e.g., image synthesizing unit 32 shown in FIG. 2) configured to display the imaged image; with the display control unit displaying an icon corresponding to the command on an object corresponding to the registered image within the imaged image; and with the issuing unit issuing a command corresponding to an icon displayed on the overlapped area.

The image processing device may further include a correcting unit (e.g., image correcting unit 27 shown in FIG. 2) configured to correct at least one of the luminance of the object within the imaged image, and the luminance of the registered image such that the luminance of the object within the imaged image is identical to the luminance of the registered image; with the detecting unit detecting the overlapped area based on the difference between the luminance of an object within an imaged image and the luminance of a registered image, at least one of which the luminance has been corrected by the correcting unit.

The image processing device may further include a first specified area tracking unit (e.g., specified area tracking unit 231 shown in FIG. 31) configured to perform first specified area tracking processing for tracking a first specified area specified based on the recognition result by the recognizing unit; and a second specified area tracking unit (e.g., specified area tracking unit 232 shown in FIG. 31) configured to perform second specified area tracking processing for tracking a second specified area specified based on the result of the first specified area tracking processing; with the detecting unit detecting the overlapped area based on an image of the area based on the result of the second specified area tracking processing within the imaged image, and the registered image corresponding to an object recognized from the imaged image thereof.

Figure 17:
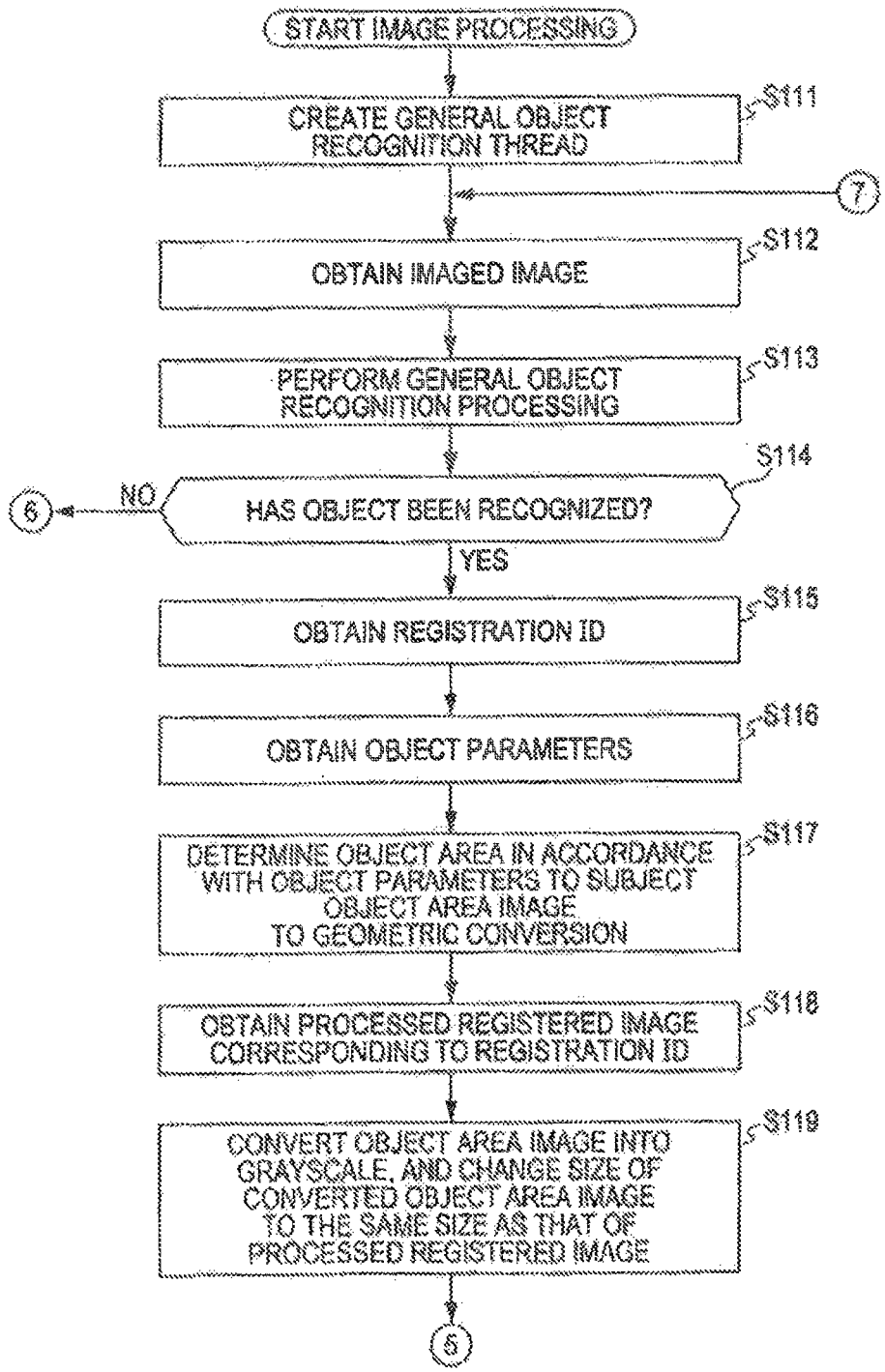
FIG. 17 is a flowchart for describing image processing of the image processing device shown in FIG. 2.
Figure 18:
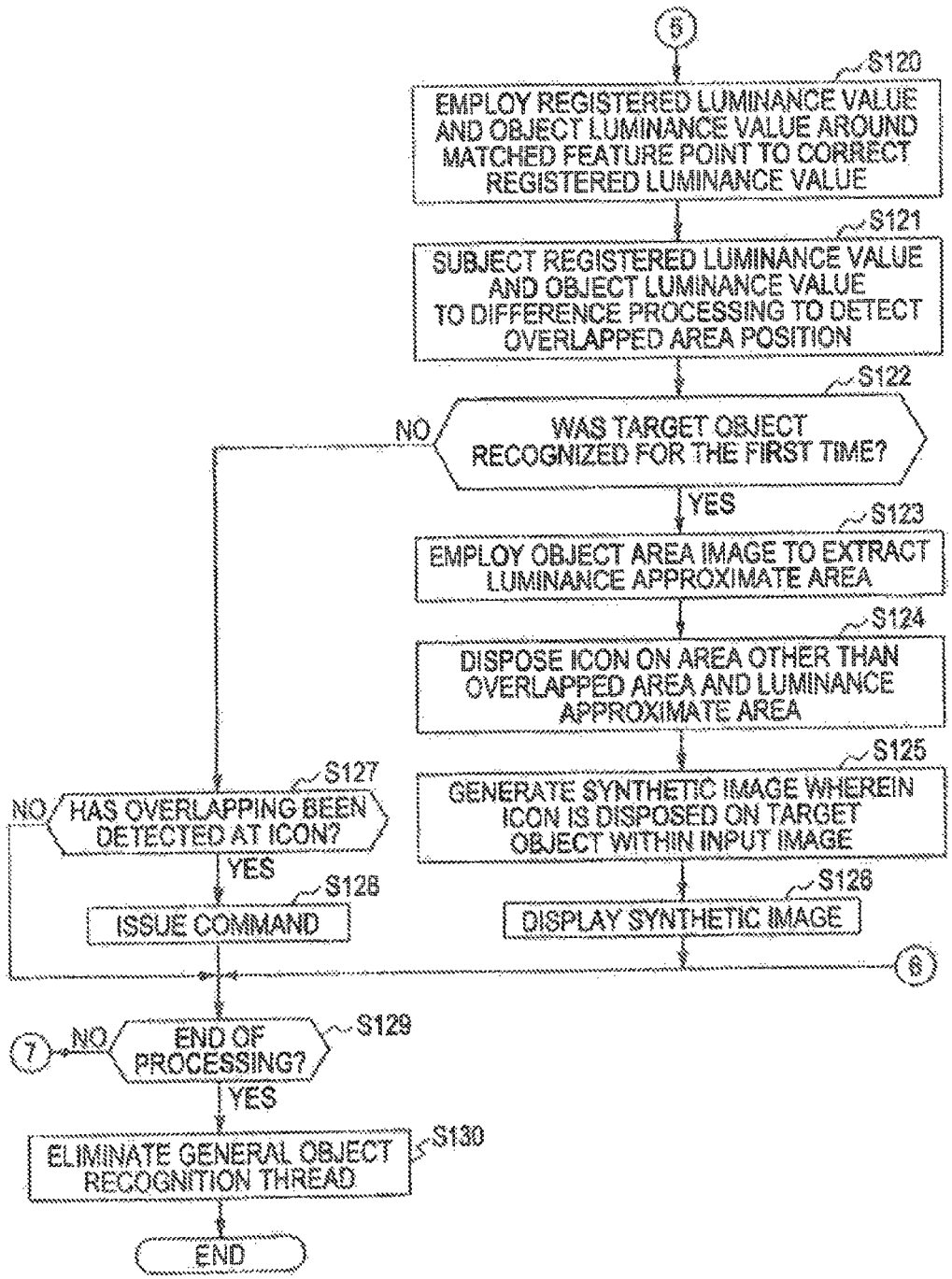
FIG. 18 is a flowchart for describing the image processing of the image processing device shown in FIG. 2.

According to an embodiment of the present invention, an image processing method for an image processing device (e.g., image processing device 11 shown in FIG. 2) for recognizing an object corresponding to a registered image registered beforehand from an imaged image, includes the steps of: obtaining the imaged image (e.g., step S112 shown in FIG. 17); recognizing an object corresponding to the registered image from the imaged image (e.g., step S113 shown in FIG. 17); and detecting, based on a registered image corresponding to an object recognized from the imaged image thereof, an area where another object is overlapped with the object corresponding to the registered image thereof (e.g., step S121 shown in FIG. 18).

Specific embodiments to which the present invention has been applied will be described below in detail with reference to the drawings.

FIG. 1 illustrates the overall of an image processing device to which an embodiment of the present invention has been applied. An imaging unit 12 provided in an image processing device 11 shown in FIG. 1 images a subject A. The image processing device 11 displays the imaged image of the subject A obtained as a result thereof on the entire screen of an image display unit 33 such as a display or the like provided in the image processing device 11.

Now, as shown in FIG. 1, when the subject A holds a printed matter of a still image or moving image registered beforehand (hereafter, a still image or moving image registered beforehand will be referred to as "registered image" as appropriate) in the hand, the image processing device 11 recognizes, based on the imaged image and registered image of the subject A imaged by the imaging unit 12, the position and orientation of an object corresponding to the registered image within the imaged image (here, image of the registered image). Subsequently, the image processing device 11 displays, based on the recognized position and orientation, an icon 13 for user interface on an arbitrary position of the object (hereafter, referred to as "target object" as appropriate) corresponding to the registered image within the imaged image displayed on the image display unit 33.

Subsequently, when the subject A moves his/her finger ox the like to the position of the printed matter of the registered image corresponding to the position of the icon 13 displayed on the image display unit 33, the image processing unit 11 detects overlapping between the target object within the imaged image and the finger, and based on the position of the overlapped area, issues a command corresponding to the icon 13 displayed on the position thereof.

As described above, the image processing device 11 recognizes the target object based on the imaged image and registered image, so as to the target object, there is no need to provide an area for recognizing the target object thereof. Also, the image processing device 11 detects overlapping between the target object within the imaged image and the finger, so an icon for user interface can be provided at an arbitrary position of the target object. As a result thereof, various user interfaces can be provided to a user.

Figure 2:
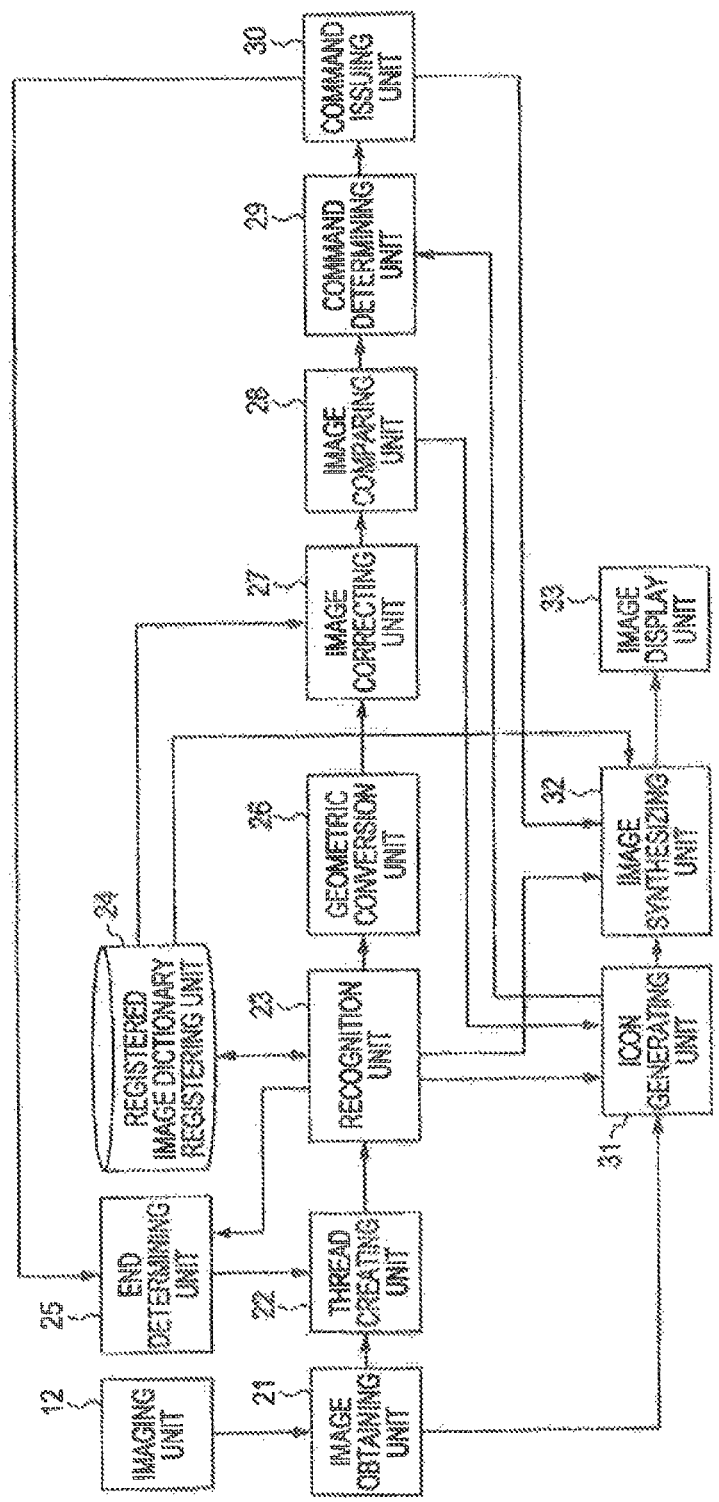
FIG. 2 is a block diagram illustrating a configuration example of the image processing device shown in FIG. 1.

FIG. 2 is a block diagram illustrating a configuration example of the image processing device 11 shown in FIG. 1. The image processing device 11 shown in FIG. 2 is configured of an imaging unit 12, image obtaining unit 21, thread creating unit 22, recognition unit 23, registered image dictionary registering unit 24, end determining unit 25, geometric conversion unit 26, image correcting unit 27, image comparing unit 28, command determining unit 29, command issuing unit 30, icon generating unit 31, image synthesizing unit 32, and image display unit 33.

The imaging unit 12 is configured of, for example, a video camera including a photoelectric conversion element for converting an optical image into electric signals, such as CCD (Charge Coupled Device). CMOS (Complementary Metal-Oxide Semiconductor) sensor, or the like, and images a subject. The imaging unit 12 supplies the imaged image in increments of frame obtained as a result thereof to the image obtaining unit 21 as an input image.

The image obtaining unit 21 supplies the input image supplied from the imaging unit 12 to the thread creating unit 22 and icon generating unit 31. In response to the input image supplied from the image obtaining unit 21, the thread creating unit 22 supplies the input image thereof to the recognition unit 23, and creates a general object recognition thread which is a thread for general object recognition processing for recognizing the target object within the input image. Specifically, the thread creating unit 22 supplies the input image supplied from the image obtaining unit 21 to the recognition unit 23, and instructs the recognition unit 23 which executes general object recognition processing to start the general object recognition processing.

Also, in response to end information representing the end of the image processing by the image processing device 11, supplied from the end determining unit 25, the thread creating unit 22 eliminates the general object recognition thread. Specifically, the thread creating unit 22 instructs the recognition unit 23 to end the general object recognition processing.

The recognition unit 23 performs the general object recognition processing based on the input image supplied from the thread creating unit 22, and the registered images registered in the registered image dictionary registering unit 24. Note that this general object recognition processing is started when start of the general object recognition processing is instructed from the thread creating unit 22, and is repeated until end of the general object recognition processing is instructed.

Also, the recognition unit 23 supplies to the geometric conversion unit 26 and image synthesizing unit 32 the ID thereafter, referred to as "registration ID") of the registered image registered in the registered image dictionary registering unit 24, and object parameters representing the position and orientation on the input image of the target object, corresponding to the target object included in the input image obtained as a result of the general object recognition processing.

Further, the recognition unit 23 supplies, based on the registration ID, an icon ID, which is the ID of an icon to be disposed on the target object corresponding to the registration ID thereof, registered in the registered image dictionary registering unit 24 in a correlated manner with the registration ID, to the icon generating unit 31. Also, the recognition unit 23 recognizes the target object based on the result of the general object recognition processing once, and then in a case wherein the target object has not been able to be recognized, supplies elimination information representing elimination of the target objet within the input image to the end determining unit 25.

With the registered image dictionary registering unit 24, registered images which have been converted into grayscale, reduced in size, and subjected to shading-off processing (hereafter, referred to as processed registered images), unprocessed registered images, registered image feature quantity groups, icon IDs, and so forth have been registered.

The end determining unit 25 determines, in response to the elimination information supplied from the recognition unit 23, or the command supplied from the command issuing unit 30, whether ox not the image processing is to end. The end determining unit 25 supplies, in response to the determination result, end information to the thread creating unit 22.

The geometric conversion unit 26 determines an object area which is an area where the target object within the input image exists, in accordance with the object parameters supplied from the recognition unit 23, and subjects the object area, which is the image of the object area thereof, to geometric conversion. Thus, the orientation of the image of the object area becomes the same orientation as the registered image. The geometric conversion unit 26 supplies the registration ID supplied from the recognition unit 23, and the object area image after geometric conversion to the image correcting unit 27.

The image correcting unit 27 obtains the processed-registered image registered in the registered image dictionary registering unit 24 in a correlated manner with the registration ID thereof, based on the registration ID supplied from the geometric conversion unit 26. Also, the image correcting unit 27 converts the object area image supplied from the geometric conversion unit 26 into grayscale, and changes the size of the object area image after conversion to the same size as the size of the processed registered image.

Further, the image correcting unit 27 employs the luminance value of the processed registered image (hereafter, referred to as "registered luminance value" as appropriate), and the luminance value of the object area image after grayscale conversion and size conversion (hereafter, referred to as "object luminance value" as appropriate) to correct the registered luminance value such that the registered luminance value is identical to the object luminance value. The image correcting unit 27 supplies the processed registered image after correction of the registered luminance value, and the object area image after grayscale conversion and size conversion to the image comparing unit 28.

The image comparing unit 28 determines whether or not the target object is overlapped with another object based on the difference between the registered luminance value of the processed registered image supplied from the image correcting unit 27, and the object luminance value of the object area image. Also, the image comparing unit 28 detects the position of an overlapped area which is an area where the target object is overlapped with another object, and supplies overlapped position information which is information representing the position thereof to the command determining unit 29 and icon generating unit 31.

Further, the image comparing unit 28 employs the object area image to create a luminance map, and extracts a luminance approximate area from the object area image based on the luminance map thereof. Note that the term "luminance approximate area" means a luminance area which approximates the luminance of an object (e.g., finger operating an icon) assumed beforehand as another object (target) where overlapping with the target object is detected. The image comparing unit 28 supplies the extracted luminance approximate area to the icon generating unit 31.

The command determining unit 29 detects an icon included in an overlapped area based on the overlapped position information supplied from the image comparing unit 28, and icon position information representing the position of the icon supplied from the icon generating unit 31. The command determining unit 29 supplies command information representing the command corresponding to the detected icon to the command issuing unit 30.

The command issuing unit 30 issues, based on the command information supplied from the command determining unit 29, the command represented with the command information. For example, the command issuing unit 30 issues a command for playing the registered image corresponding to the target object to the image synthesizing unit 32, or issues a command for ending the image processing to the end determining unit 25.

The icon generating unit 31 determines the position of an icon to be disposed on the target object based on the icon ID supplied form the recognition unit 23, and the overlapped position information and luminance approximate area supplied from the image comparing unit 28. The icon generating unit 31 supplies icon position information indicating the position of the determined icon to the command determining unit 29. Also, the icon generating unit 31 supplies the icon position information, icon ID, and the input image supplied from the image obtaining unit 21, to the image synthesizing unit 32.

The image synthesizing unit 32 stores icon images in correlation with the corresponding icon ID. Based on the icon ID the image synthesizing unit 32 reads out the corresponding stored icon image. Also, based on the icon position information supplied from the icon generating unit 31 the image synthesizing unit 32 synthesizes (superimposes) the read icon image on the input image supplied from the icon generating unit 31 to generate a synthetic image wherein the icon is disposed on the target object within the input image.

Also, based on the command supplied from the command issuing unit 30 and the registration ID supplied from the recognition unit 23, the image synthesizing unit 32 reads out the moving image serving as a registered image corresponding to the registration ID thereof from the registered image dictionary registering unit 24. Based on the read moving image, the input image supplied from the icon generating unit 31, and the object parameters supplied from the recognition unit 23 the image synthesizing unit 32 synthesizes the input image and moving image to generate a synthetic image wherein the target object within the input image is changed into the moving image serving as a registered image.

Further, the image synthesizing unit 32 supplies the synthetic image to the image display unit 33. The image display unit 33 displays the synthetic image supplied from the image synthesizing unit 32.

Figure 3:
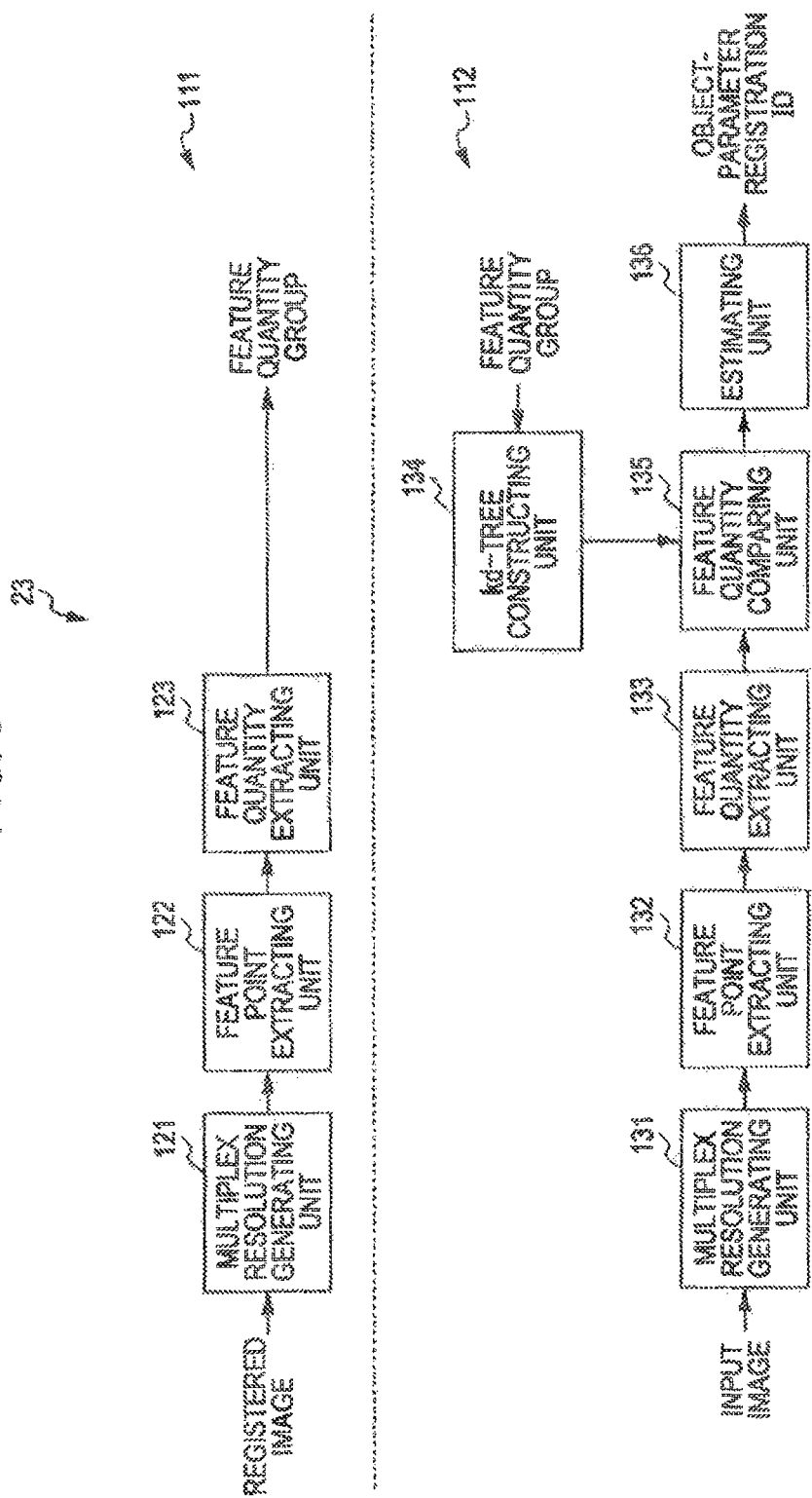
FIG. 3 is a block diagram illustrating the configuration of an embodiment of the recognition unit shown in FIG. 2.

FIG. 3 is a block diagram illustrating a detailed configuration example of the recognition unit 23 shown in FIG. 2. The recognition unit 23 is configured of the two components of a learning unit 111 for performing registered image learning processing, and a recognition unit 112 for recognizing the target object within an input image.

The learning unit 111 is configured of a multiplex resolution generating unit 121, feature point extracting unit 122, and feature quantity extracting unit 123.

The multiplex resolution generating unit 121 generates multiplex resolution images from registered images registered in the registered image dictionary registering unit 24. The feature point extracting unit 122 extracts feature points from the respective multiplex resolution images generated by the multiplex resolution generating unit 121. The feature quantity extracting unit 123 extracts feature quantity of each feature point extracted by the feature point extracting unit 122, supplies the feature quantity group thereof to the registered image dictionary registering unit 24 to register this in a correlated manner with the corresponding registration ID.

The recognition unit 112 is configured of a multiplex resolution generating unit 131, feature point extracting unit 132, and feature quantity extracting unit 133, kd-tree constructing unit 134, feature quantity comparing unit 135, and estimating unit 136.

The multiplex resolution generating unit 131 generates multiplex resolution images from the input image input from the thread creating unit 22. The feature point extracting unit 132 extracts feature points from the respective multiplex resolution images generated by the multiplex resolution generating unit 131. The feature quantity extracting unit 133 extracts feature quantity of each feature point extracted by the feature point extracting unit 132. Processing performed by the multiplex resolution generating unit 131, feature point extracting unit 132, and feature quantity extracting unit 133 is the same processing performed by the multiplex resolution generating unit 121, feature point extracting unit 122, and feature quantity extracting unit 123, of the learning unit 111.

The kd-tree constructing unit 134 constructs a kd tree from the feature quantity groups registered in the registered image dictionary registering unit 24. The feature quantity comparing unit 135 compares the feature quantity group extracted by the feature quantity extracting unit 133, and the feature quantity groups of all registered images (or each registered image corresponding to each target object in the case of performing processing for each target object) corresponding to all target objects serving as recognition targets represented as the kd tree constructed by the kd-tree constructing unit 134. Based on the comparison result by the feature quantity comparing unit 135 the estimating unit 136 estimates existence of the target object included in the input image, and the position and orientation thereof, and outputs object parameters representing the position and orientation thereof, and the registration ID corresponding to the target object.

Note that both the learning unit 111 and recognition unit 112 are not necessary at the same time. As the learning results by the learning unit 111, the registered image dictionary registering unit 24 in which necessary information is registered may be implemented in the image processing device 11.

Figure 4:
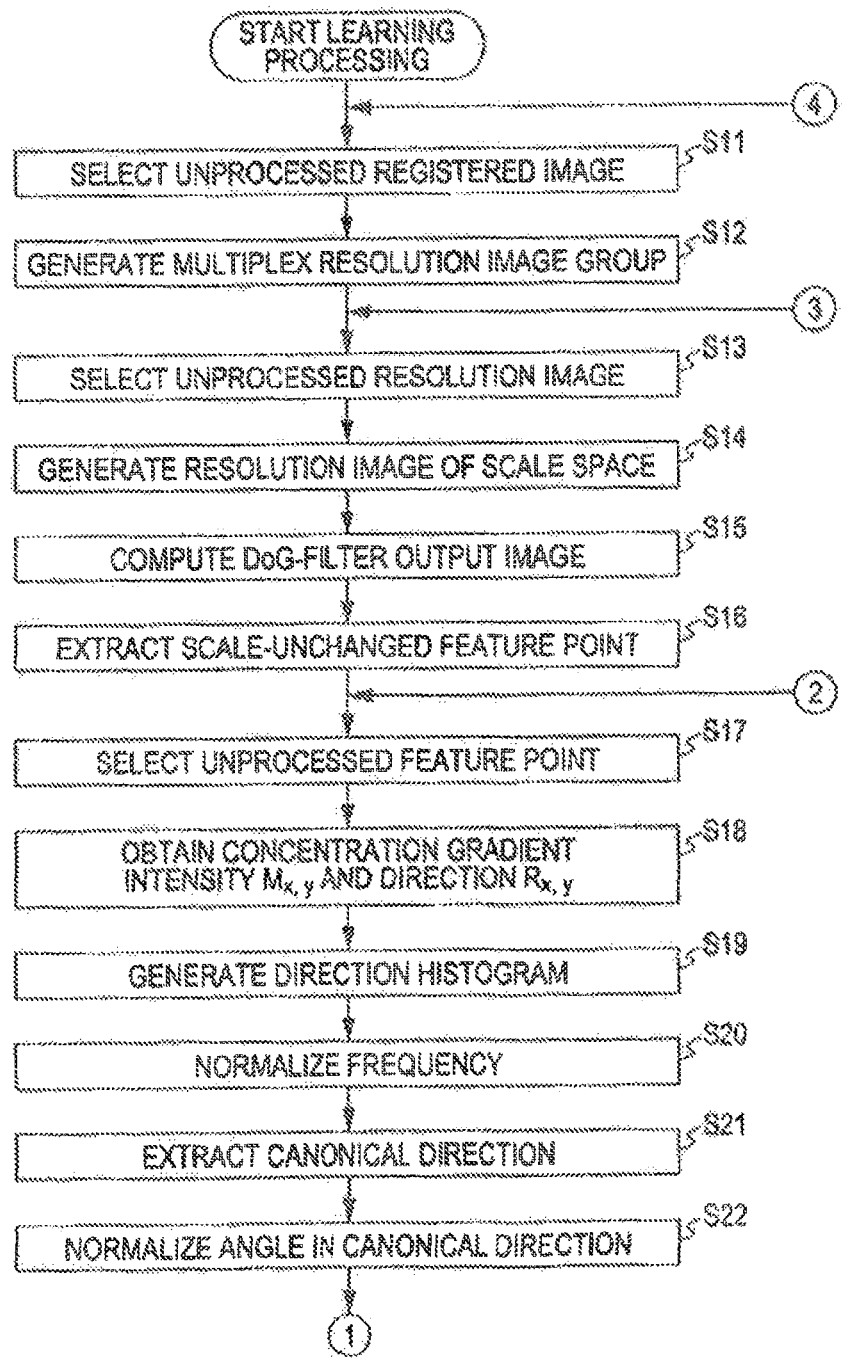
FIG. 4 is a flowchart for describing learning processing of the learning unit shown in FIG. 3.
Figure 5:
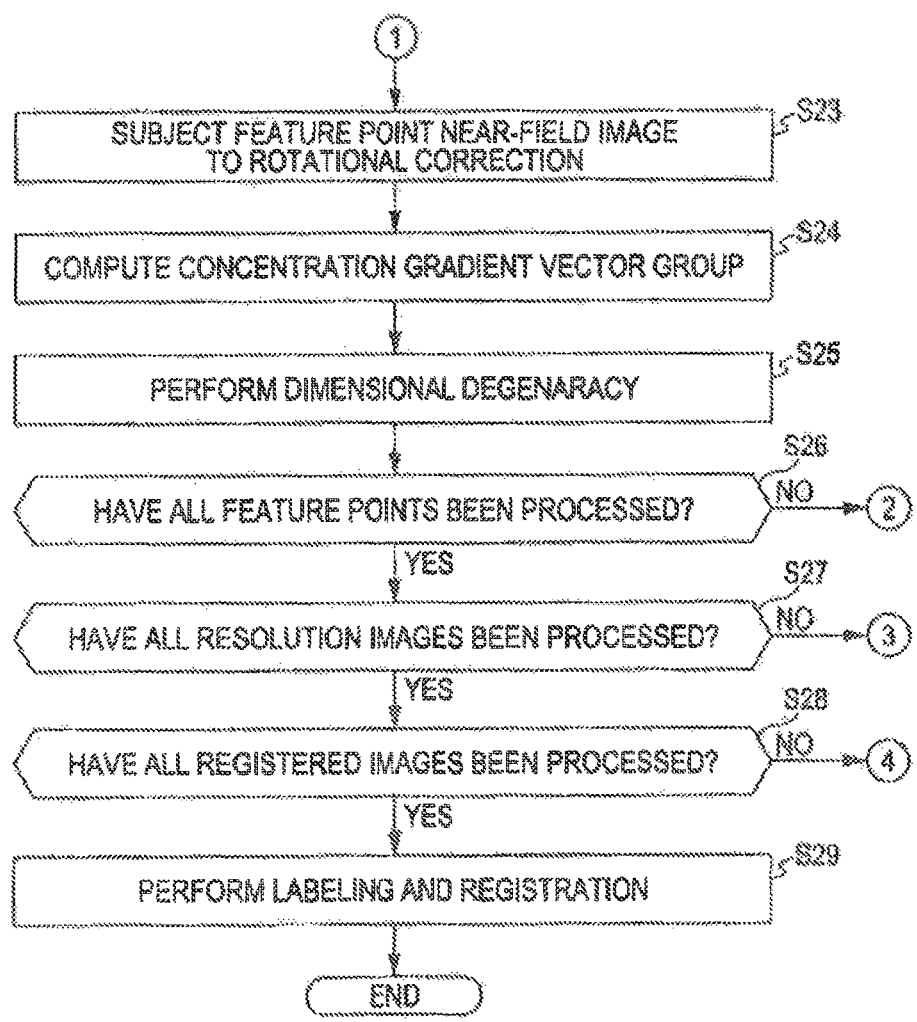
FIG. 5 is a flowchart for describing the learning processing of the learning unit shown in FIG. 3.

Next, description will be made regarding learning processing at the learning unit 111 with reference to FIGS. 4 and 5. This processing is started when the user instructs to start the learning processing. Note that general object recognition processing at the recognition unit 112 will be described later with reference to FIGS. 23 through 25.

The multiplex resolution generating unit 121 repeats processing in steps S11 through S27 until determination is made in later-described step S28 that all registered images have been processed. Now, in step S11, the multiplex resolution generating unit 121 selects one unprocessed registered image. In step S12, the multiplex resolution generating unit 121 generates a multiplex resolution group. Specifically, the multiplex resolution generating unit 121 reduces a registered image serving as a learning object in accordance with a predetermined scale-factor to generate a multiplex resolution image group. For example, if we say that a reduction ratio from the original image which is the minimum resolution image is $\alpha$, and the number of multiplex resolution images to be output is N (including the original image), the resolution image $I^{[k]}$ of the k'th (the original image is taken as k=0) multiplex resolution is generated by subjecting the original image If $\alpha \times (N-k)$.

Alternatively, another method can be conceived wherein a reduction ratio for generating an image of which the resolution is one step lower is taken as $\gamma$ (fixed value), i.e., reduction ratio $\gamma^k$ to generate $I^{[k]}$.

Figure 6:
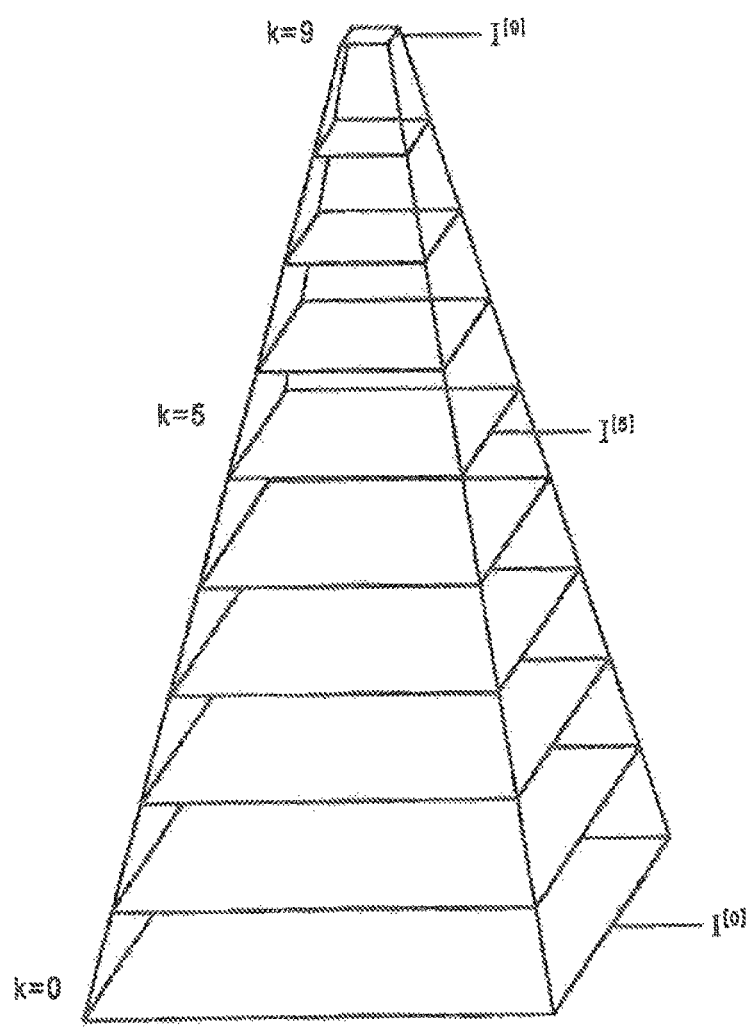
FIG. 6 is a diagram for describing resolution images.

FIG. 6 illustrates a multiplex resolution image group to be generated if we say that the parameters N=10, and $\alpha$=0.1. With the example shown in FIG. 6, there are generated multiplex resolution images with a total of 10 steps of image $I^{[1]}$ reduced with a reduction ratio of 0.9 from the original image and so on through image $I^{[9]}$ reduced with a reduction ratio of 0.1. The greater the value of a coefficient k for stipulating a reduction ratio is, the smaller the image is reduced, and consequently, the greater the value of the coefficient k is, the smaller the image frame of each frame is.

Next, the feature point extracting unit 122 repeats the processing in steps S13 through S26 until determination is made in later-described step S27 that all resolution images have been processed, thereby extracting feature points (scale-unchanged feature points) from the respective resolution image $I^{[k]}$ (k=0 through N−1) generated by the multiplex resolution generating unit 121 so as to be extracted robustly even in the case of image enlargement/reduction conversion (scale conversion). Examples of a scale unchanged feature point extracting method includes a method wherein the scale space of an image is constructed, of a local maximum point (the maximum point of a predetermined local range and local minimum point (the minimum point of a predetermined local range) of Difference of Gaussian (DoG) filter output of each scale image, a point of which the position is unchanged even with change in the scale direction is extracted as a scale feature point (D. Lowe, "Object recognition from local scale-invariant features," in Proc. International Conference on Computer Vision Vol. 2, pp. 1150-1157, Sep. 20-25, 1999, Corfu, Greece), and a method wherein the scale space of an image is constructed, of corner points extracted from each scale image by a Harris corner detector, a point which provides local maximum of Laplacian of Gaussian (LoG) filer output of a scale space image is extracted as a feature point (K. Mikolajczyk, C. Schmid, "Indexing based on scale invariant interest points," International Conference on Computer Vision, 525-531, July 2001). Any extracting method can be applied to the feature point extracting unit 122 as long as a scale unchanged feature point can be extracted.

Now, as an embodiment of the present invention a method will be described as a scale unchanged feature point extracting method, which is based on the method proposed by D. Lowe ("Distinctive image features from scale-invariant key points," accepted for publication in the International Journal of Computer Vision, 2004). With this method, through the scale space expression of a scale unchanged feature point extraction target image (T. Lindeberg, "Scale-space: A framework for handling image structures at multiple scales," Journal of Applied Statistics, vol. 21, no. 2, pp 224-270, 1994) a local maximum point and local minimum point wherein a scale direction has been taken into consideration are extracted from DoG filter output of the relevant image as feature points.

Now, in step S13, the feature point extracting unit 122 selects an unprocessed resolution image of the respective resolution images. Then, in step S14, the feature point extracting unit 122 generates a scale space resolution image. That is to say, the scale space of a scale unchanged feature point extraction target image I (one resolution image of the respective resolution images (respective resolution images of k=0, 1, 2, and so on through 9) generated at the multiplex resolution generating unit 121 becomes a scale unchanged feature point extraction target image) is generated. The s'th (s=0 through s-1) resolution image $L_0$ of scale space is generated by employing a two-dimensional Gaussian function shown in Expression (1) to subject the scale unchanged feature point extraction target image I to convolution integral (Gaussian filtering) with $\sigma=K_a \sigma_0$.

$$g(x, y) = \frac{1}{2\pi\sigma^2} e^{\frac{-(x^2+y^2)}{2\sigma^3}} \quad (1)$$

Here, $\sigma_0$ is a parameter for determining the degree of shading off for the purpose of noise removal of the scale unchanged feature point extraction target image I, k is a constant factor relating to the degree of shading off, which is common to between the respective resolutions of scale space, and is a different factor the k of the resolution image $I^{[k]}$. Now, let us say that the horizontal direction of the images is taken as X axis, and the vertical direction thereof is taken as Y axis.

Figure 7:
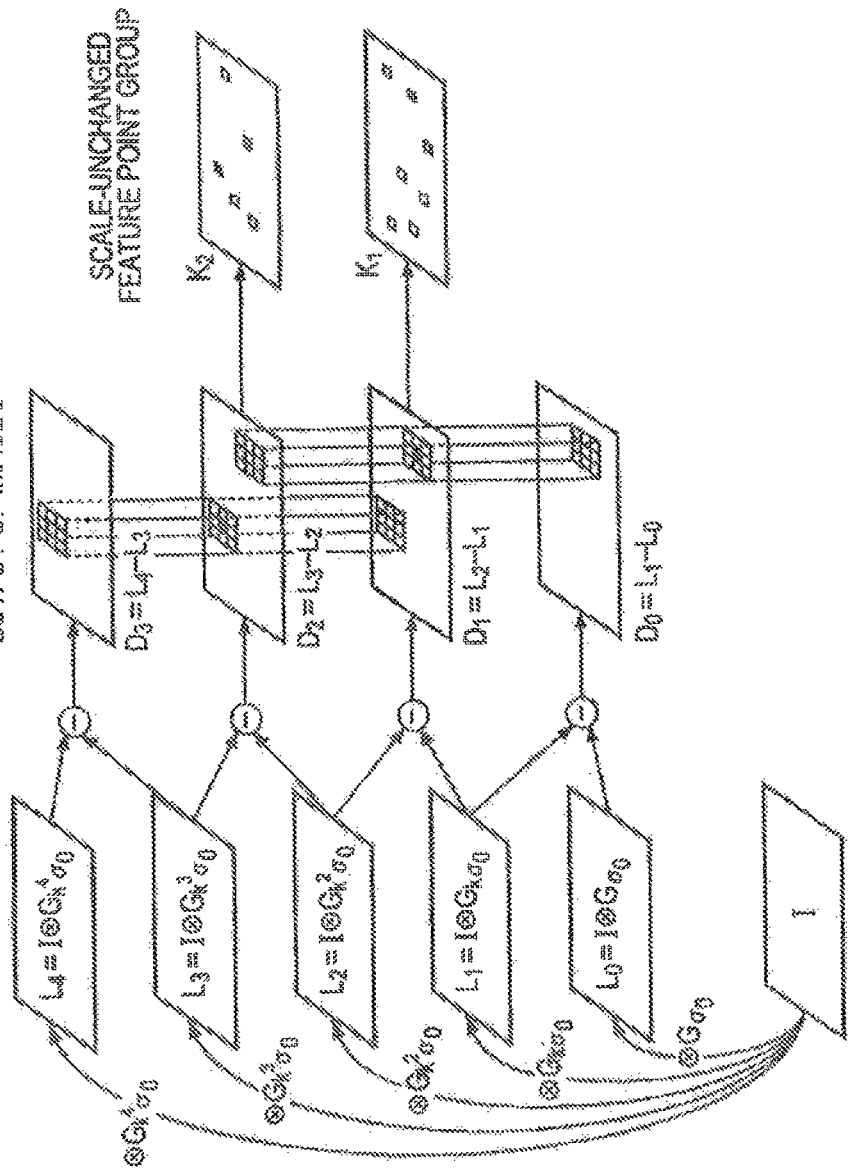
FIG. 7 is a diagram for describing the scale space of a DoG filter.

FIG. 7 represents an example of scale space thus generated. This example represents resolution images $L_0$ through $L_4$ generated as to the image I by employing the following five two-dimensional Gaussian functions.

$$L_0 = I \otimes G_{\sigma 0} \quad (2)$$

$$L_1 = I \otimes G_{k\sigma 0} \quad (3)$$

$$L_2 = I \otimes G_{k^2\sigma 0} \quad (4)$$

$$L_3 = I \otimes G_{k^3\sigma 0} \quad (5)$$

$$L_4 = I \otimes G_{k^4\sigma 0} \quad (6)$$

Note that the right side terms of the convolution integral symbol of the right side of Expressions (2) through (6) represent the following expression. That is to say, Expressions (2) through (6) are substantially the same as Expression (1).

$$G_{k^s\sigma_0} = \frac{1}{2\pi(k^s\sigma_0)^2} e^{-\frac{(x^2+y^2)}{2(k^s\sigma_0)^3}} \quad (7)$$

In FIG. 7, the number of resolution levels is assumed to be S=5.

Next, in step S15, the feature point extracting unit 122 computes a DoG-filter output image. That is to say, the DoG-filter output images of the respective resolution images $L_s$ of scale space of the feature point extraction target image I thus obtained are obtained. This DoG filter is a kind of a two-dimensional differentiation filter employed for outline enhancement of an image, and is frequently employed along with a LoG filter as an approximate model of processing performed in the human visual system, up to the point of relaying information from the retina by the lateral geniculate body. The output of a DoG filter can be obtained effectively by taking the difference between two Gaussian-filter output images. That is to say, as shown in the central column of FIG. 7, DoG-filter output image $D_s$ of the s'th (S=0 through S-2) resolution can be obtained by subtracting the resolution image $L_S$ from the resolution image $L_{s+1}$ of one step above thereof (by computing $L_{s+1}-L_S$).

Next, in step S16, the feature point extracting unit 122 extracts scale unchanged feature point. Specifically, of pixels on DoG-filter output images $D_s$ (s=1 through s-3), with a total of 27 pixels of the immediately near-field area (in the case of the present embodiment, an area made up of 3×3 pixels at a predetermined position) of the DoG-filter output images $D_s$, and the immediately near-field areas of the same position (corresponding position) on the DoG-filter output images $D_{s-1}$ of one step lower thereof and the DoG-filter output images $D_{s+1}$ of one step upper thereof, pixels serving as the local maximum pixel (the maximum value of the 27 pixels), and as the local minimum pixel (the minimum value of the 27 pixels) are extracted as scale unchanged feature points, and are held as feature point groups $K_s$ (s=1 through s-3). The feature point groups $K_s$ are illustrated on the right side column of FIG. 7. The feature points thus extracted are scale unchanged feature points having positional invariance as to change in resolution wherein the factor is $K^2$ (i.e., change in scale).

The feature point extracting unit 122 repeats the processing in steps S13 through S26 until determination is made in later-described step S27 that all resolution images have been processed, and extracts a scale unchanged feature point group as to each of the multiplex resolution level images $I^{[k]}$ generated by the multiplex resolution generating unit 121.

Next, the feature point extracting unit 123 repeats the processing in steps S17 through S25 until determination is made in step S26 that all feature points have been processed, and extracts the feature quantity of each feature point extracted from the respective multiplex resolution level images $I^{[k]}$. Hereafter, the feature quantity of a feature point will be referred to as "feature point feature quantity" or simply "feature quantity", depending on context.

As for feature point feature quantity, feature quantity unchanged as to image rotational transformation, and change in luminance is employed. Multiple feature quantities may be applied to one feature point. In this case, with the feature quantity comparing unit 135 of the subsequent stage, processing for integrating the comparison results of different feature quantity is needed. In the case of this embodiment, as feature quantities there are employed two feature quantities derived from the concentration gradient information (concentration gradient intensity and concentration gradient direction at each point) of the feature point near-field area of the image from which the relevant feature point is extracted. One is a direction histogram corrected in the dominant concentration gradient direction (hereafter, referred to as "canonical direction") of the relevant feature point near-field area, and the other is a concentration gradient vector corrected in the canonical direction and subjected to low dimensional degeneracy.

Figure 8:
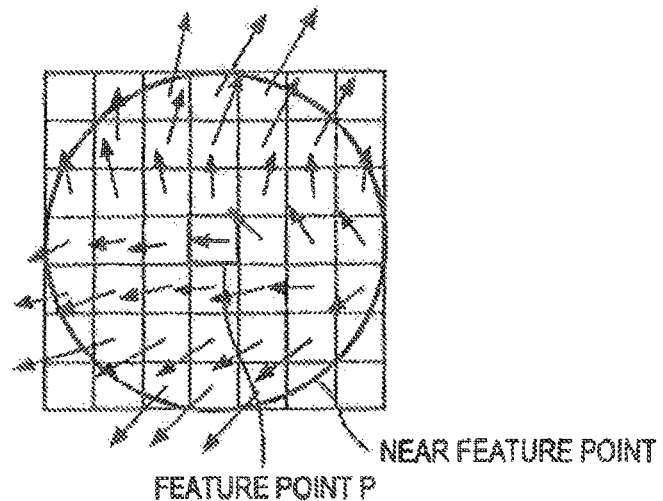
FIG. 8 is a diagram for describing concentration gradient direction near a feature point.

First feature point quantity (feature point of type 1) is feature quantity wherein the histogram (direction histogram) relating to the concentration gradient direction in the vicinity of a feature point is corrected to zero in the dominant direction thereof. In order to extract this first feature quantity, in step S17 the feature quantity extracting unit 123 selects one unprocessed feature point. Subsequently, in step S18, the feature quantity extracting unit 123 obtains concentration gradient intensity $M_{x,y}$ and direction $R_{x,y}$. That is to say, as shown in FIG. 8, the concentration gradient intensity $M_{x,y}$ and direction $R_{x,y}$ in the vicinity of a feature point (with the present embodiment, a pixel group included in a diametrical 7-pixel (radial 3.5-pixel) range centered on the relevant feature point P) are obtained by Expressions (8) and (9), respectively. x,y in these expressions are coordinates on the image of a pixel of which the concentration gradient is to be obtained, and $I_{x,y}$ is the pixel value thereof.

$$M_{xy} = \sqrt{(I_{x+1,y} - I_{x,y})^2 + (I_{x,y+1} - I_{x,y})^2} \quad (8)$$

$$R_{xy} = \tan^{-1}(I_{x,y+1} - I_{x,y}, I_{x+1,y} - I_{x,y}) \quad (9)$$

Figure 9:
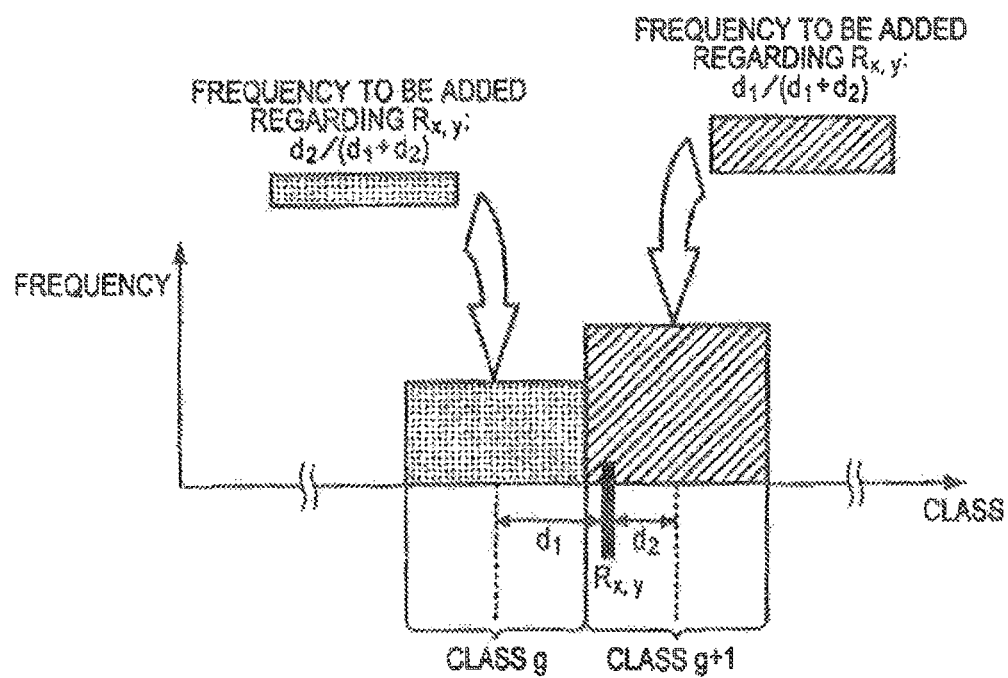
FIG. 9 is a diagram for describing a method for calculating frequency of histogram.

Next, in step S19, the feature quantity extracting unit 123 generates a direction histogram. Specifically, based on the direction $R_{x,y}$ of each pixel in the vicinity of a feature point the frequency of each pixel is accumulated in the relevant class of the direction histogram (with the present embodiment, $\Delta\theta=10°$) with class width of $\Delta\theta$, and the number of classes of $360°/\Delta\theta$. At this time, as shown in FIG. 9, in order to reduce influence due to the quantization error of a class, there is accumulated a value proportional to the closeness of the distance from the center value of the class (horizontal direction in FIG. 9) to the direction $R_{x,y}$. Specifically, if we say that two classes closest from the direction $R_{x,y}$ are taken as g and g+1, and the distance between the center value of the class g and the direction $R_{x,y}$ and the distance between the center value of the class g+1 and the direction $R_{x,y}$ are taken as $d_1$ and $d_2$, respectively, the frequency values to be added to the class g and g+1 are $d_2/(d_1+d_2)$ and $d_1/(d_1+d_2)$, respectively. Thus, the quantization error is reduced.

Next, in step S20, the feature quantity extracting unit 123 normalizes the frequency. Specifically, the frequency of the obtained direction histogram is normalized by being divided by the number of pixels in the vicinity of a feature point (the number of pixels included in the diametrical 7-pixel range). Thus, feature quantity which is strong as to change in luminance can be obtained by accumulating the gradient direction alone.

Further, the feature quantity extracting unit 123 extracts the canonical direction in step S21, and normalizes an angle in the canonical direction in step S22. Specifically, in order to obtain unchanged feature quantity as to rotational transformation, the canonical direction serving as an angle providing the strong peak of the obtained direction histogram is extracted, and the histogram is shifted such that the angle serving as the canonical direction becomes zero, thereby performing angular normalization. With the histogram relating to a feature point extracted around a corner, multiple strong peaks appear in the direction perpendicular to the edge thereof, so in such a case, there is generated a direction histogram corrected (normalized) such that for each peak the angle thereof becomes zero. In other words, feature quantity is generated separately by the number in the canonical direction. The basis for a peak to be in the canonical direction is assumed to be a peak direction whereby an accumulation value not smaller than 80% of the maximum accumulation value is provided, for example.

Figure 10:
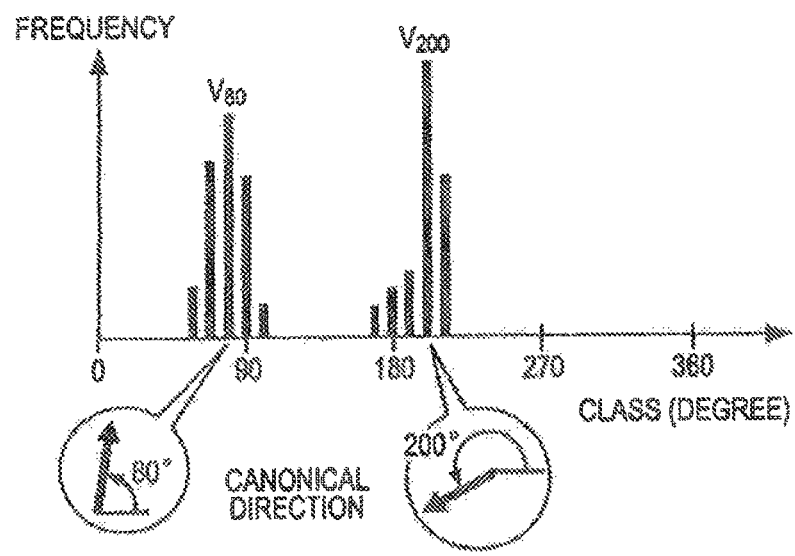
FIG. 10 is a diagram illustrating a direction histogram example.
Figure 11:
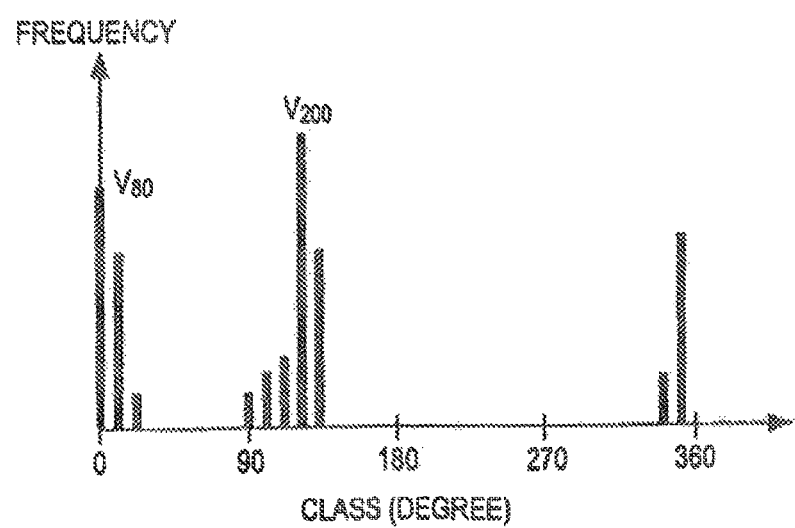
FIG. 11 is a diagram illustrating a direction histogram example.
Figure 12:
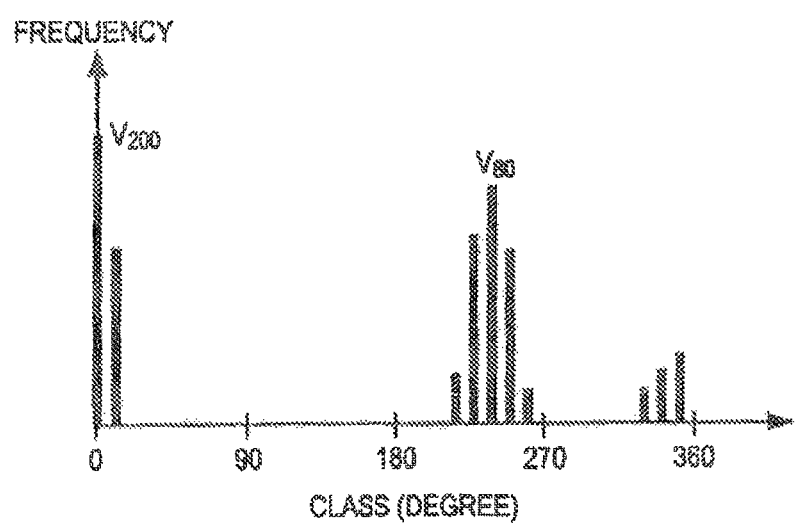
FIG. 12 is a diagram illustrating a direction histogram example.

For example, with the direction histogram shown in FIG. 10, there exe two peaks of frequency $V_{80}$ with an angle of 80 degrees, and frequency $V_{200}$ with an angle of 200 degrees. That is to say, the angle of 80 degrees and the angle of 200 degrees becomes the canonical direction. In this case, there are generated a histogram normalized such that the angle of 80 degrees serving as the canonical direction becomes zero as shown in FIG. 11, and a histogram normalized such that the angle of 200 degrees serving as the canonical direction becomes zero as shown in FIG. 12.

The feature quantity of type 1 thus obtained becomes a feature vector having the same dimension as the number of classes of the direction histogram (with the present embodiment, 36 (=360/10)-dimensional vector, i.e., a vector made up of a numeral representing the frequency of 36 classes).

Next, a low-dimensional degeneracy concentration gradient vector is obtained as second feature quantity (feature quantity of type 2). With the feature quantity of type 1, the spatial layout of pixels in the vicinity of a feature point is ignored, and only the tendency (frequency) in the direction of the concentration gradient vector at a local area in the vicinity of the feature point is focused on, but with the feature quantity of type 2, the spatial layout of each concentration gradient vector in the vicinity of a feature point is focused on. These two types of feature quantity are employed for comparison of feature quantity with a later-described technique, thereby realizing recognition which is strong as to change in a point of view, and change in luminance.

Figure 13:
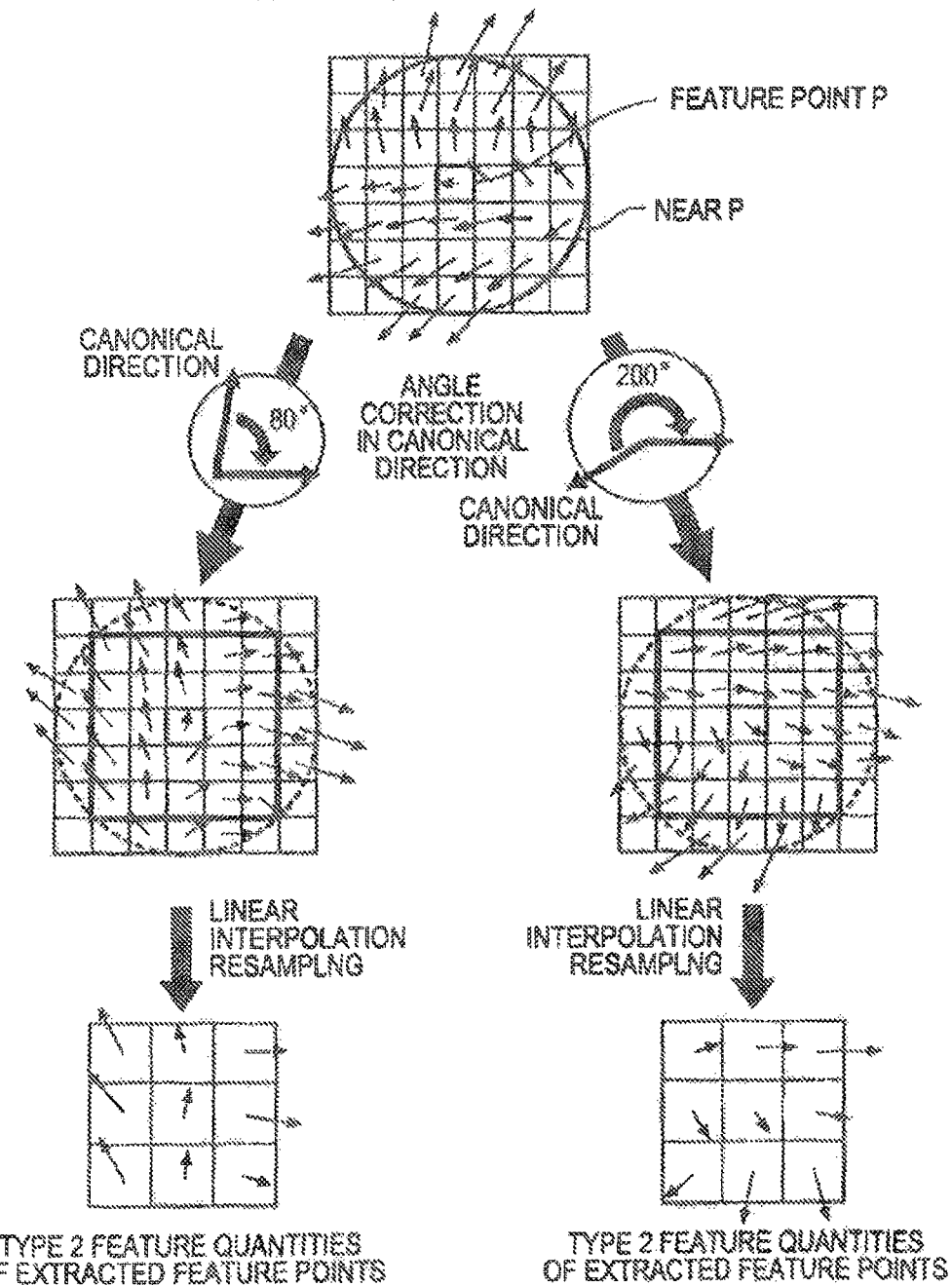
FIG. 13 is a diagram for describing feature quantity extraction processing.

In order to extract the feature quantity of type 2, first, in step S23, the feature quantity extracting unit 123 subjects a feature point near-field image to rotational correction. That is to say, a feature point near-field image is subjected to rotational correction such that the canonical direction near a feature point obtained in the above-mentioned processing becomes zero degrees. Further, in step S24, the feature quantity extracting unit 123 computes a concentration gradient vector. For example, in a case wherein the concentration gradient of the pixels near a feature point shown in the top of FIG. 13 is distributed such as shown in FIG. 10, as described above, the canonical direction becomes the directions of 80 degrees and 200 degrees. Accordingly, as shown in the diagram on the left side in the middle of FIG. 13, the feature point near-field image is rotated in the clockwise direction in this case such that the canonical direction of 80 degrees of the top image becomes zero degrees. Subsequently, the concentration gradient vector group thereof is computed. This is consequently equivalent to obtaining of the concentration gradient vector group of the direction histogram shown in FIG. 11 normalized and obtained assuming that the canonical direction of the angle of 80 degrees shown in FIG. 10 is zero degrees.

Also, similarly, as shown in the right side in the middle of FIG. 13, the feature point near-field image is subjected to rotational correction such that the canonical direction of 20 degrees becomes zero degrees. Subsequently, the concentration gradient vector group of the image thereof is computed. This is consequently equivalent to obtaining of the concentration gradient vector group of the direction histogram shown in FIG. 12 normalized and obtained assuming that the canonical direction of the angle of 200 degrees shown in FIG. 10 is zero degrees.

Next, in step S25, the feature quantity extracting unit 123 subjects the concentration gradient vector group to dimensional degeneracy. That is to say, in order to enable the deviation of the feature point extraction position of around several pixels to be absorbed, this concentration gradient vector group is subjected to dimensional degeneracy, as shown in the both sides of the bottom of FIG. 13, for example, by subjecting a vector group of 5×5 pixels within a square generally inscribed in the inner side of a circle with a diameter of 7 pixels to linear interpolation resampling to a vector group of 3×3 pixels.

Figure 14:
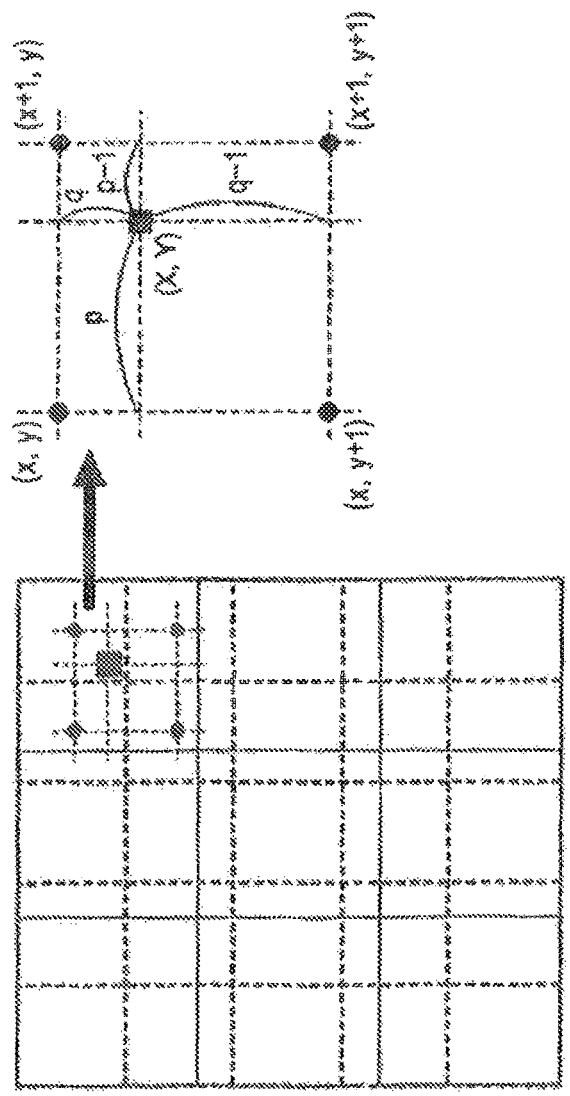
FIG. 14 is a diagram illustrating a resampling example.

The linear interpolation resampling is performed specifically, as shown in FIG. 14, by computing the pixel values of a resampled image with the distance ratio from four original image pixels in the vicinity thereof using the following expression.

$$f(X,Y)=(1-q)\cdot[(1-p)\cdot f(x,y)+p\cdot f(x+1,y)]+q\cdot[(1-p)\cdot f(x,y+1)+p\cdot f(x+1,y+1)] \quad (10)$$

In the above-mentioned expression, (X,Y) is the pixel of the resampled image, (x,y), (x+1,y), (x,y+1), and (x+1,y+1) are original image pixels near the resampled image (X,Y), f(a,b) is the pixel value of coordinates (a,b), and p and q are, as shown in FIG. 14, the distance ratio in the x coordinate direction and y coordinate direction from the neighborhood pixels to the resampled image (X,Y).

Thus, the respective components x, y of the vector subjected to dimensional degeneracy are applied to the respective dimensions of a feature vector, thereby obtaining the feature quantity of type 2. In the case of performing resampling to a 3×3 vector group using linear interpolation resampling, 18 (=3×3×2)-dimensional feature quantity is obtained.

Note that in a case wherein the target image size after resampling is not greater than a half of the original image size, an error at the time of resampling can be reduced by reducing the original image 0.5 times at a time to obtain the minimum image of a multiplier size of 0.5 times which is greater than the target size, and performing the resampling of Expression (10) from the obtained image. For example, in the case of creating an image having a size 0.2 times the size of the original image by linear interpolation resampling, an image having a size 0.25 times the size of the original image obtained by subjecting the original image to 0.5 times resampling twice is subjected to the linear interpolation resampling of Expression (10).

In step S26, the feature quantity extracting unit 123 determines whether or not all feature points have been processed, and in the case of an unprocessed feature point existing, returns the processing to step S17, and executes the subsequent processing repeatedly. In a case wherein determination is made in step S26 that all feature points have been processed (in a case wherein the processing in steps S17 through S25 has been performed regarding all feature points), in step S27 the feature point extracting unit 122 determines whether or not all resolution images have been processed. In the case of an unprocessed resolution image existing, the processing returns to step S13, and the subsequent processing is repeatedly executed. In a case wherein determination is made that the processing in steps S13 through S25 has been performed regarding all resolution images, in step S28 the multiplex image generating unit 121 determines whether or not all registered images have been processed. In the case of an unprocessed registered image existing, the processing returns to step S11, and the subsequent processing is repeatedly executed. In a case wherein determination is made that the processing in steps S11 through S25 has been performed regarding all registered images, the processing proceeds to step S29.

In step S29, the registered image dictionary registering unit 24 subjects the feature point feature quantity thus extracted to labeling, and registers this in a correlated manner with the registration ID of the registered image from which the feature point feature quantity has been extracted. In this case, labeling is performed such that of the multiplex resolution image group of the registered image of each registration ID, the feature quantity of which feature point, extracted from which scale, of which image can be referenced, and is registered in the registered image dictionary registering unit 24.

As described above, the feature quantity group of registered image corresponding to the target object to be recognized is registered in the registered image dictionary registering unit 24 beforehand.

In the case of the recognition unit 23 including both of the learning unit 111 and recognition unit 112, the recognition unit 112 can employ the registered image dictionary registering unit 24 as is. In the case of the learning unit 111 and recognition unit 112 being configured as different image processing devices, the registered image dictionary registering unit 24 in which necessary information has been registered as described above is implemented in the image processing device 11. Note that an arrangement may be made wherein with the image processing device 11, the registered image dictionary registering unit 24 is not implemented, and the registered image dictionary registering unit 24 externally provided is employed by cable or wireless communication.

Next, description will be made with reference to FIG. 15 regarding the overall of the general object recognition processing by the recognition unit 23, and the overlapping detection processing for detecting the position of an overlapped area by the image comparing unit 28.

Figure 15:
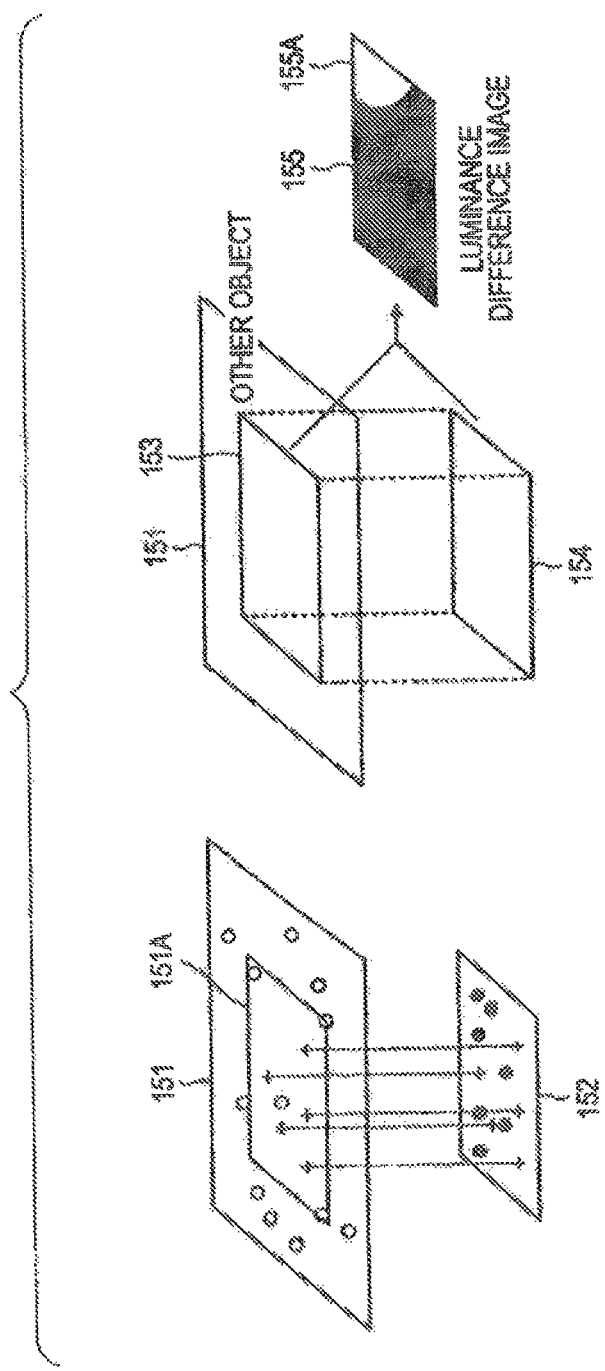
FIG. 15 is a diagram for describing the overalls of general object recognition processing and overlapping detection processing.

In FIG. 15, the left side illustrates the overall of the general object recognition processing for recognizing the target object within an input image by the recognition unit 23, and the right side illustrates the overall of the overlapping detection processing by the image comparing unit 28.

As shown in the left side of FIG. 15, with the general object recognition processing, the feature quantity of each feature point extracted from an input image 151, and the feature quantity of each feature point extracted from an registered image 152 are compared, and based on the comparison result thereof a target object 151A is recognized. Note that in FIG. 15, the crosses represent a feature point matched between the input image 151 and registered image 152. Also, the white circles represent a feature point of the input image 151 not matched with a feature point of the registered image 152, and a black circle represents a feature point of the registered image 152 not matched with a feature point of the input image 151.

The details of this general object recognition processing will be described with reference to later-described FIGS. 23 through 25, but with the general object recognition processing, the target object 151A corresponding to the registered image 152 where feature points more than predetermined number (e.g., three) matched with the input image 151 is recognized. Accordingly, even if a part of the target object 151A is hidden by another object by a finger or the like being overlapped, as long as feature points more than a predetermined number matched with the registered image 152 exist in the input image 151, the target object 151A can be recognized.

Accordingly, with the overlapping detection processing, as shown in the right side of FIG. 15, the position of an overlapped area can be detected based on the difference between the registered luminance value of the processed registered image 154 after luminance correction, and the object luminance value of the object area image 153 after grayscale conversion and size conversion, of the input image 151 where the target object is recognized by the general object recognition processing.

Specifically, with the overlapping detection processing, from a luminance difference image 155 representing the difference between the registered luminance value of the processed registered image 154 and the object luminance value of the object area image 153 as a luminance value, an area where the luminance value of the luminance difference image 155 is greater than a predetermined threshold, i.e., the position of a region 155A wherein the object luminance value and registered luminance value are not matched is detected as the position of an overlapped area.

As described above, with the overlapping detection processing, an overlapped area is detected by the difference between the object area image 153 and processed registered image 154, so even in a case wherein another object hiding the target object is not moving, the area hidden by the other object, i.e., the position of the overlapped area can be detected.

Next, description will be made with reference to FIG. 16 regarding the overall of processing from obtaining of an input image until detection of the position of an overlapped area at the image processing device 11.

Figure 16:
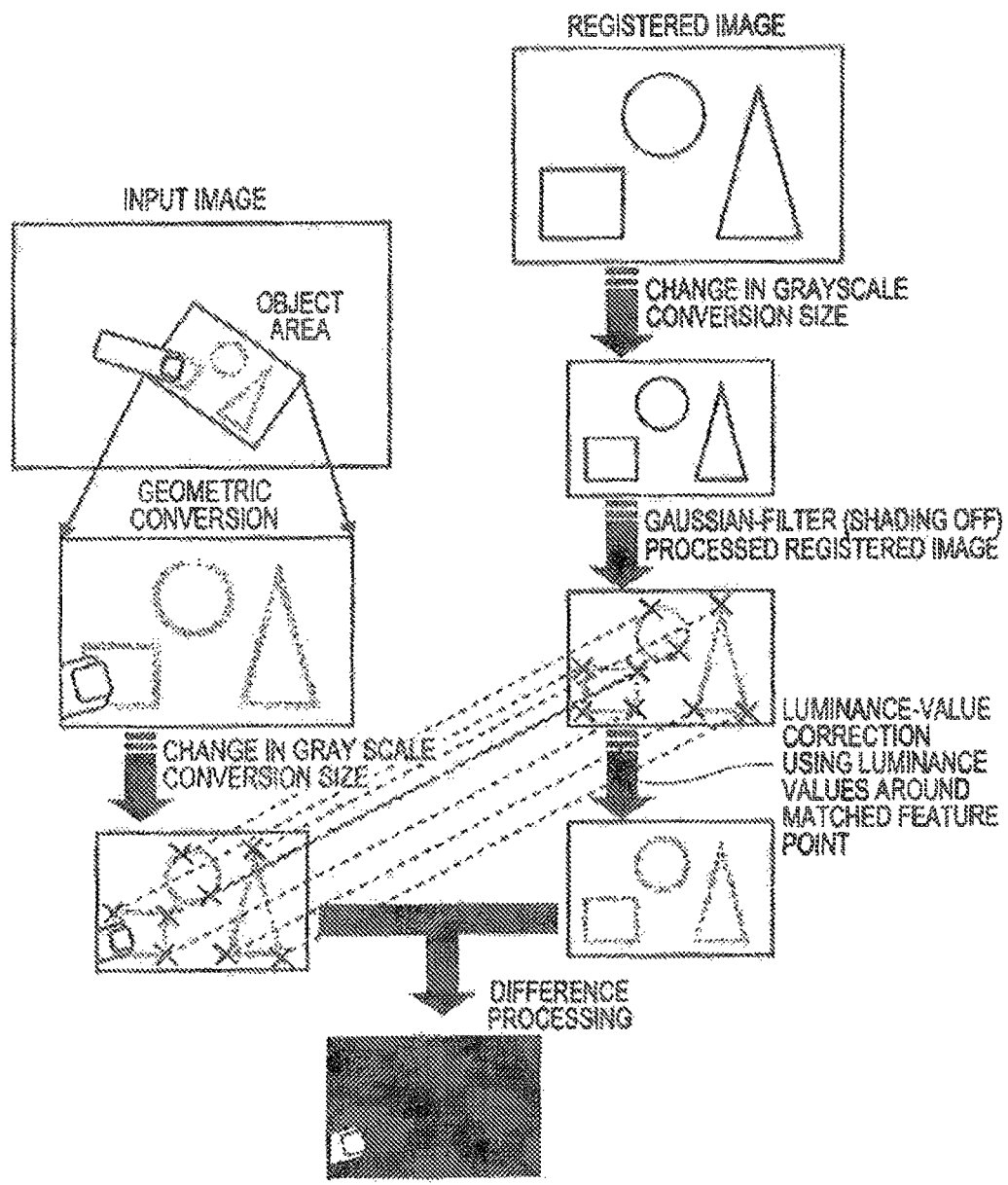
FIG. 16 is a diagram for describing the overall of processing at the image processing device.

As shown in FIG. 16, with the image processing device 11, the target object is recognized from an input image, and in accordance with object parameters obtained as a result thereof, an object area within the input image is determined. Subsequently, with the image processing device 11, geometric conversion is performed as to the object area image thereof, the object area image after geometric conversion is converted into grayscale. Also, the size of the object area image after geometric conversion is changed so as to be the same size as the size of a processed registered image.

On the other hand, a registered image is converted into grayscale, reduced to a predetermine size, and subjected to shading-off processing by a Gaussian filter or the like. The processed registered image obtained as a result thereof is registered in the registered image dictionary registering unit 24. Subsequently, the difference between luminance values at the periphery of a feature point matched by the recognition processing, which are apparently not hidden by another object between the processed registered image and the object area image after grayscale conversion and size conversion, is employed to correct the registered luminance value of the processed registered image such that the object luminance value of the object area image of an area not hidden by another object is identical to the registered luminance value.

Subsequently, a luminance difference image is generated, which represents the difference between the object luminance value of the object area image after grayscale conversion and size conversion, and the registered luminance value of the processed registered image after correction as a luminance value, and the position of an area where the luminance value of the luminance difference image thereof is greater than a predetermined threshold is detected as the position of an overlapped area.

As described above, with the image processing device 11, the registered luminance value is corrected such that the object luminance value of the object area image of an area not hidden by another object is identical to the registered luminance value, and the position of an overlapped area is detected by the difference between the registered luminance value after correction and the object luminance value, whereby robustness as to luminous surroundings can be enhanced at the overlapping detection processing.

Next, the image processing by the image processing device 11 will be described with reference to the flowcharts shown in FIGS. 17 and 18. This image processing is started, for example, when the user instructs to start the image processing.

In step S111, the thread creating unit 22 creates a general object recognition thread. In step S112, the image obtaining unit 21 obtains the imaged image imaged by the imaging unit 12 as an input image. Subsequently, the image obtaining unit 21 supplies the input image to the thread creating unit 22 and icon generating unit 31.

In step S113, the recognition unit 23 performs general object recognition processing. The details of this general object recognition processing will be described later with reference to FIGS. 23 through 25, but in the case of the target object corresponding to a registered image from the input image by the general object recognition processing, the registration ID and object parameters of the registered image thereof are output from the recognition unit 23.

In step S114, the geometric conversion unit 26 determines whether or not an object has been recognized by the general object recognition processing, i.e., whether or not the registration ID and object parameters have been supplied from the recognition unit 23. In a case wherein determination is not made in step S114 that an object has been recognized by the general object recognition processing, the processing proceeds to step S129 in FIG. 18.

On the other hand, in a case wherein determination is made in step S3114 that an object has been recognized by the general object recognition processing, in step S115 the geometric conversion unit 26 obtains the registration ID supplied from the recognition unit 23 as a result of the general object recognition processing. This registration ID is supplied to the image synthesizing unit 32. Also, the geometric conversion unit 26 reads out the icon ID corresponding to the registration ID thereof from the registered image dictionary registering unit 24 as the icon ID corresponding to the target object, and supplies this to the icon generating unit 31.

In step S116, the geometric conversion unit 26 obtains the object parameters supplied from the recognition unit 23 as a result of the general object recognition processing. The object parameters are also supplied to the image synthesizing unit 32.

In step S117, the geometric conversion unit 26 determines an object area within the input image in accordance with the object parameters supplied from the recognition unit 23, and subjects the object area image to geometric conversion. Subsequently, the geometric conversion unit 26 supplies the registration ID supplied from the recognition unit 23, and the object area image after geometric conversion to the image correcting unit 27.

In step S118, based on the registration ID supplied from the geometric conversion unit 26 the image correcting unit 27 reads out and obtains the processed registered image corresponding to the registration ID thereof from the registered image dictionary registering unit 24.

In step S119, the image correcting unit 27 converts the object area image supplied from the geometric conversion unit 26 into grayscale, and changes the size of the object area image after conversion to the same size as the size of the processed registered image.

In step S120 of FIG. 18, the image correcting unit 27 employs the registered luminance value and object luminance value on the periphery of a feature point matched at the general object recognition processing by the recognition unit 23 to correct the registered luminance value such that the registered luminance value and object luminance value on the periphery of the feature point thereof become the same. Subsequently, the image correcting unit 27 supplies the processed registered image after correction of the registered luminance value, and the object area image after grayscale conversion and size conversion to the image comparing unit 28.

In step S121, the image comparing unit 28 subjects the registered luminance value of the processed registered image and the object luminance value of the object area image to difference processing for obtaining difference, and detects the position of an area where the luminance value of a luminance difference image representing the difference thereof as a luminance value is greater than a predetermined threshold as the position of an overlapped area. Subsequently, the image comparing-unit 28 supplies the overlapped position information to the command determining unit 29 and icon generating unit 31.

In step S122, the image comparing unit 28 determines whether or not the target object has been recognized for the first time since the image processing has been started, i.e., whether or not the processed registered image and object area image have been input from the image correcting unit 27 for the first time since the image processing has been started.

In a case wherein determination is made in step S122 that the target object has been recognized for the first time since the image processing has been started, in step s123 the image comparing unit 28 employs the object area image to extract a luminance approximate area which is a luminance area approximating to the luminance of an object estimated as another object wherein an overlapping with the target object is detected, and supplies this to the icon generating unit 31.

In step S124, based on the icon ID supplied from the recognition unit 23, and the overlapped position information and luminance approximate area supplied from the image comparing unit 28 the icon generating unit 31 dispose an icon on an area other than the overlapped area represented by the overlapped position information, and the luminance approximate area, of the object area.

Figure 19:
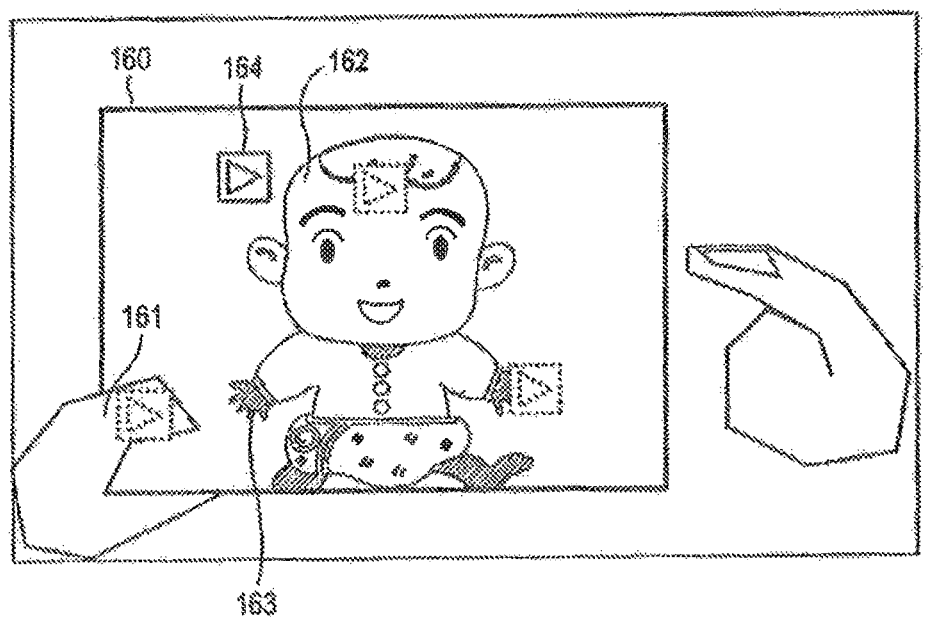
FIG. 19 is a diagram for describing the layout of icons.

Specifically, based on the icon ID, overlapped position information, and luminance approximate area, the icon generating unit 31 determines the position of an area other than the overlapped area and the luminance approximate area, of the object area as the position of an icon to be disposed on the target object. For example, as shown in FIG. 19, in a case wherein a state in which a photo 160 including a child dressed in Western clothes is held in the hands has been imaged, for example, upon the photo 160 having been recognized as the target object by the general object recognition processing, the position of an area other than an area 161 of the hand holding the photo, an area 162 of the child's face which is a luminance approximate area in the case of estimating operations by a finger, and an area 163 of exposed skin, which is an overlapped area detected at the time of the target object being recognized for the first time, is determined as the position of an icon 164.

Subsequently, the icon generating unit 31 supplies the icon position information to the command determining unit 29, and supplies the icon position information, icon ID, and input image to the image synthesizing unit 32.

As described above, with the image processing device 11, no icon is disposed on an overlapped area where another object was already overlapped at the time of the target object being recognized for the first time, and a luminance approximate area which is a luminance area approximating to the luminance of an object estimated as another object where overlapping with the target object is detected, whereby robustness of the overlapping detection processing can be enhanced.

In step S125, based on the icon position information and icon ID supplied from the icon generating unit 31 the image synthesizing unit 32 synthesizes the icon image and the input image supplied from the icon generating unit 31 to generate a synthetic image where the icon is disposed on the target object within the input image. Subsequently, the image synthesizing unit 32 supplies the synthetic image to the image display unit 33.

In step S126, the image display unit 33 displays the synthetic image supplied form the image synthesizing unit 32, and the processing proceeds to step S129.

On the other hand, in a case wherein determination is not made in step S122 that the target object has been recognized for the first time since the image processing started, i.e., in a case wherein recognition of the target object has been performed not less than twice since the image processing started, in step S127 based on the overlapped position information supplied from the image comparing unit 28, and the icon position information supplied from the icon generating unit 31 the command determining unit 29 determines whether or not overlapping has been detected at the icon.

Specifically, based on the overlapped position information and icon position information the command determining unit 29 determines whether or not the icon is disposed on the overlapped area. Subsequently, in the case of the icon being disposed on the overlapped area, the command determining unit 29 determines that overlapping has been detected at the icon, and in the case of no icon being disposed on the overlapped area, the command determining unit 29 determines that overlapping has not been detected at the icon.

In a case wherein determination is made in step S127 that overlapping has not been detected at the icon, the processing proceeds to step S129.

Also, in a case wherein determination is made in step S127 that overlapping has been detected at the icon, the command determining unit 29 supplies the command information of the icon wherein overlapping has been detected to the command issuing unit 30. Subsequently, in step S128, the based on the command information supplied from the command determining unit 29 the command issuing unit 30 issues the command represented with the command information thereof.

For example, in FIG. 19, in a case wherein the registered image corresponding to the photo 160 is a moving image, and the icon 164 is an icon for playing the moving image corresponding to the photo 160, the command issuing unit 30 issues a command for playing the moving image serving as the registered image corresponding to the photo 160, and a command for changing the icon 164 to an icon for stopping playback of the moving image corresponding to the photo 160. Subsequently, the processing proceeds to step S129.

In step S129, in response to the elimination information supplied from the recognition unit 23, or the command supplied from the command issuing unit 30, the end determining unit 25 determines whether or not the image processing is to end. In step S129, in a case wherein determination is not made that the image processing is to end, i.e., in a case wherein the elimination information and the command for ending the image processing have not been supplied to the end determining unit 25, the processing returns to step S112 in FIG. 17, and the subsequent processing is repeated.

On the other hand, in a case wherein determination is made in step S129 that the image processing is to end, i.e., in a case wherein the elimination information or the command for ending the image processing has been supplied to the end determining unit 25, the end determining unit 25 supplies end information to the thread creating unit 22. Subsequently, in step S130, in response to the end information supplied from the end determining unit 25, the thread creating unit 22 eliminates the general object recognition thread, and the processing ends.

Note that with the above description, the icon has been synthesized as to the input image itself, but an arrangement may be made wherein the target object within the input image is replaced with a registered image, and the icon is synthesized as to the input image after replacement. In this case, the user can view the target object as a clearer image as compared to the case of the icon being synthesized as to the input image itself.

Also, the image replaced from the target object may not be a registered image but a predetermined image stored beforehand corresponding to a registered image. In this case, an arrangement may be made wherein an image where an icon has already been disposed is stored as a predetermined image, and the image replaced to the predetermined image from the target object is displayed as is as a synthetic image where the icon is disposed.

Next, description will be made with reference to FIGS. 20 through 22 regarding the intellectual training system that can be provided by the image processing device 11.

Figure 20:
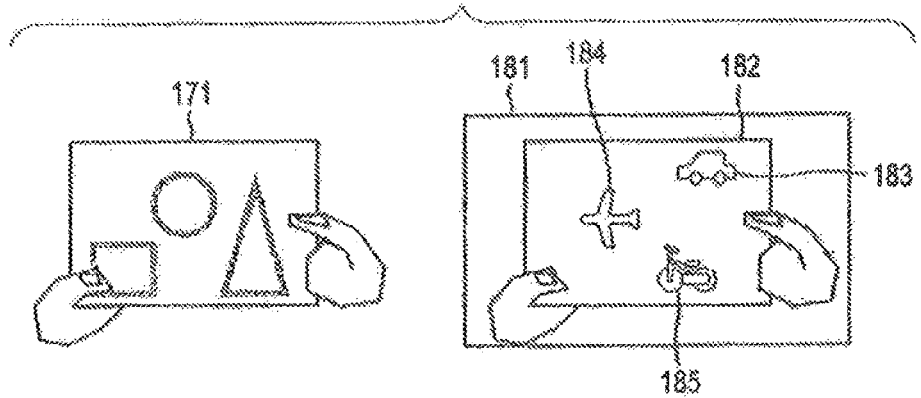
FIG. 20 is a diagram for describing an intellectual training system which can be provided by the image processing device.
Figure 21:
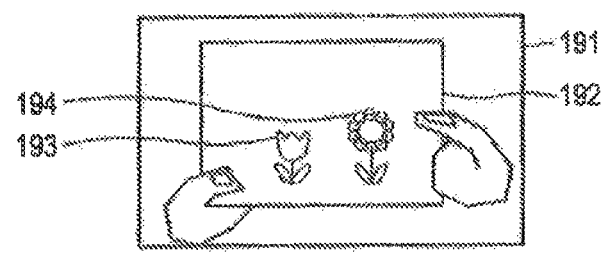
FIG. 21 is a diagram for describing an intellectual training system which can be provided by the image processing device.
Figure 22:
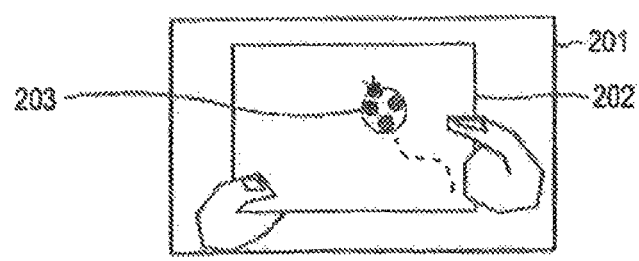
FIG. 22 is a diagram for describing an intellectual training system which can be provided by the image processing device.

With the intellectual training system shown in FIGS. 20 through 22, a card 171 for intellectual training on which the picture corresponding to a registered image is printed is provided to a user. As shown in the left side of FIG. 20, the user holds the card 171 in the hands to hold this against the imaging unit 12, and instructs to start the image processing. The image processing device 11 recognizes the card 171 as the target object, and as shown in the right side of FIG. 20, replaces the card 171 within an input image 181 with a predetermined image 182 stored beforehand corresponding to the card 171. Subsequently, as shown in the right side of FIG. 20, the image processing device 11 displays an automobile-shaped icon 183, an airplane-shaped icon 184, and a bicycle-shaped icon 185 on the image 182.

Note that with the image processing device 11, voice such as "which is a car?" has also been registered corresponding to a registered image, and the voice thereof is output from an unshown speaker along with the display of the icons 183 through 185.

Subsequently, the user puts a finger on the position on the card 171 corresponding to the display position of an icon, of the icons 183 through 185, of which the shape is assumed to be an automobile shape. Based on the input image 181, registered images, and icon position information the image processing device 11 detects overlapping at the icons 183 through 185, and in the case of overlapping at the icon 183 having an automobile shape has been detected, outputs a command for outputting voice representing a correct answer, and controls the unshown speaker to output the voice representing a correct answer.

Also, when the user holds another intellectual training card (not shown) in the hands to hold this against the imaging unit 12, and instructs to start the image processing, as shown in FIG. 21, similar to the case shown in FIG. 20, the image processing device 11 replaces the card within an input image 191 with an image 192 stored beforehand corresponding to the card thereof, and displays a tulip-shaped icon 193 and sunflower-shaped icon 194 on the image 192 thereof.

At this time, the image processing device 11 outputs voice such as "which is a tulip?" registered corresponding to a registered image from the unshown speaker. Subsequently, the user puts a finger on the position on the card corresponding to the display position of an icon of which the shape is assumed to be a tulip shape, of the icons 193 and 194.

Similar to the case shown in FIG. 20, in a case wherein the image processing device 11 has detected overlapping at the tulip-shaped icon 193, outputs a command for outputting voice representing a correct answer, and controls the unshown speaker to output the voice representing a correct answer.

Further, when the user holds another intellectual training card (not shown) in the hands to hold this against the imaging unit 12, and instructs to start the image processing, as shown in FIG. 22, the image processing device 11 replaces the card within an input image 201 with a moving image 202, which has been stored beforehand corresponding to the card thereof, where a ladybug-shaped icon 203 with a motion is disposed.

At this time, the image processing device 11 outputs voice such as "Please catch a moving ladybug." registered corresponding to a registered image from the unshown speaker. Subsequently, the user puts a finger on the position on the card which is assumed to be the display position of the ladybug-shaped icon 203.

Based on the input image 201, registered images, and movement of the icon 203 which has been stored beforehand the image processing device 11 detects overlapping at the icon 203, and in the case of detecting overlapping, outputs a command for outputting voice representing a correct answer, and controls the unshown speaker to output the voice representing a correct answer.

Also, though not shown in the drawing, the following intellectual training system can be provided by the image processing device 11. With this intellectual training system, the user draws pictures of an automobile and bicycle, the card thereof is imaged at the imaging unit 12, and the imaged image is registered in the registered image dictionary registering unit 24 with the imaged image as a registered image.

At this time, the user registers the position of the bicycle on the card, and the bell sound of a bicycle serving as audio corresponding to the bicycle thereof, and the position of the automobile on the card, and the horn sound of an automobile serving as audio corresponding to the automobile thereof, in a correlated manner with the registered image.

Subsequently, the user holds the card on which the pictures of the bicycle and automobile are drawn to hold this against the imaging unit 12, and instructs to start the image processing. Based on the image, registered image of the card thereof, and the positions of the bicycle and automobile on the card the image processing device 11 detects overlapping at the automobile or bicycle, and in the case of detecting overlapping at the bicycle, outputs the bell sound of the bicycle from the unshown speaker. Also, in the case of detecting overlapping at the automobile, the image processing device 11 outputs the horn sound of the automobile from the unshown speaker.

Next, description will be made regarding the general object recognition processing at the recognition unit 23 shown in FIG. 2 with reference to the flowcharts shown in FIGS. 23 through 25.

In steps S331 through S347, the multiplex resolution generating unit 131, feature point extracting unit 132, and feature point extracting unit 133 perform, with an input image input at this time as an input image to be processed, the same processing as to the target input image thereof as the processing in steps S11 through S27 at the multiplex resolution generating unit 121, feature point extracting unit 122, and feature point extracting unit 123, of the learning unit 111. The description thereof will be redundant, so will be omitted. Note however, the structure of a multiplex resolution image determined by the parameters N and a at the time of recognition differs from that at the time of learning.

While the multiplex resolution generating unit 121 generates a multiplex resolution image at the time of learning with a wide scale-factor range and fine precision, the multiplex resolution generating unit 131 generates a multiplex resolution image with rough precision at the time of recognition. Specifically, while the parameters applied to the present embodiment are N=10 and $\alpha$=1 at the time of learning in step S12, the parameters are N=2 and $\alpha$=0.5 at the time of recognition in step S332. The reason thereof will be shown below.

(1) In order to improve recognition precision, it is desirable to perform feature quantity comparison using feature point feature quantity information as much as possible. That is to say, it is desirable to extract as many feature points as possible from multiplex resolution images.

(2) In order to obtain robustness of scale change, it is desirable to widen a scale range regarding the structure of a multiplex resolution image as wide as possible.

(3) There is no need to put emphasis on a real time property so much at the time of learning of registered images, whereby the number of multiplex resolution images of a registered image can be increased, and the scale range can be widened to extract and hold feature point feature quantity.

(4) With the present embodiment, with regard to each feature point feature quantity extracted from the target input image, comparison of feature quantities is performed using k-Nearest Neighbor (k-NN) search (described later) of a kd tree constructed from all feature points and feature quantity of all registered images, so the calculation cost necessary for comparison of feature quantities increases in proportion to the number of feature points extracted from the target input image, but as to the number of registered image feature points calculation cost can be suppressed to the order of log n (i.e., O(log n)) if we say that in the case of constructing a kd tree from all registered images, all registered image feature points are n.

(5) Also, on the other hand, real time property at the time of recognition is considered to be important, so there is a need to reduce calculation cost by reducing the number of multiplex resolution images as few as possible.

(6) However, employing the target input original image alone without generating multiplex resolution images from the target input image makes impossible recognition of the target object thereof in the case of the size of a registered image within the target input image being larger than the size of the original registered image.

Figure 26:
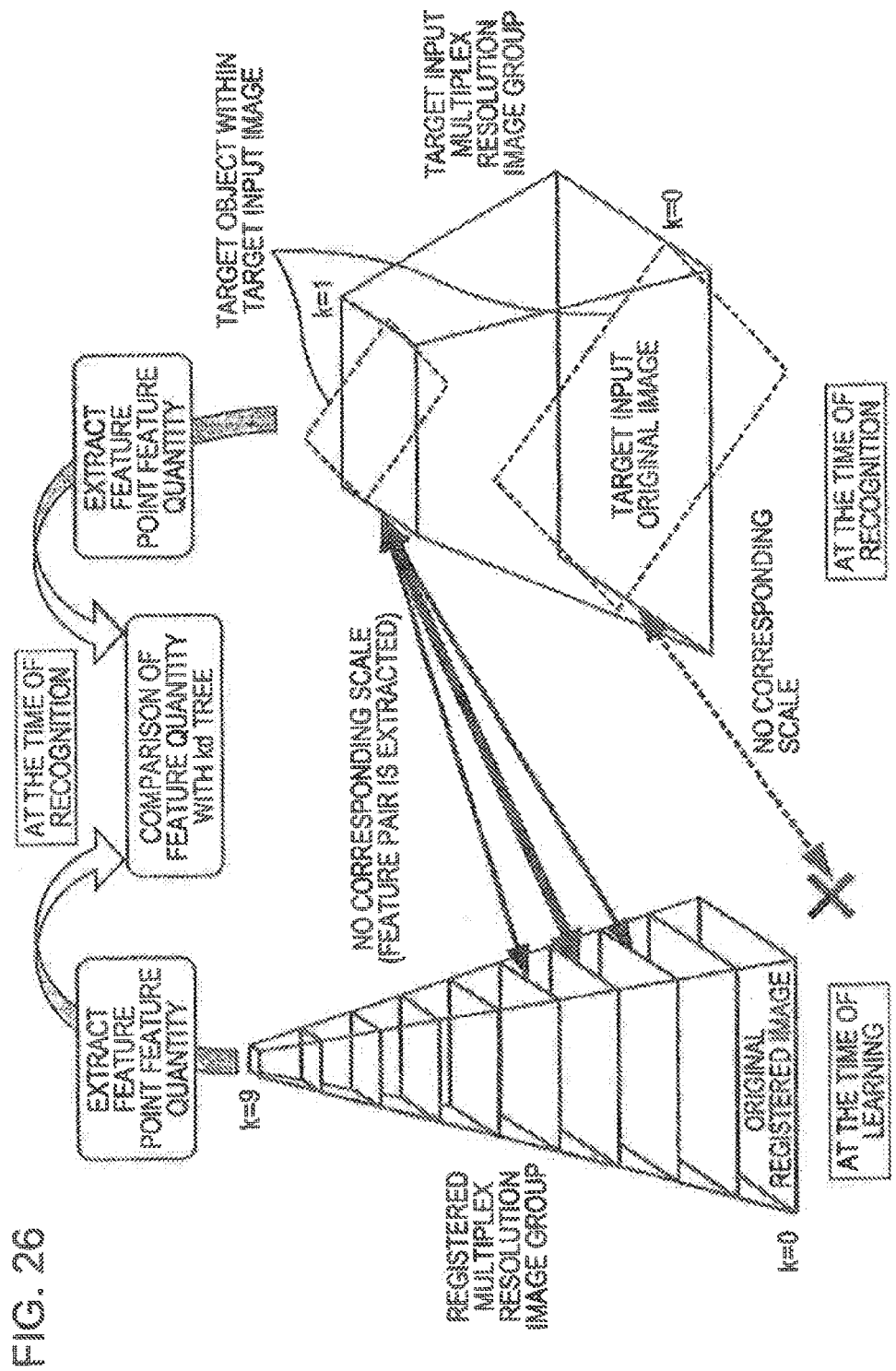
FIG. 26 is a diagram for describing multiplex resolution at the time of learning and at the time of recognition.

From the above reasons, as shown in FIG. 26, from the registered images at the time of learning, more multiplex resolution image groups are generated with a wider range (N=10, $\alpha$=0.1), and more feature points are extracted, but on the other hand, at the time of recognition, from the target input image, the minimum essential (of k=0, 1) multiplex resolution image groups are generated (N=2, $\alpha$=0.5), feature points are extracted therefrom, comparison of feature quantities is performed by applying the k-NN search on the kd tree, thereby enabling recognition with excellent precision to be realized without increasing calculation cost. FIG. 26 illustrates that the original registered image is too great in size, and there is no target object of class of the corresponding scale size, but the original registered image (k=0) is reduced 0.5 times (k=1), thereby finding the target object of class of the corresponding scale size.

In a case wherein the processing in steps S331 through S345 has been performed regarding all feature points and all resolution images, the processing proceeds to step S348.

As described later, each feature point feature quantity (concentration gradient vector group subjected to dimensional degeneracy) extracted form the target input image are compared to each feature point feature quantity of a registered image, and is combined with similar registered image feature point feature quantity as a candidate for the corresponding feature point group. The simplest feature quantity comparing method is all searches. That is to say, the simplest method is that each feature point feature quantity of the target input image is subjected to similarity calculation between feature quantities as to all feature points feature quantities of all registered images, and the corresponding feature point group is selected according to the similarity thereof. Note however, the method using all searches is not practical from the perspective of calculation cost, and consequently, with the embodiments of the present invention, in order to search data from massive amounts of data groups, there is employed a tree search method employing a data structure called a kd tree (J. H. Friedman, J. L. Bentley, R. A. Finkel, "An algorithm for finding best matches in logarithmic expected time," ACM Transactions on Mathematical Software, Vol. 3, pp. 209-226, September 1977). This "kd tree" means a "k-dimensional tree structure".

In a case wherein of the registered images registered in the registered image dictionary registering unit 24 at the learning process so far, there is a need to recognize a part of the registered images, in step S348 the kd-tree constructing unit 134 constructs a kd tree from all of the feature points feature quantities only regarding the registered images to be recognized. With the present embodiment, 36d trees (k=36) of the feature quantity of type 1, and 18d trees (k=18) of the feature quantity of type 2 are constructed, respectively. With each leaf (terminal node) of a tree, one feature point feature quantity is held along with a label whereby the feature quantity thereof is the feature quantity of which feature point, extracted from which scale, of which image, of the multiplex resolution image group of registered images of which registration ID can be referenced.

On the other hand, in the case of recognizing all registered images registered in the registered image dictionary registering unit 24, the tree is reconstructed each time a registered image is additionally learned, and the tree itself is registered in the registered image dictionary registering unit 24. In this case, the construction processing of a kd tree in step S348 is omitted.

The feature quantity comparing unit 135 selects an unprocessed feature point of the target input image in step S349. In step S350, the feature quantity comparing unit 135 combines the feature point feature quantity of the type 1 of the target input image and the feature points feature quantities of k similar registered images as a pair group. Similarly, in step S351, the feature quantity comparing unit 135 combines the feature point feature quantity of the type 2 of the target input image and the feature points feature quantities of k similar registered images as a pair group.

That is to say, each feature point feature quantity of the target input image extracted by the feature point extracting unit 132 and feature quantity extracting unit 133 is combined with k (four in the case of the example shown in FIG. 27) registered image feature points and feature quantities, of which the feature quantities are similar by k-NN search (the value of k of k-NN search and the value of k of the kd tree may be arbitrary different values (of course, may be the same value) though the same character k is used), as a pair group. With the present embodiment, the Euclidean distance of Expression (12) (which represents that the greater the value thereof is, the less similarity is) as dissimilarity employed for k-NN search of the feature quantity of the type 1, and the cosine correlation value shown in Expression (13) as the similarity of the feature quantity of the type 2 are employed, respectively.

$$\text{distance}(u_v, v_v) = \sqrt{\sum_{n=1}^{N}(u_n - v_n)^2} \quad (12)$$

$$\text{similarity}(u_v, v_v) = \frac{1}{2}\left[\frac{u_v \cdot v_v}{\|u_v\|\|v_v\|} + 1\right] \quad (13)$$

However, in Expression (12), $u_v$ and $v_v$ represent feature quantity vectors which are targets for calculating dissimilarity, $u_n$ and $v_n$ represent the values of the n-dimension of $u_v$ and $v_v$, and N represents the number of dimensions of the $u_v$ and $v_v$, respectively.

In Expression (13), $u_v$ and $v_v$ represent feature quantity vectors which are targets for calculating similarity, and $u_v \cdot v_v$ represents the inner product of the vectors. When extracting k pairs (groups) of which the feature quantities are similar, threshold determination as to the dissimilarity (as to the type 1 feature quantity) and similarity (as to the type 2 feature quantity) may be included. The reason why the cosine correlation value is employed as a similarity calculation scale as to the type 2 feature quantity is to prevent the feature quantity from being affected by change in the intensity of local concentration gradient vector due to change in luminance. Also, an arrangement may be made wherein $u_v$ and $v_v$ are normalized with a vector length of 1 instead of the similarity according to the cosine correlation value, and the Euclidean distance thereof is taken as dissimilarity, and as the type 2 feature quantity. In this case as well, the feature quantity is prevented from being affected by change in the intensity of a local concentration vector due to change in luminance.

The feature quantity comparing unit 135 executes the processing in steps S349 through S351 as to the feature points of each target input image. Subsequently, in step S352, the feature quantity comparing unit 135 determines whether or not all feature points have been processed, and in the case of an unprocessed feature point existing, the processing returns to step S34), and the subsequent processing thereof is repeatedly executed. In a case wherein determination is made in step S352 that all feature points have been processed, the processing proceeds to step S353.

As two types of feature quantity of the type 1 and type 2 are employed, the feature quantity comparing unit 135 obtains the feature point pair as to the feature point of the target input image for each feature quantity type using the above-mentioned method, and in step S353 selects only the feature point pair extracted in common with both of the type 1 and type 2 as a candidate for the corresponding feature point group, and is classified for each registered image. Subsequently, this candidate for the corresponding feature point group is supplied to the estimating unit 136 of the subsequent stage. With the estimating unit 136, processing for each registered image is performed, so the extracted candidate for the corresponding feature point group is classified and passed for each registered image, whereby efficiency of the processing can be realized.

Figure 27:
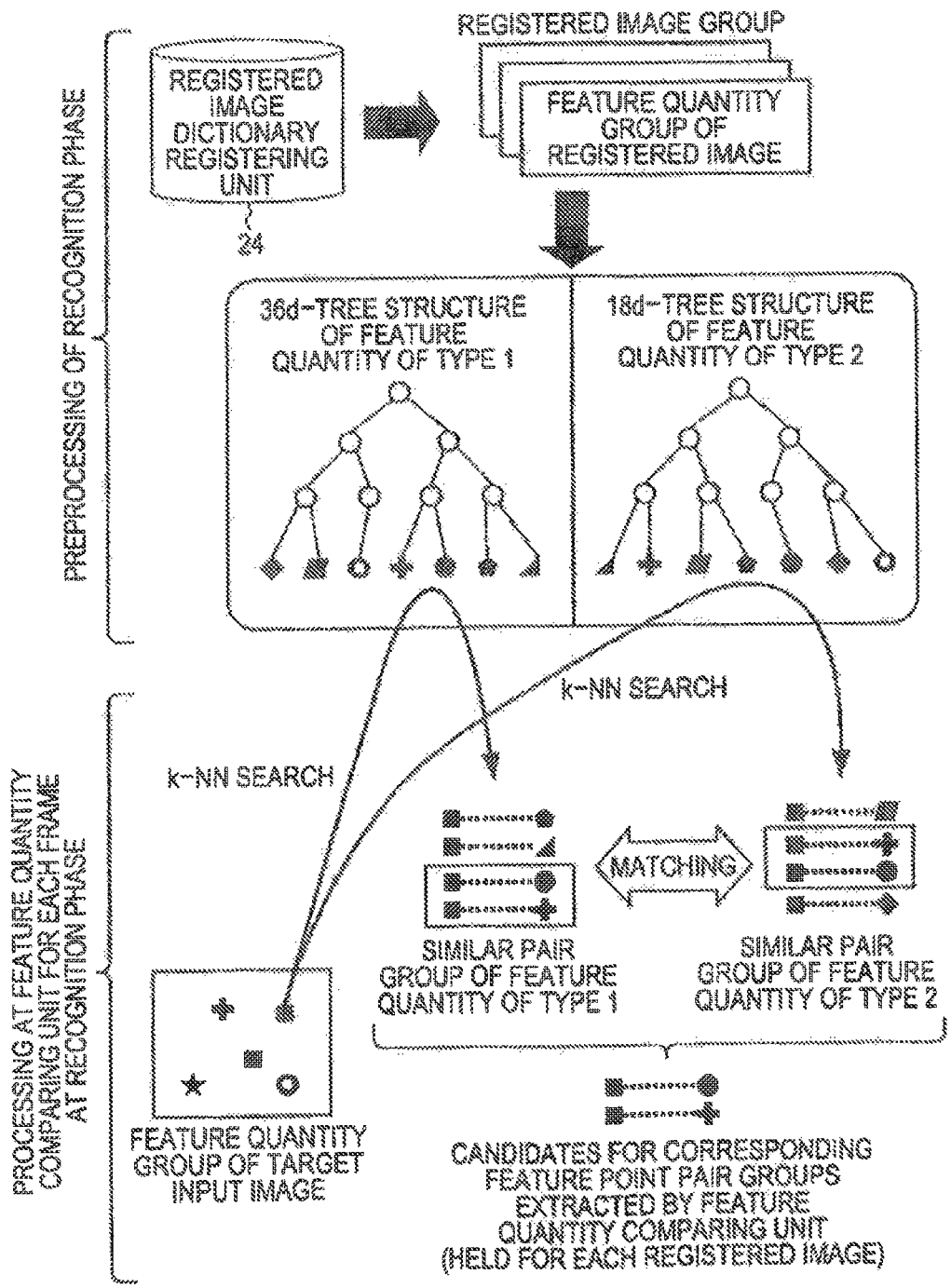
FIG. 27 is for describing feature quantity comparison processing.

FIG. 27 schematically represents the above-mentioned processing. The 36d-tree structure of the type 1 feature quantity, and the 18d-tree structure of the type 2 feature quantity are generated by the kd-tree constructing unit 134. Four similar pair groups of the type 1 feature quantity are searched from the 36d-tree structure of the type 1 feature quantity by k-NN search (k=4 in this case) from the feature quantity group of the target group. With this example, feature points feature quantities represented with squares of the target input image (the shapes of a square, pentagon, triangle, circle, or cross represent feature points feature quantities) are regarded as similar shapes of the pentagon, triangle, circle, or cross of the 35d-tree structure of the type 1 feature quantity, and are searched. Also, four similar pair groups of the type 2 feature quantity are searched by k-NN search. With this example, the squares of the target input image are regarded as similar shapes of the parallelogram, cross, circle, or diamond of the 18d-tree structure of the type 2 feature quantity, and are searched.

Of the four similar pair groups of the type 1 feature quantity, and the four similar pair group of the type 2 feature quantity, common similar pair groups are selected. In the case of this example, the similar pair groups of the type 1 feature quantity are four pair groups of a square and pentagon pair group, square and triangle pair group, square and circle pair group, and square and cross pair group. On the other hand, the similar pair groups of the type 2 feature quantity are four pair groups of a square and parallelogram pair group, square and cross pair group, square and circle pair group, and square and diamond pair group. Accordingly, a square and circle similar pair group, and square and cross similar pair group are feature point pairs common to two types, and are selected as candidates for the corresponding feature point pairs (groups).

Note that, instead of the above-mentioned arrangement wherein one kd tree is constructed from all feature points feature quantities of all registered images to be recognized for each feature quantity type, and k-NN of each feature point feature quantity of the target input image is searched, an arrangement may be made wherein a kd tree is constructed for each feature quantity type for each registered image, and k-NN of each feature point feature quantity of the target input image is searched for each registered image. In either case, the output thereof is candidates for the corresponding feature point pair groups classified for registered image, and later-described processing of the subsequent stage is held in common.

Pair groups having similar local concentration gradient information in the vicinity of a feature point (pair groups of a registered image feature point and target input image feature point) can be extracted by the above-mentioned processing, but as viewed from a macroscopic manner, the pair groups thus obtained include not only "true feature point pairs (inlier)" wherein the spatial position relation between corresponding feature points does not conflict with the position and orientation (target object position and orientation) on the target input image of the target object corresponding to a registered image but also "false feature point pairs (outlier)" wherein the spatial position relation between corresponding feature points conflicts with the position and orientation on the target input image of the target object corresponding to a registered image.

Figure 28:
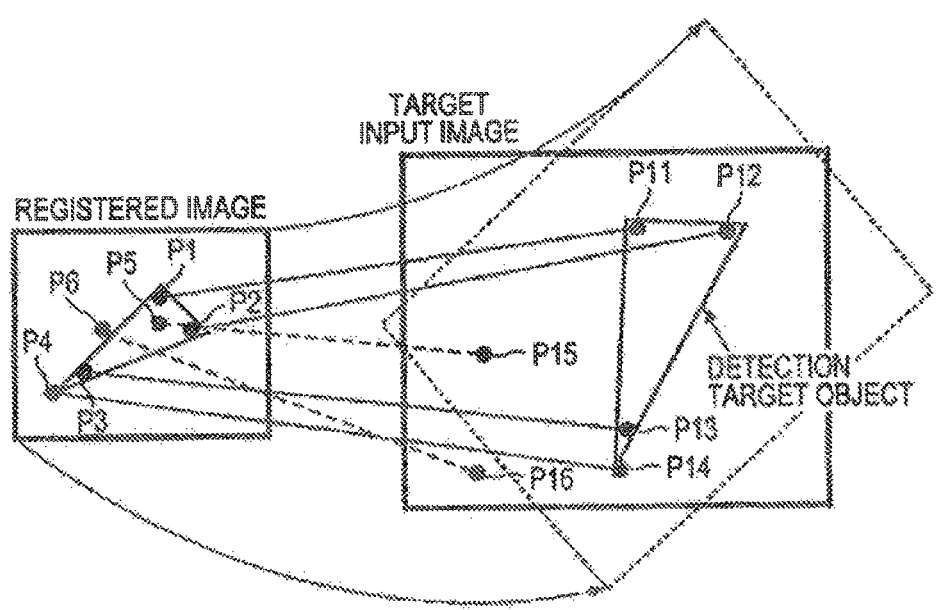
FIG. 28 is a diagram for describing inliers and outliers.

FIG. 28 schematically represents an inlier and outlier. As shown in the drawing, if we say that a triangular registered image shown in the left side in the drawing corresponds to a triangular detection target object of the target input image shown in the right side in the drawing, feature points P1 through P4 in the vicinity of the peaks of the triangular registered image correspond to feature points P11 through P14 of the detection target object, respectively. That is to say, the feature point P1 corresponds to the feature point P11, feature point P2 corresponds to feature point P12, feature point P3 corresponds to feature point P13, and feature point P4 corresponds to feature point P14, respectively. Accordingly, these candidates for the corresponding feature point groups make up inliers. Note that in FIG. 28, the inliers are illustrated with solid lines.

Correspondingly, the feature point P5 of registered image is positioned generally at the center of the inner portion of the triangle, and the feature point P6 is positioned in the outer portion near around the triangle. Correspondingly, the feature point P15 of the target input image pair-grouped with the feature point P5, and the feature point P16 of the target input image pair-grouped with the feature point P6 are points far away from the detection target object. That is to say, the candidates for the corresponding feature point groups of the feature points P5 and P15, and the candidates for the corresponding feature point groups of the feature points P6 and P16 are outliers. Note that in FIG. 28, the outliers are illustrated with dashed lines.

A method for obtaining estimated image conversion parameters by least square estimation can be conceived as a method for deriving object parameters for determining the position and orientation within the target input image of the target object from the candidates for the corresponding feature point groups. With this method, target object position and orientation with high precision can be obtained by repeating processing wherein the corresponding pairs of which the spatial position relation conflicts with that of the target object position and orientation which are the estimation results are eliminated, and the remaining pairs are subjected to estimation image conversion parameter derivation by the least square estimation again.

Note however, it has been known that in the case of a great number of outliers within the candidates for the corresponding feature point groups, and in a case wherein there is an outlier extremely deviated from true image conversion parameters, the estimation results by the above-mentioned least square estimation are generally unsatisfied (Hartley R., Zisserman A., "Multiple View Geometry in Computer Vision," Chapter 3, pp. 69-116, Cambridge University Press, 2000). Accordingly, the estimating unit 136 according to the present embodiment extracts "true feature point pairs (inlier)" from the spatial position relation of the candidates for the corresponding feature point groups, and estimates image conversion parameters for obtaining the position and orientation of the target object using the extracted inliers, under a certain restriction of image conversion.

The estimation processing by the estimating unit 136 is performed for each registered image to be recognized, determination is made whether or not there is the target object corresponding to each registered image, and in the case of presence, estimation of the position and orientation is performed. The candidate for the corresponding feature point group appearing in the following description means a pair group wherein of the candidates for the corresponding feature point groups which are the output of the feature quantity comparing unit 135, only the pairs relating to the relevant registered image are grouped.

Examples of image conversion include Euclidean conversion, similarity transformation, affine transformation, and projective transformation, but with the present embodiment, detailed description will be made regarding the case of performing position and orientation estimation under affine transformation restrictions. As described above, unless there are more than three feature point groups, the affine conversion parameters cannot be computed, so after selecting one unprocessed registered image in step S354, the estimating unit 136 determines in step S355 whether or not there are more than three candidates for the corresponding feature point pairs (groups).

In the cased of two or less candidates for the corresponding feature point groups, in step S356 the estimating unit 136 regards this as that no target object exists in the target input image, or that target object position and orientation detection has been failed, and outputs "inrecognizable". At this time, in step S114 shown in FIG. 17, the geometric conversion unit 26 determines that no object has been recognized in response to "inrecognizable" output from the estimating unit 136.

On the other hand, in the case of more than three candidates for the corresponding feature point groups, the estimating unit 136 can detect the target object position and orientation, so performs estimation of affine transformation parameters. Accordingly, in step S351 the estimating unit 136 performs coordinate conversion. That is to say, the registered image feature point position coordinates of the candidate for the corresponding feature point group are converted into the position coordinates on the original recorded image, and the target input image feature point position coordinates are converted into the position coordinates of the input original image. Subsequently, in step S358, the estimating unit 136 performs estimation processing.

If we say that a pair group P made up of three candidates for the corresponding feature point groups is ($[x_1\ y_1]^\tau$, $[u_1\ v_1]^\tau$), ($[x_2\ y_2]^\tau$, $[u_2\ v_2]^\tau$), and ($[x_3\ y_3]^\tau$, $[u_3\ v_3]^\tau$), the relation between the pair group P and affine conversion parameters can be represented with a linear system shown in the following Expression (14).

$$\begin{bmatrix} x_1 & y_1 & 0 & 0 & 1 & 0 \\ 0 & 0 & x_1 & y_1 & 0 & 1 \\ x_2 & y_2 & 0 & 0 & 1 & 0 \\ 0 & 0 & x_2 & y_2 & 0 & 1 \\ x_3 & y_3 & 0 & 0 & 1 & 0 \\ 0 & 0 & x_3 & y_3 & 0 & 1 \end{bmatrix} \begin{bmatrix} a_1 \\ a_2 \\ a_3 \\ a_4 \\ b_1 \\ b_2 \end{bmatrix} = \begin{bmatrix} u_1 \\ v_1 \\ u_2 \\ v_2 \\ u_3 \\ v_3 \end{bmatrix} \quad (14)$$

When rewriting this Expression (14) such as $Ax_v = b_v$ (the subscript v represents that the character appended thereby (e.g., x of $x_v$) is a vector. This is true for the following), the least square solution of an affine transformation parameter $x_v$ can be given with the following Expression (15).

$$x_v = A^{-1} b_v \qquad (15)$$

In a case wherein the pair group P is selected repeatedly at random from the candidates for the corresponding feature point groups such that one or more outliers are mixed therein, the affine transformation parameters thereof are projected in a scattered manner on the parameter space. On the other hand, in a case wherein the pair group P made up of inliers alone are selected repeatedly at random, any of the affine transformation parameters thereof is extremely similar to the corresponding true affine transformation parameters of the target object position and orientation, i.e., becomes near distance on the parameter space. Accordingly, when repeating the processing wherein the pair group P is selected from the candidates for the corresponding feature point groups at random, and the affine transformation parameters thereof are projected on the parameter space, the inliers form high density (a great number of members) clusters on the parameter space, and the outliers appear in a scattered manner. In other words, when performing clustering on the parameter space, the factors of a cluster having the greatest number of members become inliers.

Figure 29:
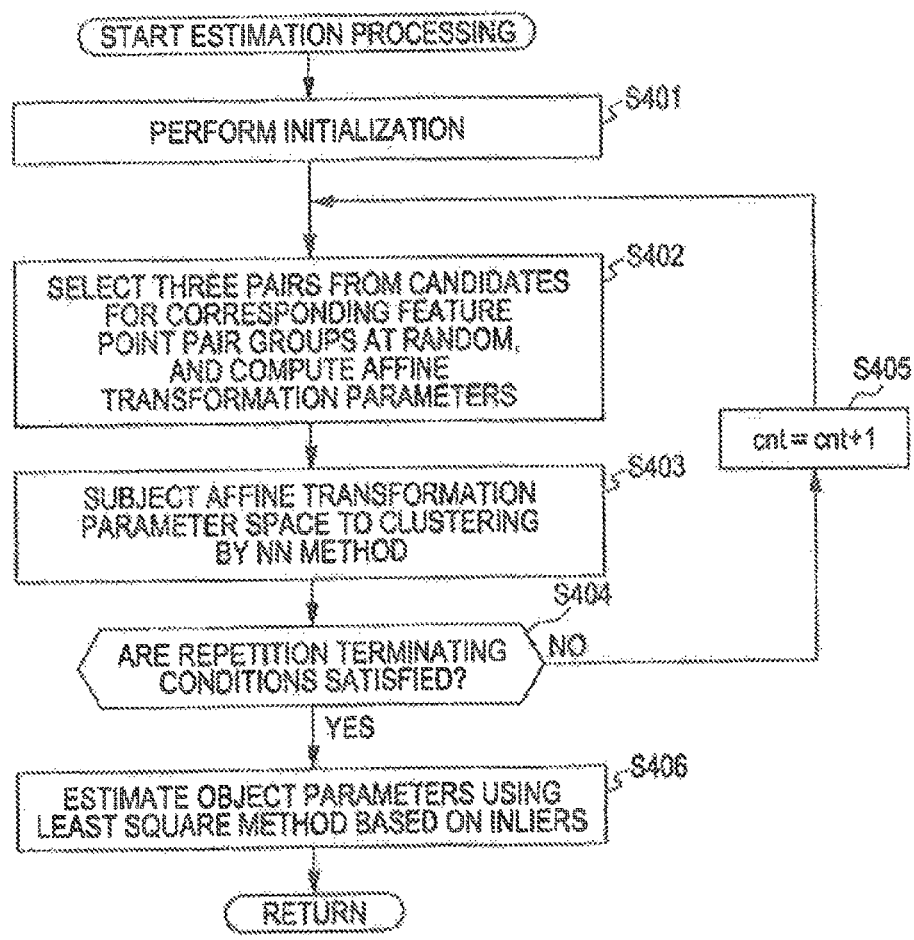
FIG. 29 is a flowchart for describing the details of estimation processing.

The details of the estimation processing at the estimating unit 136 will be described with reference to the flowchart shown in FIG. 29. Note that as the clustering method at the estimating unit 136 a NN (Nearest Neighbor) method is employed. At this time, the above-mentioned parameters $b_1$ and $b_2$ can take a various value depending on a registered image, so selection of a clustering threshold at clustering depends on a registered image even with a space. Accordingly, under a supposition that true parameters and $a_1$ through $a_4$ are similar, but there is almost no pair group P giving affine transformation parameters such that $b_1$ and $b_2$ differ, the estimating unit 136 performs clustering only on the parameter space stipulated by the parameters $a_1$ through $a_4$ (hereafter, described as $a_v$). Note that even if a situation wherein the above-mentioned supposition is not satisfied occurs, clustering is performed on the parameter space stipulated by the parameters $b_1$ and $b_2$ independently from the $a_v$ space, and the result thereof is taken into consideration, whereby this problem can be readily prevented.

First, in step S401, the estimating unit 136 performs initialization. Specifically, a count value cnt serving as a variable representing the number of repetitions is set to cnt=1, three pairs are selected from the candidates for the corresponding feature point groups as a pair group $P_1$, and an affine transformation parameter $a_{v1}$ is obtained. Also, the estimating unit 136 sets a variable N representing the number of clusters to N=1, and creates a cluster $Z_1$ centered on $a_{v1}$ on the affine transformation parameter space $a_v$. The estimating unit 136 sets the centroid $c_{v1}$ of this cluster $Z_1$ to $c_{v1}=a_{v1}$, sets a variable $nz_1$ representing the number of cluster members to $nz_1=1$, and updates the counter value cnt to cnt=2.

Next, in step S402, the estimating unit 136 selects three pairs from the candidates for the corresponding feature point groups at random as a pair group $P_{cnt}$, and calculates an affine transformation parameter $a_{vcnt}$. Subsequently, the estimating unit 136 projects the calculated affine transformation parameter $a_{vcnt}$ on the parameter space.

Next, in step S403, the estimating unit 136 subjects the affine transformation parameter space to clustering by the NN method. Specifically, the estimating unit 136 first obtains the minimum distance $d_{min}$ in accordance with the following Expression (16), of distance $d(a_{vcnt}, c_{vi})$ between the affine transformation parameter $a_{vcnt}$ and the centroid $c_{vi}$ (i=1 through N) of each cluster $Z_i$.

$$d_{min} = \min_{1 \le i \le N}(d(a_{vcnt}, c_{vi})) \qquad (16)$$

Subsequently, if $d_{min} < \tau$ holds as to a predetermined threshold $\tau$ (e.g., $\tau = 0.1$), the estimating unit 136 makes $a_{vcnt}$ belong to the cluster $Z_i$ giving $d_{min}$, and updates the centroid $c_i$ of the cluster $Z_i$ with all members including $a_{vcnt}$. Also, the estimating unit 136 increments the number of members $n_{zi}$ of the cluster $Z_i$ as $n_{zi} = n_{zi} + 1$. On the other hand, if $d_{min} \ge \tau$ holds, the estimating unit 136 creates a new cluster $Z_{N+1}$ wherein $a_{vcnt}$ is set to a centroid $c_{vN+1}$ on the affine transformation space $a_v$, sets the number of clusters $nz_{N+1}$ of the cluster thereof to $nz_{N+1} = 1$, and increments the number of clusters N to N=N+1.

Subsequently, in step S404, the estimating unit 136 determines whether or not a repeat end condition is satisfied. The repeat end condition can be set, for example, such as a case wherein the greatest number of members exceeds a predetermined threshold (e.g., 15), and also the difference between the greatest number of members and the second greatest number of members exceeds a predetermined threshold (e.g., three), or a case wherein the count value cnt of the number of repetitions counter exceeds a predetermined threshold (e.g., 5000 times). In a case wherein determination is made in step S404 that the repeat end condition is not satisfied (in the case of the determination result being No), in step S405 the estimating unit 136 increments the count value cnt of the number of repetition to cnt=cnt+1, and then returns the processing to step S405, and repeats the subsequent processing thereof.

On the other hand, in a case wherein determination is made in step S404 that the repeat end condition is satisfied (in the case of the determination result being Yes), in step S406 the estimating unit 136 determines the number of inliers obtained at the above-mentioned processing, and when the number of obtained inliers is less than three pairs, the estimating unit 136 cannot determine the affine transformation parameter, so outputs the recognition result as "target object undetected", and when the number of extracted inliers is not less than two pairs, based on the inliers estimates the affine transformation parameter for determining the target object position and orientation by the least square method, and outputs this as a recognition result.

If we say that the inliers are $([x_{IN1} \; y_{IN1}]^\tau, [u_{IN1} \; V_{IN1}]^\tau)$, $([x_{IN2} \; y_{IN2}]^\tau, [u_{IN2} \; v_{IN2}]^\tau)$, and so on, the relation between the inliers and affine transformation parameter can be represented with a linear system shown in the following Expression (17).

$$\begin{bmatrix} x_{IN1} & y_{IN1} & 0 & 0 & 1 & 0 \\ 0 & 0 & x_{IN1} & y_{IN1} & 0 & 1 \\ x_{IN2} & y_{IN2} & 0 & 0 & 1 & 0 \\ 0 & 0 & x_{IN2} & y_{IN2} & 0 & 1 \\ & & \cdots & & & \\ & & \cdots & & & \end{bmatrix} \begin{bmatrix} a_1 \\ a_2 \\ a_3 \\ a_4 \\ b_1 \\ b_2 \end{bmatrix} = \begin{bmatrix} u_{IN1} \\ v_{IN1} \\ u_{IN2} \\ v_{IN2} \\ \cdots \end{bmatrix} \qquad (17)$$

When rewriting this Expression (17) such as $A_{IN} x_{VIN} = b_{VIN}$, the least square solution of an affine transformation parameter $x_{VIN}$ can be given with the following Expression (18).

$$X_{VIN} = (A_{IN}^\tau A_{IN})^{-1} A_{IN}^\tau b_{VIN} \qquad (18)$$

In step S406, the estimating unit 136 estimates this affine transformation parameter $x_{VTN}$ as an object parameter. The estimating unit 136 holds this object parameter, and the registration ID corresponding to the registered image selected in immediately previous step S354 in a correlated manner with the object parameter thereof.

Figure 25:
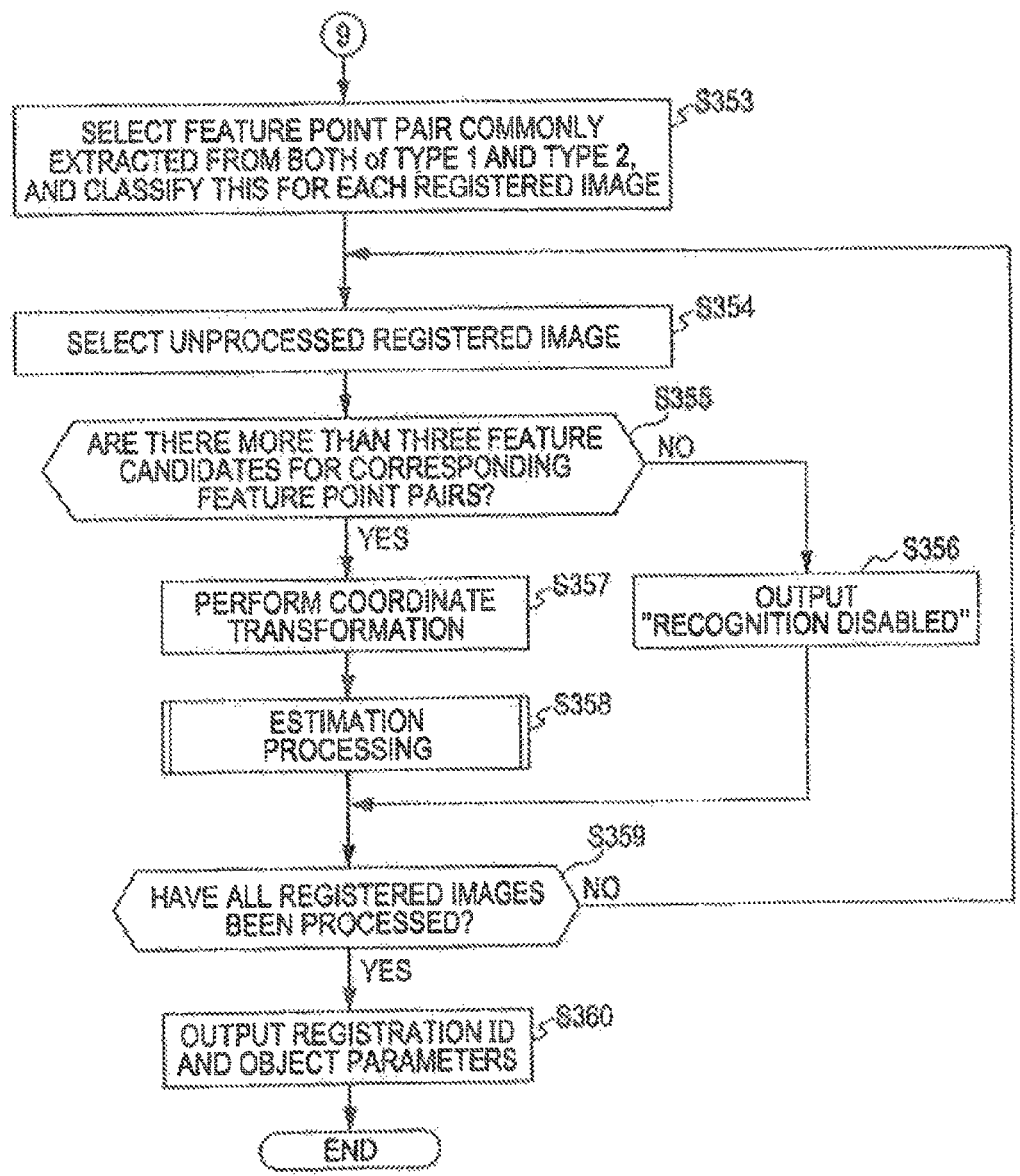
FIG. 25 is a flowchart for describing the general object recognition processing of the recognition unit shown in FIG. 2.

Now, the processing returns to FIG. 25, after the processing in step S358 or S356, in step S359, the estimating unit 136 determines whether or not all registered images have been processed. In the case of an unprocessed registered image existing, the processing returns to step 3354, and the subsequent processing thereof is repeatedly executed. In a case wherein determination is made in step S359 that all registered images have been processed, in step S360 the estimating unit 136 outputs the registration ID and object parameter held in step S406 to a specified area tracking unit 231. Subsequently, the processing ends.

Figure 30:
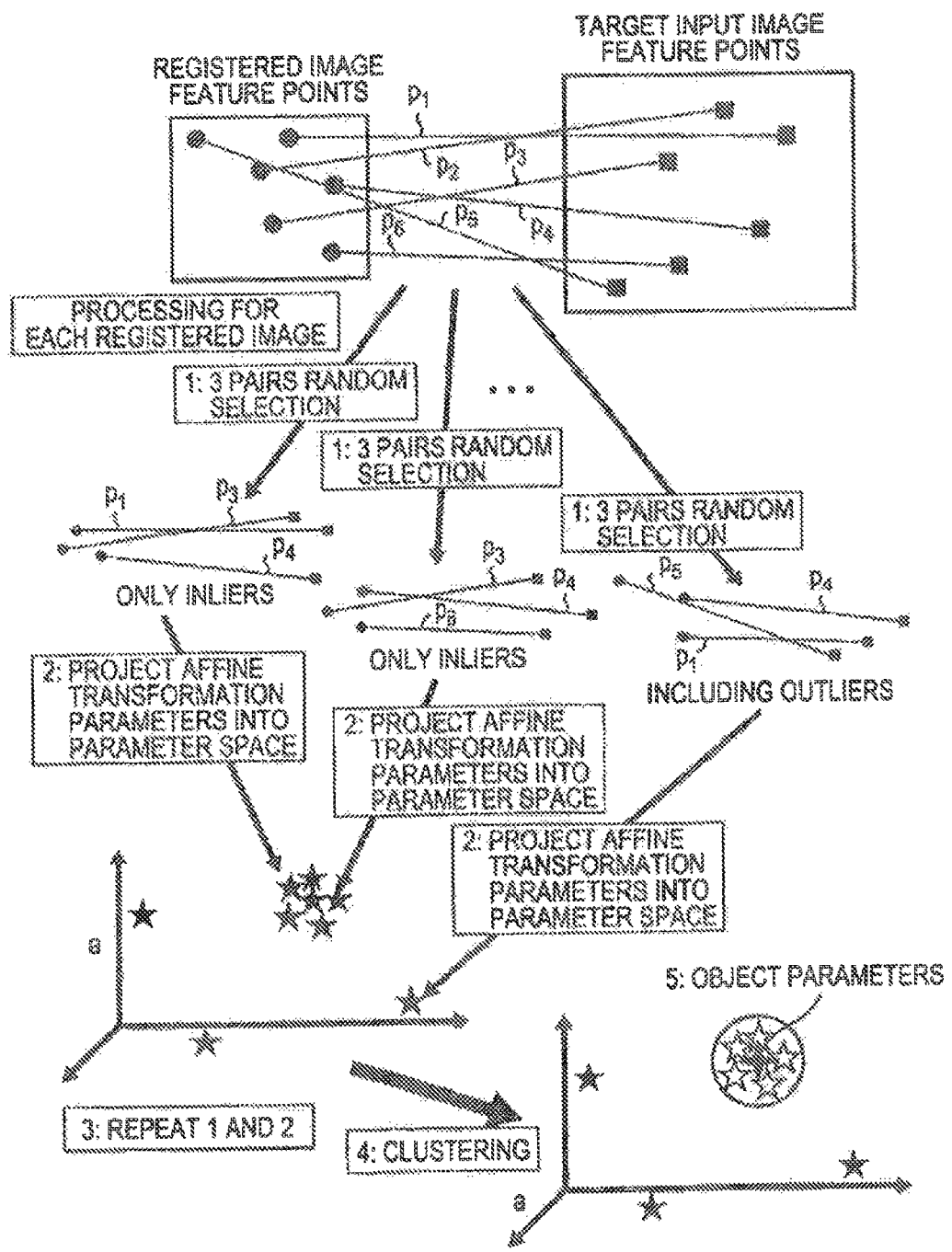
FIG. 30 is a diagram for describing estimation processing.

The above-mentioned processing in steps S354 through S359 shown in FIG. 25 is performed for each registered image to be recognized. This processing is schematically illustrated in FIG. 30. With this example, first, three candidates for the corresponding feature point groups p1, p3, and p4 are selected at random from the candidates for the corresponding feature point groups p1 through p6, and affine transformation parameters calculated based thereon are projected to the parameter space. Next, three candidates for the corresponding feature point groups p3, p4, and p6 are selected at random, and affine transformation parameters calculated based thereon are projected to the parameter space. The same processing is further repeated, and with this example, three candidates for the corresponding feature point groups p5, p4, and p1 are selected, affine transformation parameters are calculated based thereon, and are projected to the parameter space. Subsequently, on the parameter space adjacent affine transformation parameters are subjected to clustering, and the least square method is applied to the affine transformation parameters subjected to clustering, thereby determining object parameters.

Even in a case wherein a great number of outliers are included in the candidates for the corresponding feature point groups, employing the above-mentioned technique enables the outliers to be eliminated, and accordingly, position and orientation estimation (object parameter derivation) can be performed with high precision.

With the above-mentioned embodiments, the details of position and orientation estimation under affine transformation restrictions have been described. Under affine transformation restrictions, if a plane area is dominant, e.g., in the case of a three-dimensional object such as a box, book, or the like, robust position and orientation estimation can be performed as to change in a view point regarding the dominant plane thereof. Note however, in order to perform robust position and orientation estimation of a three-dimensional object where curved faces and protrusions and recesses are dominant, there is a need to extend affine restrictions to projection conversion restrictions. However, in this case as well, the above-mentioned technique can simply be extended only by increasing the number of dimensions to be estimated.

The position and orientation of the target object thus determined are illustrated, for example, with dashed lines in FIGS. 26 and 28. As shown in these drawings, with the present embodiment, not only presence of the target object corresponding to a registered image is detected, but also the position and orientation thereof are also estimated and output in the case of the target object existing.

Note that the position and orientation estimated by the estimating unit 136 mean the relative position and orientation as to the target object of the target input image, so in the case of regarding the position and orientation of the target object as the reference position and orientation, this means that the estimating unit 136 estimates the position and orientation of the target object as to a registered image.

Note that with the above description, an arrangement has been made wherein the threshold $\tau$ is assumed to be a constant value, but when performing the repeat processing in steps S402 through S405, a technique such as a so-called "annealing method" may be applied wherein first, rough extraction of inliers using a relatively great threshold $\tau$ is performed, and a smaller threshold $\tau$ is gradually employed each time the umber of repetitions increases. Thus, inliers can be extracted with high precision.

Also, with the above description, an arrangement has been made wherein processing for selecting a pair group P at random from the candidates for the corresponding feature point groups, and projecting the affine transformation parameters thereof on the parameter space is repeated, and object parameters are estimated by the least square method assuming that the factor of a cluster having the greatest number of members on the parameter space is an inlier, but the present invention is not restricted to this, e.g., the centroid of a cluster having the greatest number of members may be taken as an object parameter. Further, a group may be made up of not less than three feature points.

As described above, the feature point pairs extracted by the feature quantity comparing unit 135 for each registered image are classified for each registered image, and position and orientation estimation is performed for each registered image at the estimating unit 136, whereby recognition of a target object registered image can also be performed even in the case of an image where multiple registered images are included in the target input image.

Note that as described above, with the general object recognition processing, multiple resolution images are generated, comparison of feature quantities is performed regarding all resolution images, so that processing load is relatively great. Also, comparison with the feature quantities of a great number of registered images registered in the registered image dictionary registering unit 24 is performed, so the more the amount of registered images registered in the registered image dictionary registering unit 24 increases, the greater processing load is.

Figure 31:
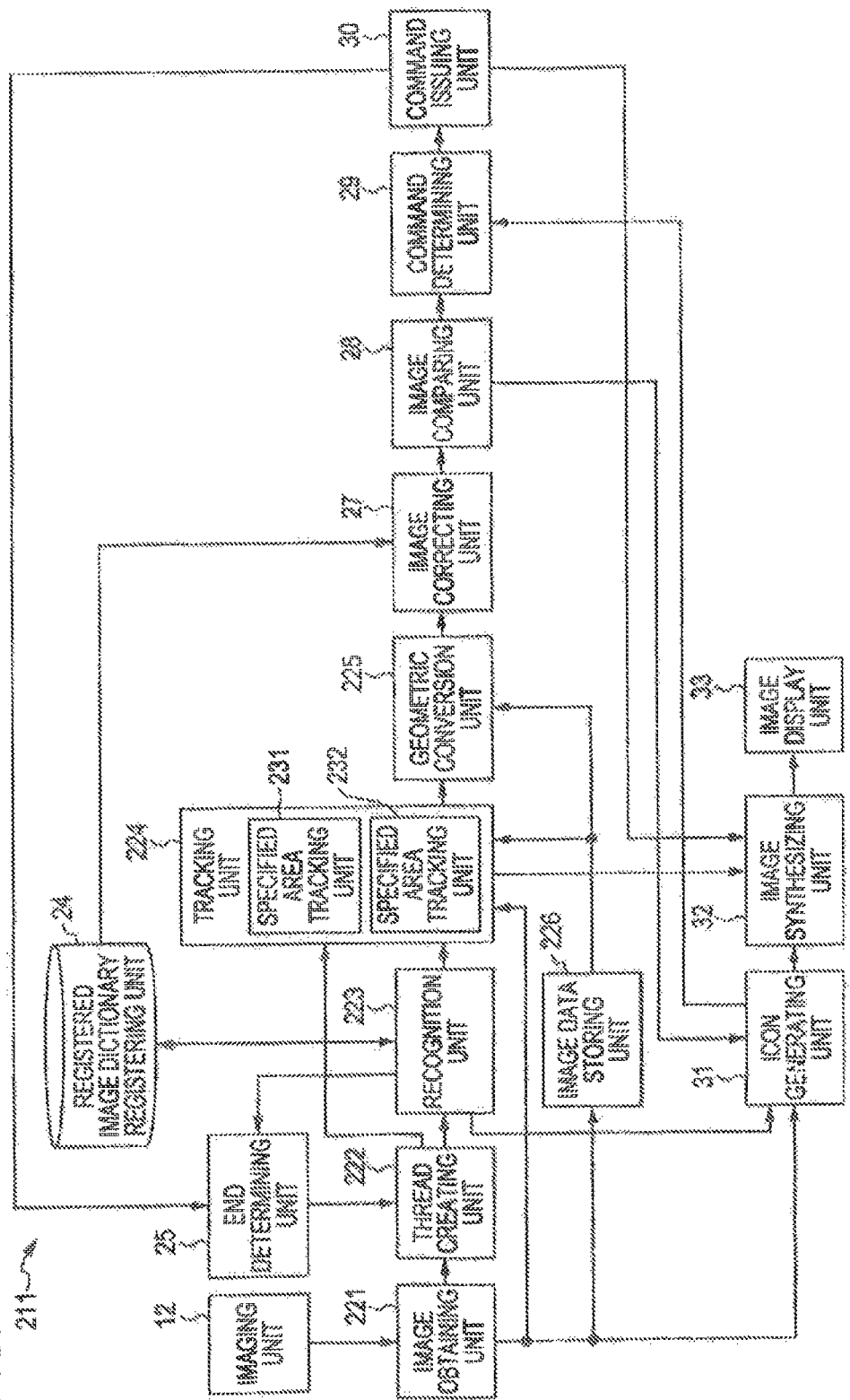
FIG. 31 is a block diagram illustrating the configuration of another embodiment of the image processing device to which an embodiment of the present invention has been applied.

Accordingly, in a case wherein the load of the general object recognition processing is great, and it is difficult to subject each frame of a registered image to tracking in real time, as shown in FIG. 31, an image processing device performs the general object recognition processing every several frames, and with frames other than thereof, obtains object parameters and so forth by performing tracking processing of which the load is small.

Specifically, the image processing device 211 shown in FIG. 31 is configured of an imaging unit 12, registered image dictionary registering unit 24, end determining unit 25, image correcting unit 27, image comparing unit 28, command determining unit 29, command issuing unit 30, icon generating unit 31, image synthesizing unit 32, image display unit 33, image obtaining unit 221, thread creating unit 222, recognition unit 223, tracking unit 224, geometric conversion unit 225, and image data storing unit 226. Note that the same components as those in FIG. 2 are denoted with the same reference numerals, and description thereof will be omitted so as to avoid redundant description.

The image obtaining unit 221 supplies the imaged image supplied from the imaging unit 12 to the icon generating unit 31, thread creating unit 222, tracking unit 224, and image data storing unit 226.

In response to the input image supplied from the image obtaining unit 221, the thread creating unit 222 supplies the input image thereof to the recognition unit 223, and creates a general object recognition thread, and first and second tracking threads. Note that the first and second tracking threads are the tracking processing by the tracking unit 224 being divided into two.

Specifically, the thread creating unit 222 supplies the input image supplied from the image obtaining unit 221 to the recognition unit 223, and instructs the recognition unit 223 for executing the general object recognition thread, and the tracking unit 224 for executing the first and second tracking threads to start the processing.

Also, in response to the end information supplied from the end determining unit 25, the thread creating unit 222 eliminates the general object recognition thread and first and second tracking threads. Specifically, the thread creating unit 222 instructs the recognition unit 23 and tracking unit 24 to end the processing.

The recognition unit 223 is configured generally in the same way as the recognition unit 23 shown in FIG. 2, but outputs not only the registration ID and object parameters obtained as the recognition results but also the frame number of the input image of which the target object has been recognized.

That is to say, similar to the recognition unit 23, the recognition unit 223 performs the general object recognition processing based on the input image supplied from the thread creating unit 222, and the registered images registered in the registered image dictionary registering unit 24. Subsequently, the recognition unit 223 supplies the registration ID corresponding to the target object included in the input image, and object parameters, obtained as the results of the general object recognition processing, and the frame number of the input image thereof to the tracking unit 224.

Also, similar to the recognition unit 23, the recognition unit 223 supplies the icon ID corresponding to the target object to the icon generating unit 31. Further, similar to the recognition unit 23, the recognition unit 223 supplies the elimination information to the end determining unit 25 based on the results of the general object recognition processing.

As described above, the tracking processing is divided into two threads of the first tracking thread and second tracking thread, so the tracking unit 224 is configured of a specified area tracking unit 231 for executing the first tracking thread, and a specified area tracking unit 232 for executing the second tracking thread.

The specified tracking unit 231 reads out the input image of a predetermined number of frames stored in the image data storing unit 226 based on the frame number supplied from the recognition unit 223. The specified area tracking unit 231 specifies an area to be subjected to tracking as a specified area based on the object parameters supplied from the recognition unit 223.

Also, the specified area tracking unit 231 performs tracking on the specified area of the input image of a predetermined number of frames read out from the image data storing unit 226. The specified area tracking unit 231 supplies the registration ID supplied from the recognition unit 223, and the object parameters obtained as the tracking results to the specified area tracking unit 232. The details of the specified area tracking unit 231 will be described later with reference to FIG. 34.

The specified area tracking unit 232 specifies an area to be subjected to tracking as a specified area based on the object parameters supplied from the specified area tacking unit 231. The specified area tracking unit 232 reads out the input image just imaged, supplied from the image obtaining unit 221. The specified area tracking unit 232 subjects the specified area to tracking of the read input image.

Also, the specified area tracking unit 232 supplies the registration ID supplied from the specified area tracking unit 231, the object parameters obtained as the tracking results, and the frame number of the input image supplied from the image obtaining unit 221 to the geometric conversion unit 225. Further, the specified area tracking unit 232 supplies the registration ID and object parameters to the image synthesizing unit 32.

The geometric conversion unit 225 reads out, based on the frame number supplied from the specified area tracking unit 232 of the tracking unit 224, the input image of the frame number thereof from the image data storing unit 226.

Also, the geometric conversion unit 225 determines an object area within the input image read out from the image data storing unit 226 in accordance with the object parameters supplied from the specified area tracking unit 232, and subjects the object area image to geometric conversion. The geometric conversion unit 225 supplies the registration ID supplied from the specified area tracking unit 232, and the object area image after geometric conversion to the image correcting unit 27. The image data storing unit 226 stores the input image supplied from the image obtaining unit 221.

Figure 32:
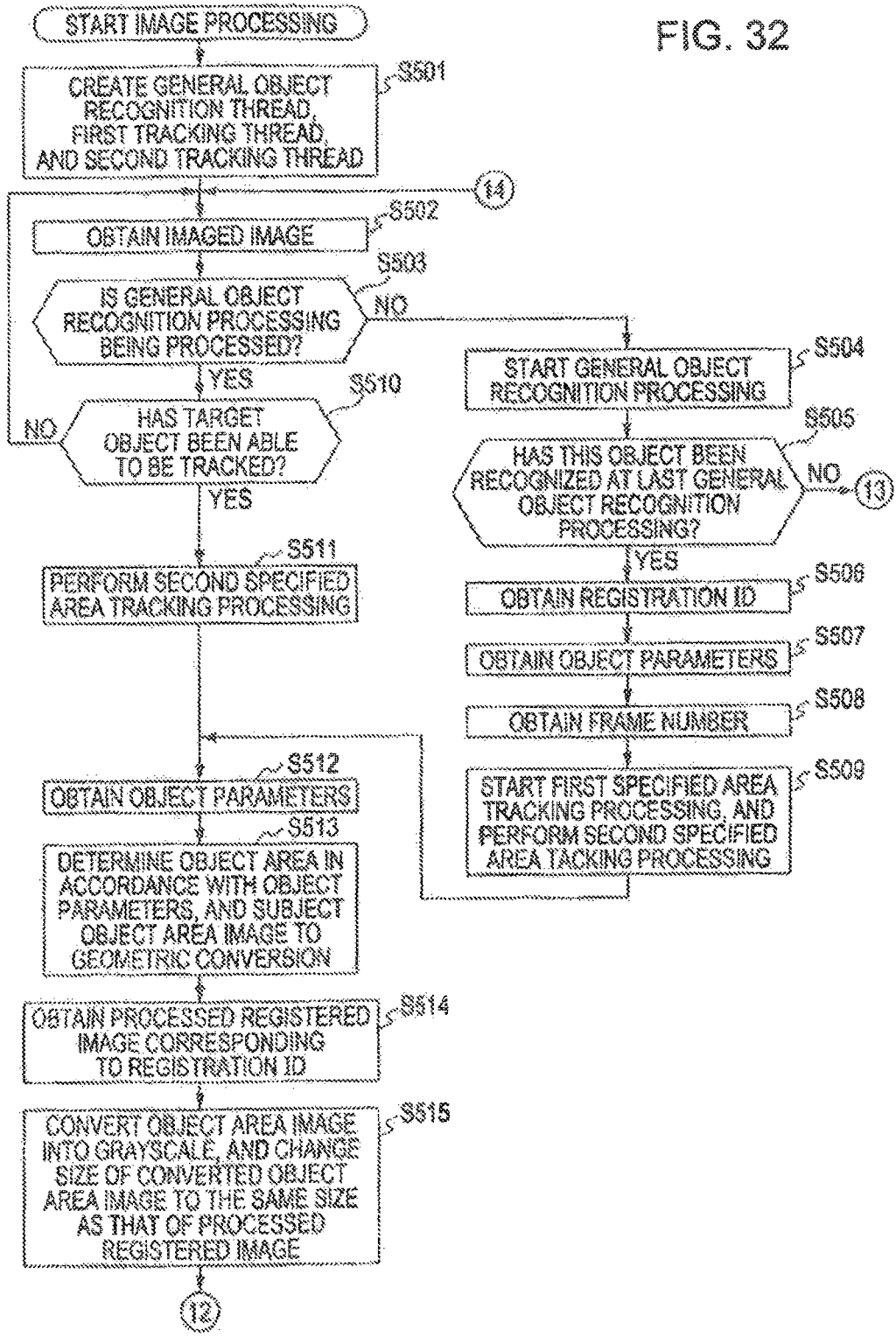
FIG. 32 is a flowchart for describing image processing of the image processing device shown in FIG. 31.

Next, description will be made regarding image processing by the image processing device 211 with reference to the flowcharts shown in FIGS. 32 and 33. This image processing is started, for example, when start of the image processing is instructed by the user.

In step S501, the thread creating unit 222 creates a general object recognition thread, first tracking thread, and second tracking thread.

In step S502, the image obtaining unit 221 obtains the imaged image imaged by the imaging unit 12 as an input image. Subsequently, the image obtaining unit 221 supplies the input image to the icon generating unit 31, thread creating unit 222, tracking unit 224, and image data storing unit 226.

In step S503, the recognition unit 223 determines whether or not the general object recognition processing being processed now. In a case wherein determination is made in step S503 that the general object recognition processing is not being processed, i.e., in a case wherein the first general object recognition processing has not been performed yet, or in a case wherein the one-time general object recognition processing has been completed, the processing proceeds to step S504.

Figure 23:
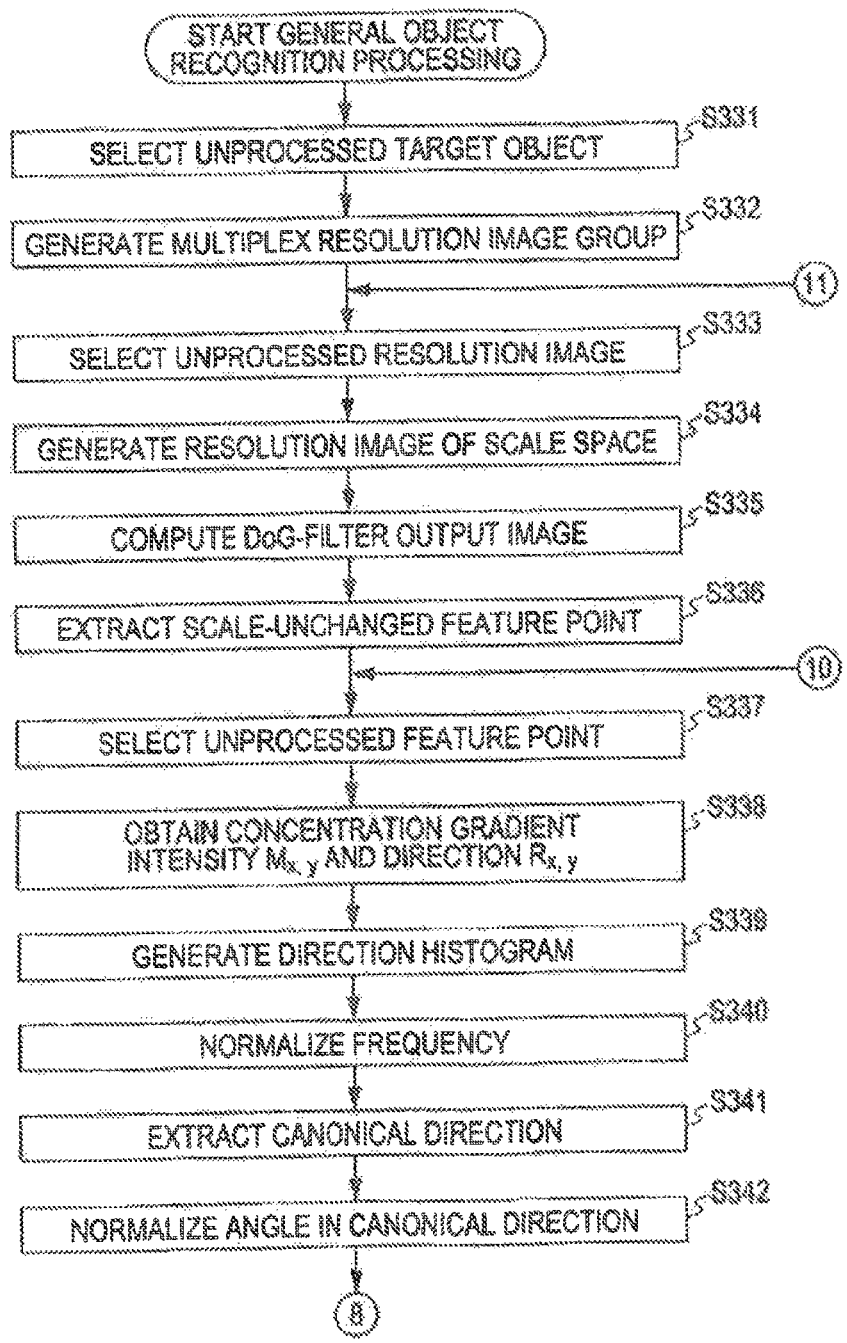
FIG. 23 is a flowchart for describing general object recognition processing of the recognition unit shown in FIG. 2.
Figure 24:
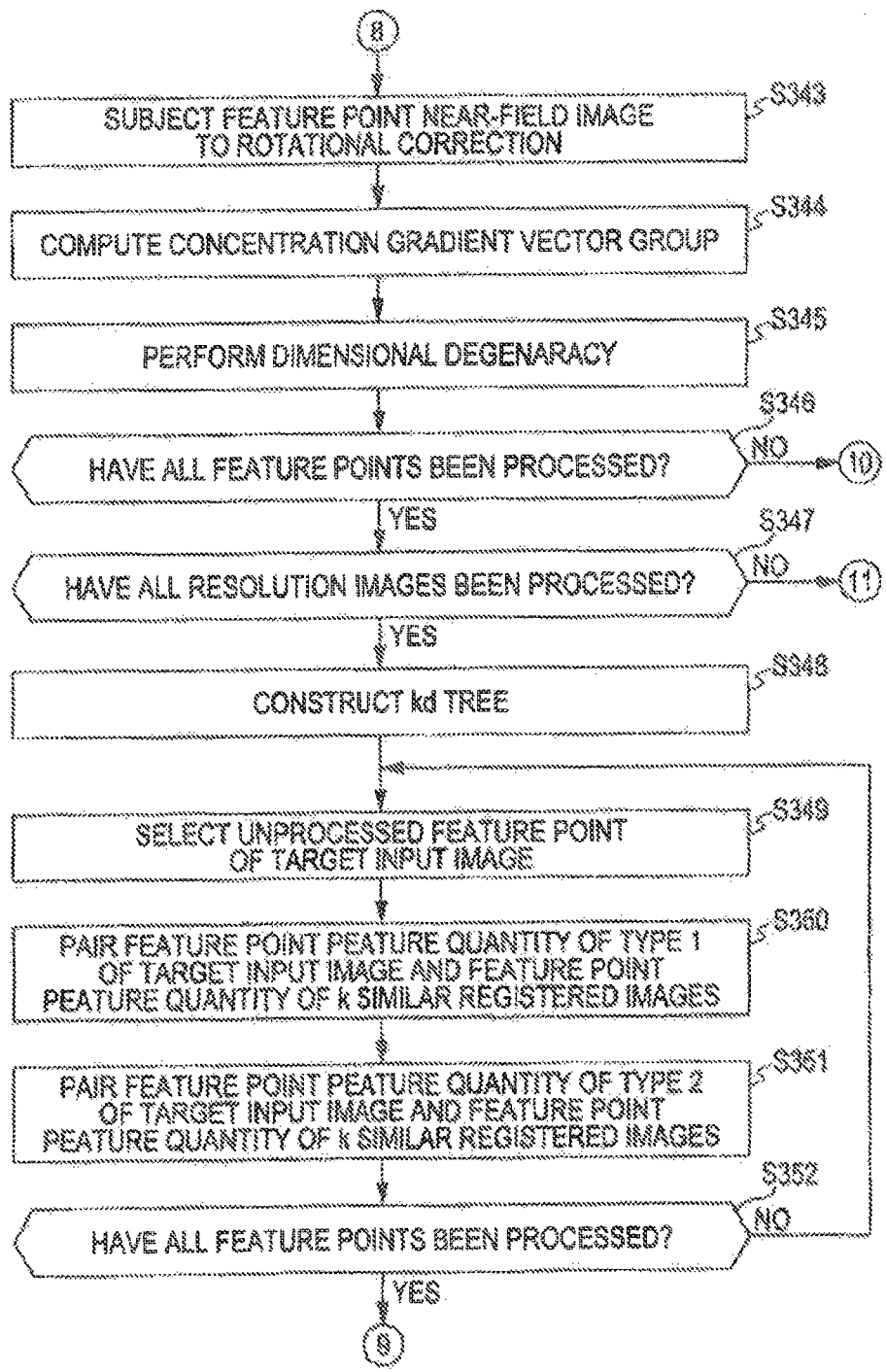
FIG. 24 is a flowchart for describing the general object recognition processing of the recognition unit shown in FIG. 2.

In step S504, the recognition unit 223 starts the general object recognition processing shown in FIGS. 23 through 25. Note however, with the general object recognition processing by the recognition unit 223, in step S360 shown in FIG. 25, the frame number of the input image of which the target object has been recognized is output along with the registration ID and object parameters.

In step S505, the specified area tracking unit 231 determines whether or not an object has been recognized at the previous general object recognition processing.

Figure 33:
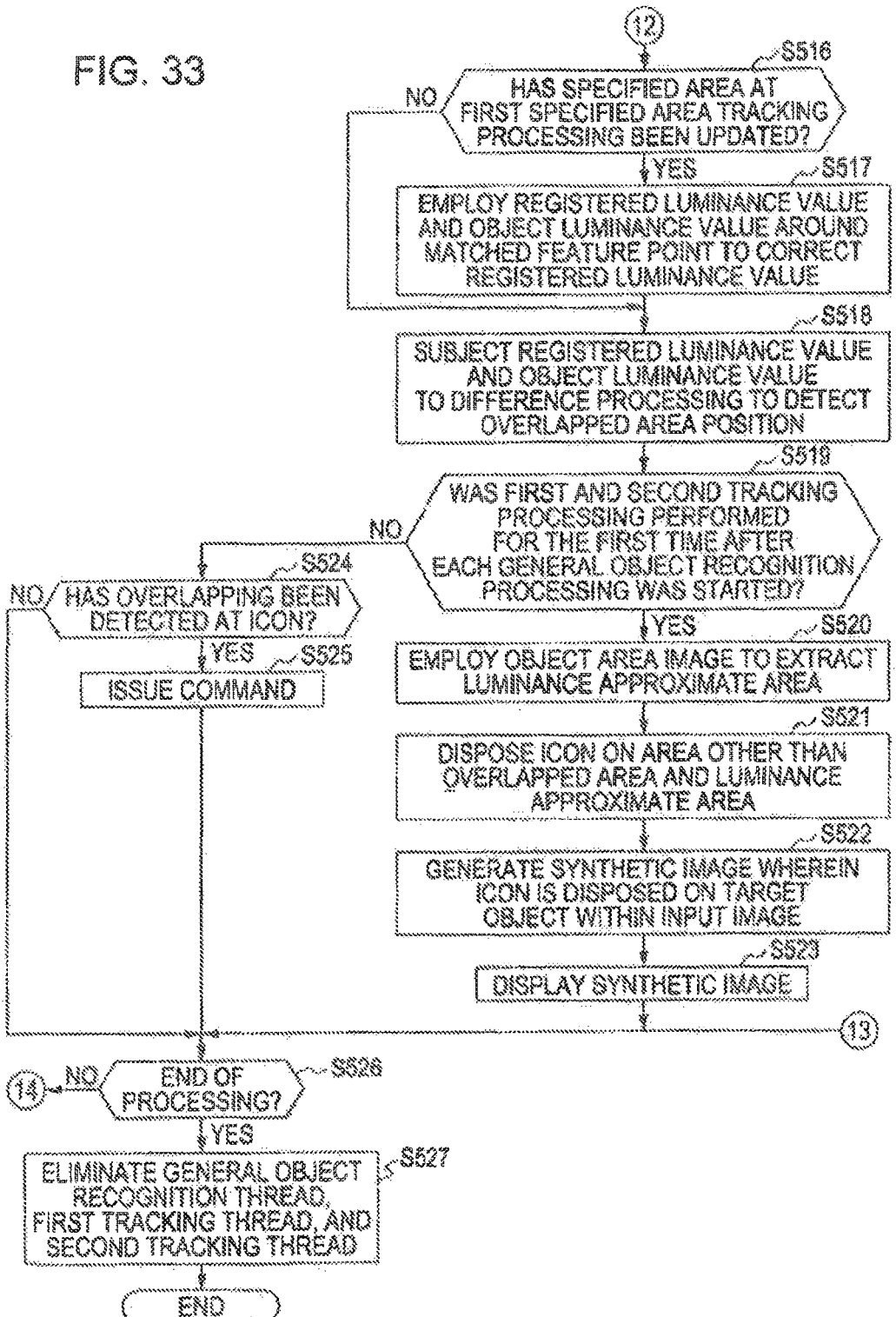
FIG. 33 is a flowchart for describing the image processing of the image processing device shown in FIG. 31.

In a case wherein determination is made in step S505 that an object has not been recognized at the previous general object recognition processing, i.e., in a case wherein in step S356 (FIG. 25) of the previous general object recognition processing "unrecognizable" has been output, the processing proceeds to step S526 shown in FIG. 33.

In a case wherein determination is made in step S505 that an object has been recognized at the previous general object recognition processing, i.e., in a case wherein in step S360 (FIG. 25) of the previous general object recognition processing the registration ID, object parameters, and frame number were output, or in a case wherein the general object recognition processing started in immediately previous step S504 is the first general object recognition processing, the processing proceeds to step S506.

In step S506, the specified area tracking unit 231 of the tracking unit 224 obtains the registration ID output from the recognition unit 223 at the last general object recognition processing. This registration ID is also supplied to the image synthesizing unit 32.

In step S507, the specified area tracking unit 231 obtains the object parameters output from the recognition unit 223 at the last general object recognition processing. In step S508, the specified area tracking unit 231 obtains the frame number output from the recognition unit 223 at the last general object recognition processing.

In step S509, the specified area tracking unit 231 starts first specified area tracking processing for tracking the specified area of the input image of a predetermined number of frames. Also, the specified area tracking unit 232 performs second specified area tracking processing for tracking the specified area of the input image just imaged now.

The details of the first specified area tracking processing will be described with reference to later-described FIG. 35. Also, the details of the second specified area tracking processing will be described with reference to later-described FIG. 40.

On the other hand, in a case wherein determination is made in step S503 that the general object recognition processing is being processed, in step S510 the specified area tracking unit 232 determines whether or not the target object has been able to be tracked at the last second specified area tracking processing, i.e., whether or not "unable to track" has been output at the first specified area tracking processing shown in later-described FIG. 35 or the second specified area tracking processing shown in later-described FIG. 40.

In a case wherein determination is made in step S510 that the target object has not been able to be tracked at the last second specified area tracking processing, the processing returns to step S502, and the above-mentioned processing is repeated.

On the other hand, In a case wherein determination is made in step S510 that the target object has been able to be tracked at the last second specified area tracking processing, in step S511 the specified area tracking unit 232 performs the second specified area tracking processing.

After the processing in step S509 or S511, the processing proceeds to step S512. In step S512, the geometric conversion unit 225 obtains the object parameters supplied from the specified area tacking unit 232 as the result of the second specified area tracking processing. The object parameters are also supplied to the image synthesizing unit 32.

The processing in steps S513 through S515 is the same as the processing in steps S117 through S119 shown in FIG. 17, so description thereof will be omitted.

In step S516 shown in FIG. 33, the image comparing unit 28 determines whether or not the specified area at the first specified area tracking processing has been updated. In a case wherein determination is made in step S516 that the specified area at the first specified area tracking processing has been updated, in step S517 similar to the processing in step S120 shown in FIG. 18, the image correcting unit 27 employs the registered luminance value and object luminance value on the periphery of a feature point matched at the general object recognition processing by the recognition unit 223 to correct the registered luminance value such that the registered luminance value and object luminance value on the periphery of the feature point thereof become the same.

Subsequently, the image correcting unit 27 supplies the processed registered image after the correction of the registered luminance value, and the object area image after grayscale conversion and size conversion to the image comparing unit 28, and the processing proceeds to step S518.

On the other hand, in a case wherein determination is made in step S516 that the specified area at the first specified area tracking processing has not been updated, the processing skips step S517. That is to say, in this case, the image correcting unit 27 supplies the processed registered image of which the registered luminance value has been corrected in the last step S517 to the image comparing unit 28 along with the object area image after grayscale conversion and site conversion. That is to say, correction of the registered luminance value is performed at a rate of once per the one-time general objet recognition processing. Subsequently, the processing proceeds to step S518.

In step S518, similar to the processing in step S121 shown in FIG. 18, the image comparing unit 28 subjects the registered luminance value of the processed registered image and the object luminance value of the object area image supplied from the image correcting unit 27 to difference processing for obtaining difference, and detects the position of an area where the Luminance value of a luminance difference image representing the difference thereof as a luminance value is greater than a predetermined threshold as the position of an overlapped area. Subsequently, the image comparing unit 28 supplies the overlapped position information to the command determining unit 29 and icon generating unit 31.

In step S519, the image comparing unit 28 determines whether or not the first and second tracking processing were performed for the first time since each general object recognition processing started, i.e., whether or not the processed registered image and object area image were input from the image correcting unit 27 for the first time since each general object recognition processing started. In a case wherein determination is made in step S519 that the first and second tracking processing were performed for the first time since each general object recognition processing started, the processing proceeds to step S520.

On the other hand, in a case wherein determination is made in step S519 that the first and second tracking processing were not performed for the first time since each general object recognition processing started, i.e., in a case wherein the first and second tracking processing were performed not less than twice since each general object recognition processing started, the processing proceeds to step S24.

The processing in steps S520 through S526 is the same processing as the processing in steps S123 through S129 shown in FIG. 18, so description thereof will be omitted.

In step S527, in response to the end information supplied from the end determining unit 25, the thread creating unit 222 eliminates the general object recognition thread, first and second tracking threads, and the processing ends.

Figure 34:
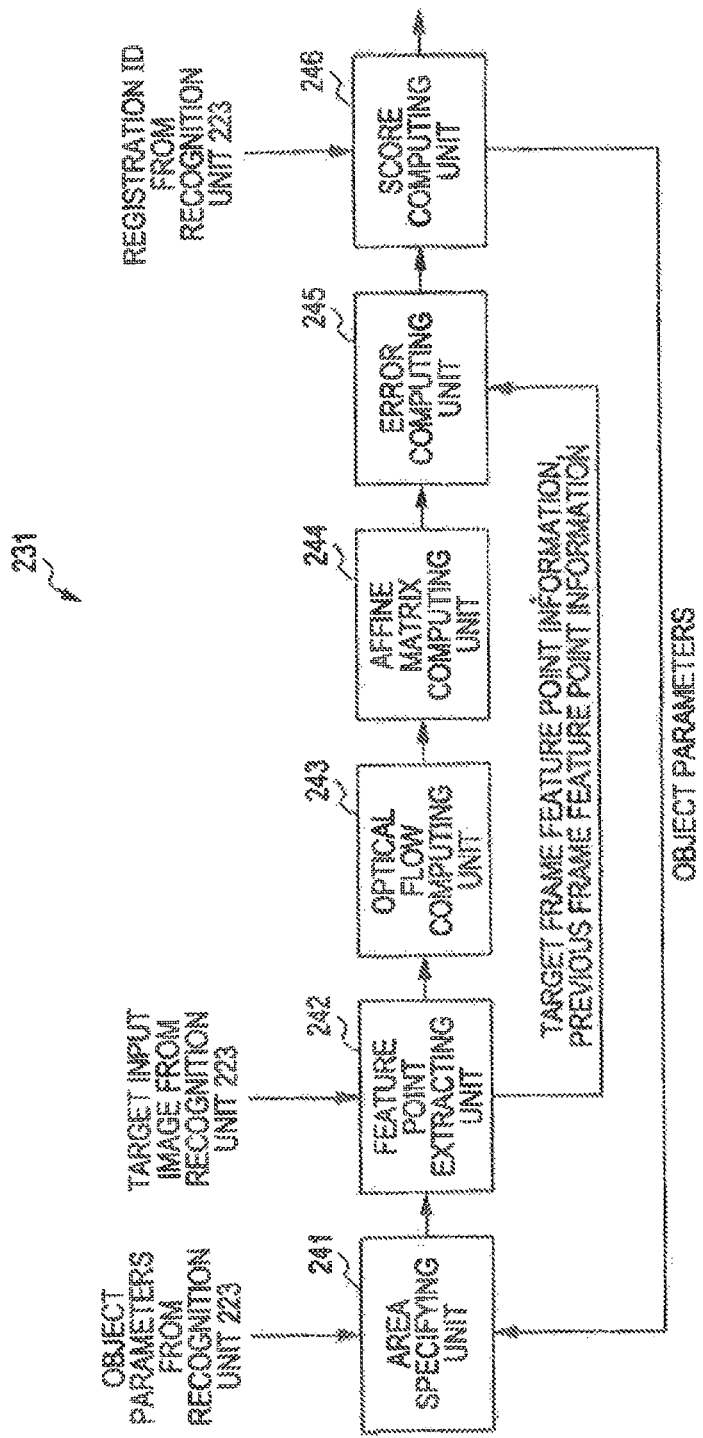
FIG. 34 is a block diagram illustrating a configuration example of the specified area tracking unit shown in FIG. 31.

In order to execute the first specified area tracking processing, the specified area tracking unit 231 shown in FIG. 31 has a configuration such as shown in FIG. 34.

The specified area tracking unit 231 shown in FIG. 34 is configured of an area specifying unit 241, feature point extracting unit 242, optical flow computing unit 243, affine matrix computing unit 244, error computing unit 245, and score computing unit 246.

The object parameters are supplied from the recognition unit 223 or score computing unit 246 to the area specifying unit 241. The area specifying unit 241 specifies a specified area based on the object parameters thereof, and supplies the specified area thereof to the feature point extracting unit 242.

The frame number is supplied from the recognition unit 223 to the feature point extracting unit 242, and the feature point extracting unit reads out, based on the frame number thereof, the input image from the image data storing unit 226 as the target input image.

The feature point extracting unit 242 extracts feature points from the target input image, for example, in the same way as with the feature point extracting unit 122 shown in FIG. 3. Based on the specified area supplied from the area specifying unit 241 the feature point extracting unit 242 eliminates feature points disposed other than the specified area, of the extracted feature points, and temporarily holds feature point information representing the positions of the feature points within the specified area. Also, the feature point extracting unit 242 supplies the feature point information (hereafter, referred to as "target frame feature point information") of the feature points within the specified area of the target input image, the feature point information (hereafter, referred to as "previous frame feature point information") of the feature points within the specified area of the input image one frame back (hereafter, referred to as "previous input image") of the target input image, and the target input image to the optical flow computing unit 243. Also, the feature point extracting unit 242 supplies the target frame feature point information and previous frame feature point information to the error computing unit 245.

The optical flow computing unit 243 computes an optical flow as the movement information of each feature point based on the target frame feature point information, previous frame feature point information, and target input image, and supplies the optical flow thereof to the affine matrix computing unit 244.

Of the optical flows of the respective feature points supplied from the optical flow computing unit 243, the affine matrix computing unit 244 computes an affine matrix for performing affine transformation from the optical flows of three feature points. The affine matrix computing unit 244 supplies the affine matrix thereof to the error computing unit 245.

The error computing unit 245 multiplies the position of feature point represented with the previous frame feature point information supplied from the feature point extracting unit 242 by the affine matrix supplied from the affine matrix computing unit 244. Subsequently, the error computing unit 245 computes the error between the position of each feature point obtained as the multiplication results, and the position of each feature point represented with the target frame feature point information supplied from the feature point extracting unit 242, and supplies the error at each feature point and affine matrix to the score computing unit 246.

Of the error supplied from the error computing unit 245, the score computing unit 246 determines whether or not there is a smaller error than a predetermined threshold T. In response to the determination result thereof, the score computing unit 246 determines the score of the affine matrix corresponding to the error thereof. Now, let us say that the score is determined such that the greater the number of feature points having a smaller error than the threshold T is, the greater the score is.

Of the affine matrixes in the target input image, the score computing unit 246 selects the affine matrix having the greatest score as the representative affine matrix of the specified area. The score computing unit 246 supplies the parameters of the representative affine matrix to the area specifying unit 241 as object parameters. Also, the registration ID is supplied from the recognition unit 223 to the score computing unit 246, and the score computing unit 246 supplies the parameters of the representative affine matrix to the specified area tracking unit 232 as object parameters along with the registration ID thereof at predetermined timing.

Next, description will be made regarding the first specified area tracking processing by the specified area tracking unit 231 with reference to the flowchart shown in FIG. 35.

In step S551, the area specifying unit 241 specifies a specified area based on the object parameters obtained as the results of the general object recognition processing by the recognition unit 223. That is to say, a specified area to be subjected to tracking is specified based on the position information (coordinate data) of the object parameters, and the specified area thereof is supplied to the feature point extracting unit 242. In step S552, of the input images stored in the image data storing unit 226, based on the frame number of the frame including the recognized target object, which is supplied from the recognition unit 223, the feature point extracting unit 242 reads out the input image of the frame number thereof as the target input image. In step S553, the feature point extracting unit 242 extracts a feature point from the target input image. This feature point can be taken as the same feature point in the above-mentioned case in step S16 shown in FIG. 4.

In step S554, the feature point extracting unit 242 eliminates feature points disposed outside the specified area supplied from the area specifying unit 241 from the feature points extracted in step S552, and temporarily holds the feature point information representing the positions of the feature points within the specified area. Also, the feature point extracting unit 242 supplies the target frame feature point information, previous frame feature point information, and target image to the optical flow computing unit 243, and supplies the target frame feature pint information and previous frame feature point information to the error computing unit 245.

In step S555, the optical flow computing unit 243 computes the optical flow of each feature point based on the target frame feature point information, previous frame feature point information, and target image supplied from the feature point extracting unit 242, for example, by the LK (Lucas Kanade) method.

This computation will be described with reference to FIG. 36. Note that in FIG. 36, description will be made regarding a case wherein the optical flow of a feature point P in the direction perpendicular to the optical axis is computed by the LK method.

With optical flow computation, the movement of a feature point of which the position is represented with the target frame feature point information, and a feature point of which the position is represented with the previous frame feature point information is analyzed, but more specifically, multiple images of which the resolution is reduced in a stepwise manner are formed from an input image, and first, comparison is performed between the images of which resolution is reduced. Thus, computation processing quantity at the time of analyzing the movement of feature points can be suppressed to the minimum.

As shown in FIGS. 36A and 36B, if we say that the number of pixels of a previous input image 251A imaged at point-in-time t−1, and a target input image 251B imaged at point-in-time t by the imaging unit 12 is 320×240 pixels, as shown in FIG. 36A, the optical flow computing unit 243 generates, based on the previous input image 251A, two types of images of an image 252A of 260×120 pixels obtained by reducing the resolution of the previous input image 251A to ¼, and an image 253A of 800×60 pixels obtained by further reducing the resolution thereof to ¼. Also, similarly, the optical flow computing unit 243 generates, based on the target input image 251B, two types of images of an image 252B of 260×120 pixels obtained by reducing the resolution of the target input image 251B to ¼, and an image 253B of 800×60 pixels obtained by further reducing the resolution thereof to ¼.

Note that the image 252A (252B) and image 253A (253B) are images included in the same screen area as that of the previous input image 251A (target input image 251B) of the original 320×240 pixels, but resolution is reduced by reducing the number of pixels. Also, the target input image 251B, image 252B, and image 253B are held at the optical flow computing unit 243, and are employed for the optical flow computation of the feature points of the next target input image. That is to say, the previous input image 251A, image 252A, and image 253A are images held at the time of the last computation.

First, the optical flow computing unit 243 compares the image 253A and image 253B which have the lowest resolution, and analyzes rough movement of the feature point P. The image 253A and image 253B have a small number of pixels, and a small search range, whereby computation processing for computing an optical flow can be performed with small load. The optical flow computing unit 243 compares the image 253A and image 258, thereby simply obtaining a vector directing from a feature point P(t−1) at point-in-time t toward a feature point P(t) at point-in-time t as the optical flow of the feature point (P).

Next, the optical flow computing unit 243 compares the image 252A and image 252B centered on the range where the optical flow of the feature point P has been detected with the image 253A and image 253B, and analyzes the movement of the feature point P in more detail. The number of pixel of the images 252A and 252B is greater than that of the images 253A and 253B, but the load on the computation processing can be reduced by narrowing down the search range through the analysis of the images 253A and 253B.

Next, the optical flow computing unit 243 compares the previous input image 251A and target input image 251B of 320×240 pixels imaged by the imaging unit 12 centered on the range where the optical flow of the feature point P has been detected with the images 252A and 252B, and analyzes the movement of the feature point P in more detail. The search range is further narrowed down by the analysis of the images 252A and 252B, whereby the optical flow of the feature point P(t) can be computed with little load and high precision using the previous input image 251A and target input image 251B which include the greatest number of pixels.

As shown in FIG. 36, according to the LK method, the processing quantity can be suppressed at the time of analyzing the movement of feature points for each frame of the time sequence, and also the movement of images of the time sequence can be analyzed in a state wherein time delay is suppressed to the minimum. Such optical flow image processing by the LK method can be performed, for example, in accordance with the technique described in the article "Pyramidal Implementation of the Lucas Kanade Feature Tracker Description of the algorithm; Jean-Yves Bouguet, Intel Corporation, Microprocessor Research Labs" listed in a website (http://robots.stanford.edu/cs223b04/algo_tracking.pdf). Thus, the LK method is applied to feature points strong against optical flow computation, and the movement of feature points is analyzed using images with resolution being varied in a stepwise manner, whereby the optical flow of a feature point can be computed for a short time with high precision.

Also, optical flow computation may be performed with another method other than the LK method, such as a known block matching method, gradient method, or the like.

The optical flow of each feature point thus computed is supplied to the affine matrix computing unit 244. Next, in step S556, the affine matrix computing unit 244 selects three feature points from each feature point corresponding to the optical flow supplied from the optical flow computing unit 243.

In step S557, the affine matrix computing unit 244 computes an affine matrix for performing affine transformation of the three feature points from the optical flows of the three feature points selected in step S556. Now, affine transformation is transformation so as to allow similarity transformation wherein scaling conversion is added to parallel displacement and rotational transform (Euclid conversion) to have shear strain, and is transformation whereby a geometric property is maintained such that points arrayed in a straight line with the original shape are also arrayed in a straight line after conversion, parallel lines are parallel lines even after conversion, and so forth.

Description will be made regarding an affine matrix for performing affine transformation. Affine transformation from the optical flow $[x\ y]^\tau$ of a feature point of the previous image to the optical flow $[u\ v]^\tau$ of a feature point of the target input image is given with the following Expression (11).

$$\begin{bmatrix} u \\ v \end{bmatrix} = \begin{bmatrix} a_1 & a_2 \\ a_3 & a_4 \end{bmatrix}\begin{bmatrix} x \\ y \end{bmatrix} + \begin{bmatrix} b_1 \\ b_2 \end{bmatrix}\begin{bmatrix} a_1 & a_2 & b_1 \\ a_3 & a_4 & b_2 \end{bmatrix}\begin{bmatrix} x \\ y \\ 1 \end{bmatrix} \quad (11)$$

In this Expression (11), $a_i$ (i=1 through 4) represents a parameter for determining shear strain, and $[b_1\ b_2]^\tau$ represents a parallel displacement parameter. The affine matrix parameters (affine transformation parameters) to be computed are the six parameters of $a_1$ through $a_4$, and $b_1$ and $b_2$, so if there are three feature point groups, an affine matrix can be determined. In other words, in order to compute an affine matrix (affine transformation parameters) for performing affine transformation, three or more feature point groups are needed. Therefore, in step S556, three feature points are selected, and in step S557 an affine matrix is computed from the optical flows of the three feature points thereof. The affine matrix computing unit 244 supplies the affine matrix obtained as the computation result to the error computing unit 245.

In step S558, the error computing unit 245 multiplies the position of each feature point represented with the previous frame feature point information supplied from the feature point extracting unit 242 by the affine matrix supplied from the affine matrix computing unit 244. In step S559, the error computing unit 245 computes the error between the position of each feature point obtained as the multiplication results, and the position of each feature point represented with the target frame feature point information supplied from the feature point extracting unit 242, and supplies the error at each feature point and affine matrix to the score computing unit 246.

In step S560, of the error at each feature point supplied from the error computing unit 245, the score computing unit 246 determines whether or not there is a smaller error than a predetermined threshold T. In a case wherein determination is made in step S560 that there is a smaller error than the threshold T, in step S561 the score computing unit 246 increments the score of the affine matrix supplied at the same time as the error by the number of feature points having a smaller error than the threshold T. Note that the value to be incremented may be a predetermined value, or may be a value according to an error.

On the other hand, in a case wherein determination is made in step S560 that there is no smaller error than the threshold T, i.e., the errors of all feature points are equal to or greater than the threshold T, the processing skips step S561. That is to say, the score computing unit 246 does not increment the score.

In step S562, the score computing unit 246 determines whether or not the affine matrix computation regarding the target input image has been repeated a predetermined number of times. In a case wherein determination is made in step S562 that the affine matrix computation has not been repeated a predetermined number of times yet, the processing returns to step S556, the affine matrix computing unit 244 newly selects three feature points, and the above-mentioned processing is repeatedly executed.

On the other hand, in a case wherein determination is made in step S562 that the affine matrix computation regarding the target input image has been repeated a predetermined number of times, in step S563 the score computing unit 246 determines whether or not of the affine matrix scores regarding the target input image, the greatest score is zero.

In a case wherein determination is made in step S563 that of the affine matrix scores regarding the target input image, the greatest score is zero, i.e., in a case wherein there is no feature point having a smaller error than the threshold T, the processing proceeds to step S564. In step S564, the score computing unit 246 determines that tracking has been failed, outputs "unable to track", and the processing ends.

Also, in a case wherein determination is made in step S563 that of the affine matrix scores regarding the target input image, the greatest score is not zero, in step S565 the score computing unit 246 selects the affine matrix having the greatest score, of the affine matrixes regarding the target input image, as the representative affine matrix of the specified area.

The representative affine matrix thus selected will be described with reference to FIGS. 37 and 38. With the example shown in FIGS. 37 and 38, when a printed article of a photo 261 which is a registered image, held in the hand by the user (e.g., Mr. A shown in FIG. 1) is rotated centered on a point 262 positioned at the wrist, an input image 260 wherein the hand holding the printed article of the photo 261 has been imaged as a subject is taken as the target image.

Figure 37:
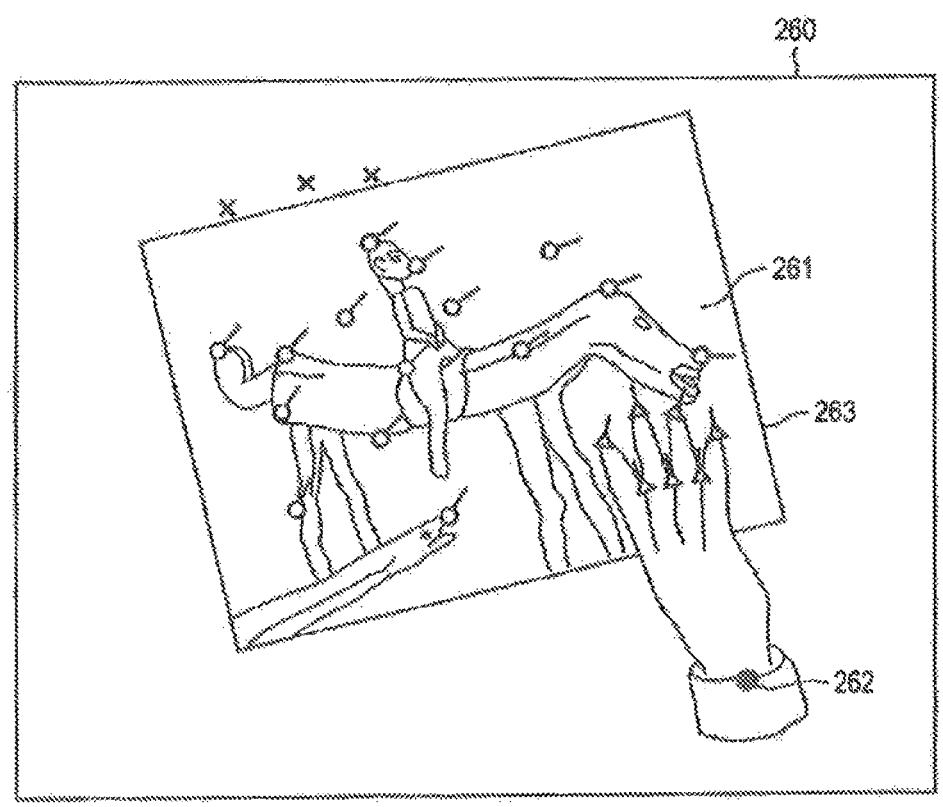
FIG. 37 is a diagram for describing a representation affine matrix.
Figure 38:
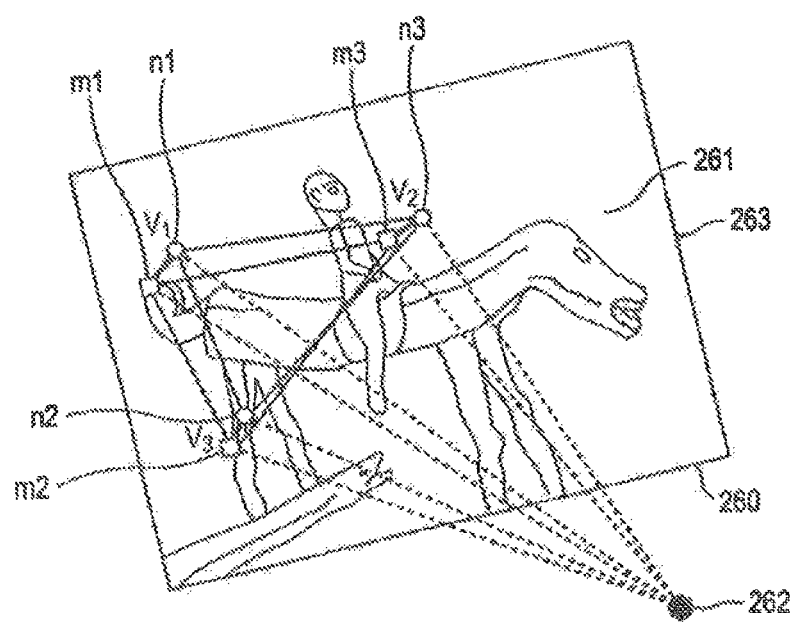
FIG. 38 is a diagram for describing a representation affine matrix.

Note that in FIG. 37, round marks, triangle marks, and x marks represent feature points to be extracted from the input image 260, and the image area of the photo 261 of the input image 260 is specified as a specified area 263.

Also, the feature points represented with the round marks in FIG. 37 are feature points positioned on the photo 261 within the specified area 263 of the input image 260, and the feature points represented with triangle marks are feature points positioned on the boundary between the photo 261 within the specified area 263 and the hand. The feature points represented with x marks are feature points positioned outside the specified area 263 of the input image 260. Accordingly, of the feature points extracted from the input image 260, the feature points represented with x marks are eliminated at the processing in step S554 by the feature point extracting unit 242.

Of the feature points represented with the round marks and triangle marks within the specified area 263, the specified area tracking unit 231 computes an affine matrix from the optical flows of the three feature points. For example, as shown in FIG. 38, in a case wherein the printed article of the photo 261 is moved in the upper right direction in the drawing centered on a point 262, and the input image 260 is shot, the respective optical flows of three feature points n1 through n3 of the input image 260 are vectors v1 through v3 from the positions of three feature points m1 through m3 of the previous image to the feature points n1 through n3, and an affine matrix is computed from the vectors v1 through v3 thereof.

In a case wherein the errors of the positions of feature points computed using the affine matrix thereof are smaller than the threshold T, the score is incremented by the number of feature points thereof, and an affine matrix having the greatest score is selected as a representative affine matrix, so the affine matrix having the least error within the specified area 263 is selected as a representative affine matrix. Accordingly, not the affine matrix corresponding to the feature points represented with the triangle marks positioned on the boundary of the hand positioned et a local portion within the specified area 263 but the affine matrix corresponding to the feature points represented with the round marks positioned on the photo 261 positioned entirely within the specified area 263 is selected as a representative affine matrix. That is to say, an affine matrix having little influence of noise-like movement can be selected as a representative affine matrix.

In step S566, the score computing unit 246 determines whether or not a predetermined number of frames worth of input images have been processed as the target input image, i.e., whether or not a predetermined number of frames worth of representative affine matrixes have been selected. The predetermined number of frames are, as described later with reference to FIG. 41, the number of frames of input images imaged after the input image employed for the general object recognition processing is imaged until the first specified area tracking processing of the specified area based on the object parameters input by the general object recognition processing thereof is ended.

In a case wherein determination is made in step S566 that a predetermined number of frames worth of input images have not been processed as the target input image, the score computing unit 246 supplies the parameters of the representative affine matrix to the area specifying unit 241 as object parameters, and in step S567 the area specifying unit 241 changes the state of the specified area to another state based on the object parameters thereof. Note that changing the state of the specified area to another state (transition of the specified area) means movement of the specified area and change in the orientation thereof. The area specifying unit 241 supplies the specified area after transition to the feature point extracting unit 242.

In step S568, the feature point extracting unit 242 reads out as the target image the input image of the next frame number of the frame number of the input image read out immediately before as the target input image. Subsequently, the processing returns to step S553, and the above-mentioned processing is repeatedly executed.

On the other hand, in a case wherein determination is made in step S566 that a predetermined number of frames worth of input images have been processed as the target input image, in step S569 the score computing unit 246 outputs the parameters of the representative affine matrix to the specified area tracking unit 232 as the object parameters as the tracking results of the specified area along with the registration ID supplied from the recognition unit 223.

As described above, the first specified area tracking processing can be performed at high speed, thereby enabling tracking in real time.

Figure 39:
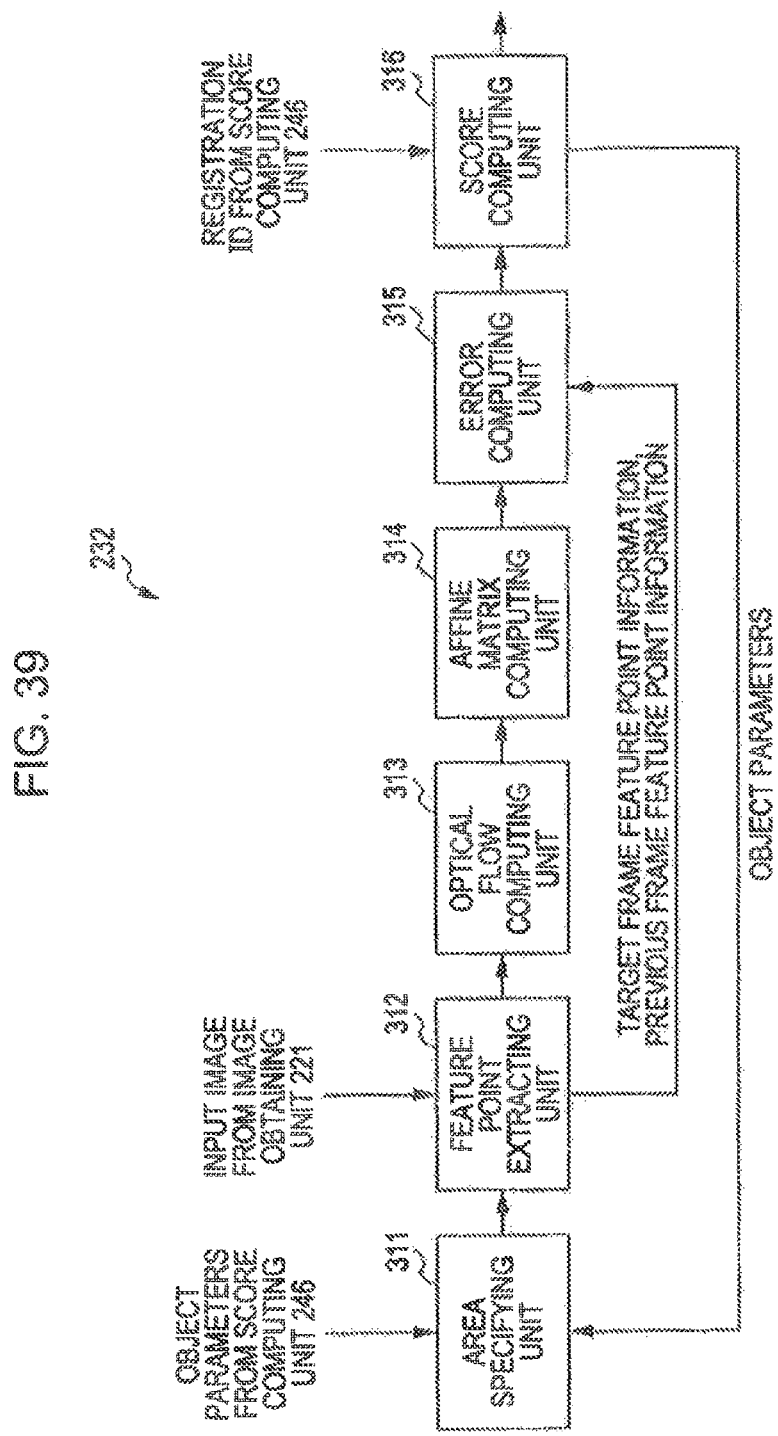
FIG. 39 is a block diagram illustrating a configuration example of the specified area tracking unit shown in FIG. 31.

Also, the specified area tracking unit 232 shown in FIG. 31 has a configuration such as shown in FIG. 39 to execute the second specified area tracking processing.

The specified area tracking unit 232 shown in FIG. 39 is configured of an area specifying unit 311, feature point extracting unit 312, optical flow computing unit 313, affine matrix computing unit 314, error computing unit 315, and score computing unit 316.

The object parameters are supplied from the score computing unit 246 of the specified area tracking unit 231 or the score computing unit 361 to the area specifying unit 311. The area specifying unit 311 specifies, similar to the area specifying unit 241 shown in FIG. 34, a specified area based on the object parameters thereof, and supplies the specified area thereof to the feature point extracting unit 312.

The input image is supplied from the imaging unit 12 to the feature point extracting unit 312. The feature point extracting unit 312 regards the supplied input image as the target input image, and extracts feature points from the target image thereof in the same way as with the feature point extracting unit 122 (FIG. 3) and feature point extracting unit 242 (FIG. 17). In the same way as with the feature point extracting unit 242, based on the specified area supplied from the area specifying unit 311 the feature point extracting unit 312 eliminates feature points positioned outside the specified area, of the extracted feature points, and temporarily holds the feature point information. Also, the feature point extracting unit 312 supplies the target frame feature point information, previous frame feature point information, and target input image to the optical flow computing unit 313. Also, the feature point extracting unit 312 supplies the target frame feature point information and previous frame feature point information to the error computing unit 315.

The functions of the optical flow computing unit 313, affine matrix computing unit 314, and error computing unit 315 are the same as those of the optical flow computing unit 243, affine matrix computing unit 244, and error computing unit 245, so description thereof will be omitted so as to avoid redundant description.

In the same way as with the score computing unit 246 shown in FIG. 34, of the error supplied from the error computing unit 315, the score computing unit 316 determines whether or not there is a smaller error than a predetermined threshold T. In the same way as with the score computing unit 246, in response to the determination result thereof, the score computing unit 316 determines the score of the affine matrix corresponding to the error thereof.

In the same way as with the score computing unit 246, of the affine matrixes in the target input image, the score computing unit 316 selects the affine matrix having the greatest score as the representative affine matrix of the specified area. The score computing unit 316 supplies the parameters of the representative affine matrix to the area specifying unit 311 as object parameters.

Also, the registration ID is supplied from the score computing unit 246 to the score computing unit 316. The score computing unit 316 supplies the registration ID thereof, the frame number of the target input image, and object parameters to the geometric conversion unit 225, and also supplies the registration ID and object parameters to the image synthesizing unit 32.

Thus, the configuration of the specified area tracking unit 232 is basically the same as the configuration of the specified area tracking unit 231.

Next, description will be made with reference to the flowchart shown in FIG. 40 regarding the details of the second specified area tracking processing by the specified area tracking unit 232 shown in FIG. 39.

In step S601, the area specifying unit 311 determines whether or not the object parameters have been input from the specified area tracking unit 231. In a case wherein determination is made in stop S601 that the object parameters have been input from the specified area tracking unit 231, in step S602 the area specifying unit 311 specifies a specified area based on the object parameters supplied from the specified area tracking unit 231, and supplies the specified area thereof to the feature point extracting unit 312.

On the other hand, in a case wherein determination is made in step S601 that the object parameters have not been input from the specified area tracking unit 231, in step S603 the area specifying unit 311 changes the state of the specified area to another state based on the object parameters supplied from the score computing unit 316 in later-described step S618, and supplies the specified area thereof to the feature point extracting unit 312.

After the processing in step S602 or S603, the processing proceeds to step S604, the feature point extracting unit 312 obtains the input image supplied from the imaging unit 12 as the target input image. The processing in steps S605 through S617 is the same as the processing in steps S553 through S565 shown in FIG. 35, so description thereof will be omitted so as to avoid redundant description.

After the representative affine matrix is selected in step S617, in step S619 the score computing unit 316 outputs the parameters of the representative affine matrix to the geometric conversion unit 225 as the object parameters as the tracking results of the specified area along with the registration ID supplied from the score computing unit 246 of the specified area tracking unit 231, and the frame number of the target input image. Also, the score computing unit 316 outputs the object parameters and registration ID to the image synthesizing unit 32, and outputs the object parameters to the area specifying unit 311.

Thus, the second specified area tracking processing of the specified area tracking unit 232 is basically the same as the first specified area tracking processing of the specified area tracking unit 231, thereby enabling high-speed processing and tracking in real time, but while with the latter, the initial value subjected to tracking is set based on the information supplied from the recognition unit 223, with the former, the initial value subjected to tracking is set based on the information supplied from the specified area tracking unit 231. Also, with the latter, images to be processed are the input images stored in the image data storing unit 226, but with the former, images to be processed are the input images supplied from the image obtaining unit 221 in real time.

Next, the processing timing of the image processing device 211 shown in FIG. 31 will be described with reference to FIG. 41.

Note that in FIG. 41, the horizontal direction represents point-in-time. Also, in FIG. 41, a square represents a frame to be processed at the point-in-time corresponding to the position in the horizontal direction, and a numeral described in or above the square represents the frame number of the frame thereof.

As shown in A in FIG. 41, with the imaging processing by the imaging unit 12, a subject is imaged, and an imaged image in increments of frame is obtained as an input image. With the example shown in FIG. 41, the frame number of the input image wherein a registered image has been imaged for the first time is "2".

Also, with the example shown in FIG. 41, as shown in B in FIG. 41, five frames worth of input images are imaged and stored from the general object recognition processing shown in FIGS. 23 through 25 being started until the end of the general object recognition processing. Accordingly, as shown in B in FIG. 41, with the general object recognition processing, at the time of start of the processing the input images to be input from the imaging unit 12 every five frames are taken as the target input images. Specifically, with the example shown in FIG. 41, the input images of which the frame numbers are "2", "7", "12", "17", and so on are sequentially taken as the target input images.

Figure 35:
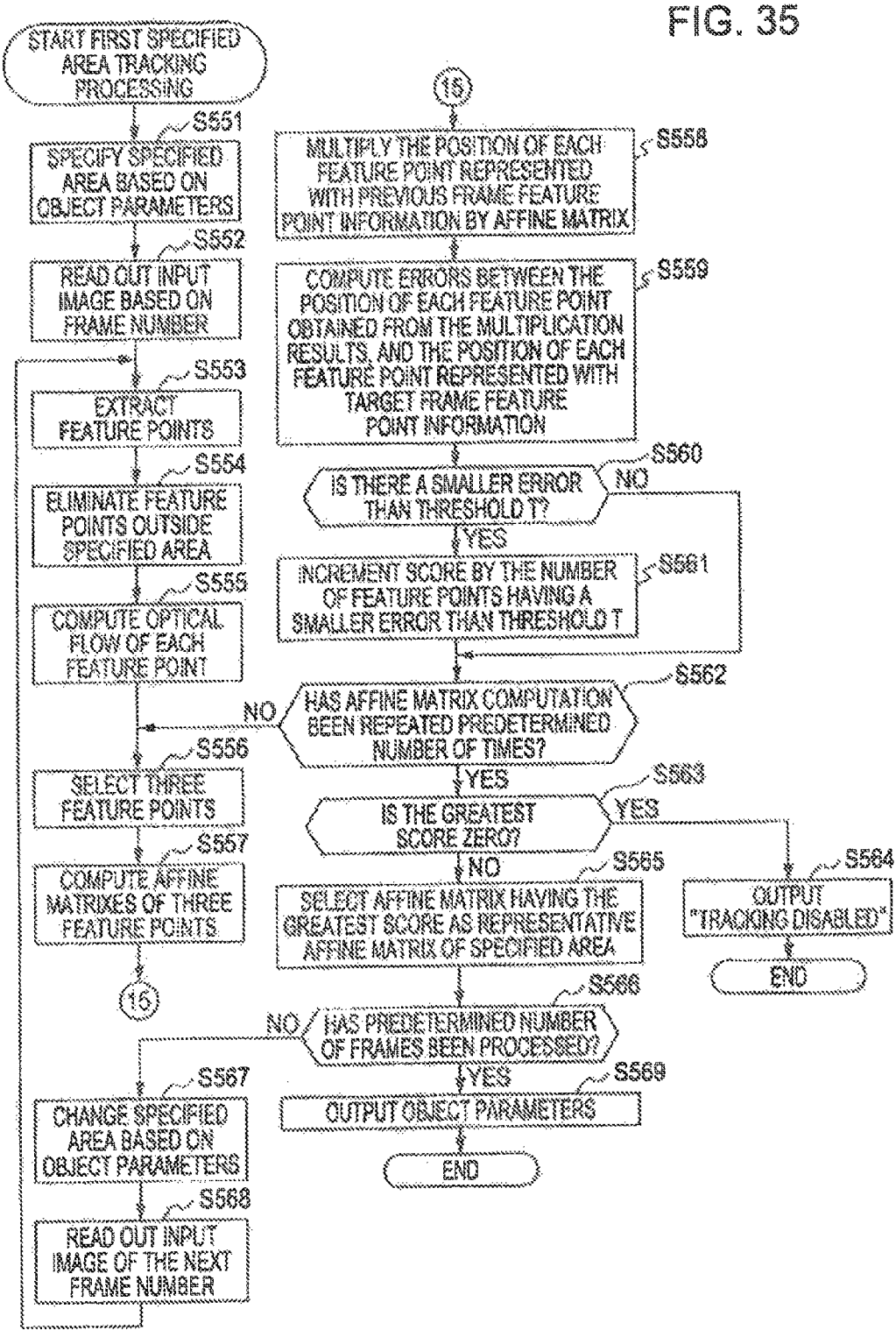
FIG. 35 is a flowchart for describing first specified area tracking processing of the specified area tracking unit shown in FIG. 31.

As shown in C in FIG. 41, the first specified area tracking processing shown in FIG. 35 is started when the object parameters are input from the recognition unit 223 by the general object recognition processing. With this first specified area tracking processing, in order from the input image employed for obtaining the object parameters input at the time of start of the processing, i.e., in order from the input image of the frame number supplied from the recognition unit 223, the input images are taken as the target input image until the input image stored last is taken as the target input image. In other words, the input images imaged are sequentially taken as the target input image from the input image of the frame number supplied from the recognition unit 223 being imaged until the end of the first specified area tracking processing.

Note that with the example shown in FIG. 41, seven frames worth of input images are imaged and stored from the input image of the frame number supplied from the recognition unit 223 being imaged until the end of the first specified area tracking processing. Consequently, with the first specified area tracking processing, seven frames worth of input images are taken as the target input images.

As described above, with the first specified area tracking processing, the specified area is subjected to tracking regarding the input images imaged from the input image being imaged at the general object recognition processing until the end of the first specified area tracking processing. Accordingly, the object parameters output at the first specified area tracking processing become the tracking results of the specified area regarding the input image imaged immediately before the second specified area tracking processing is started.

Figure 40:
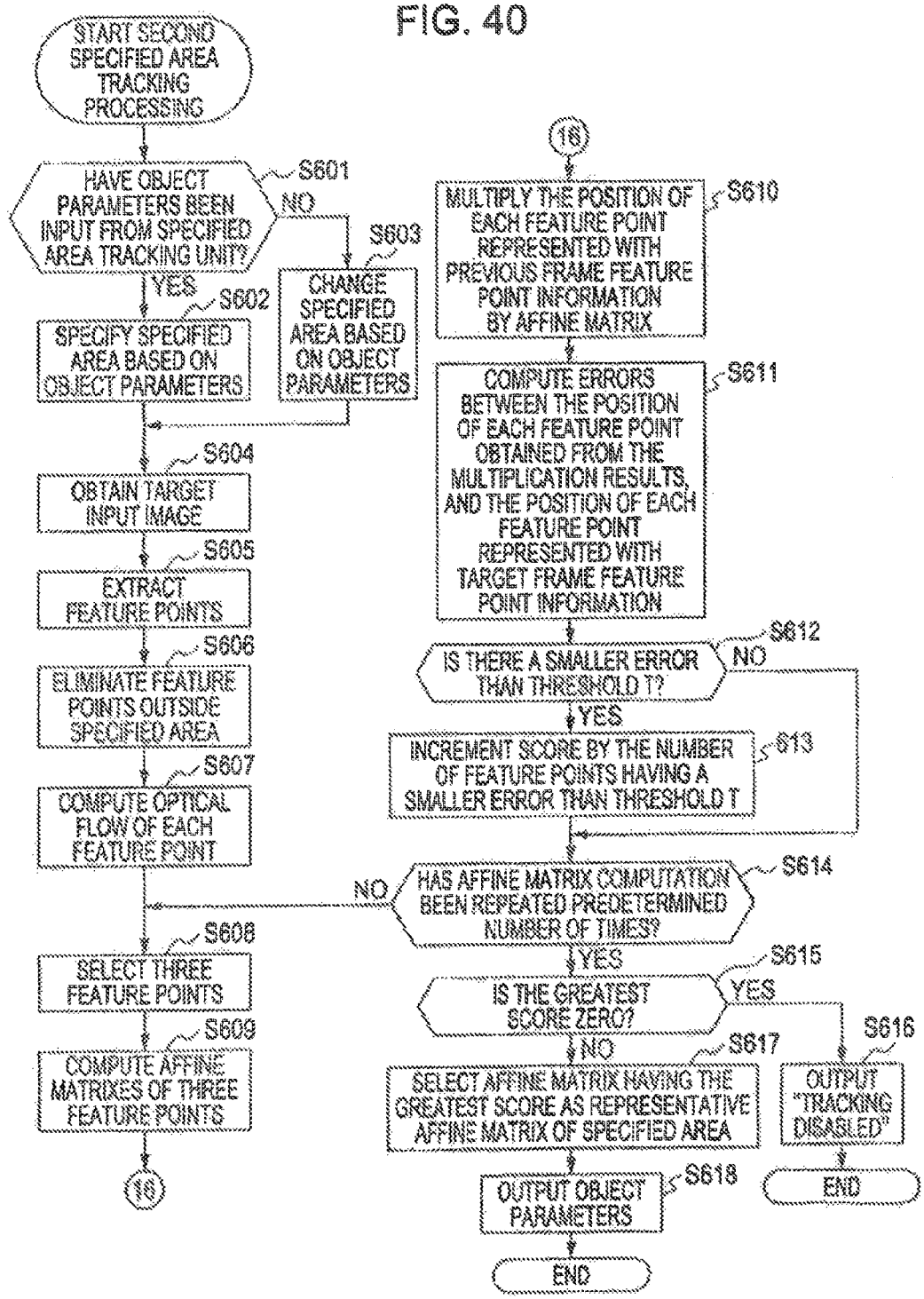
FIG. 40 is a flowchart for describing second specified area tracking processing of the specified area tracking unit shown in FIG. 31.

As shown in D in FIG. 41, the second specified area tracking processing shown in FIG. 40 is started when the object parameters are input from the specified area tracking unit 231 by the first specified area tracking processing, or when an input image is input after the object parameters are input. This second specified area tracking processing is performed by taking the input image imaged at the time of start of the processing as the target image.

As described above, the object parameters output at the first specified area tracking processing become the tracking results of the specified area regarding the input image imaged immediately before the second specified area tracking processing is started, so with the second specified area tracking processing, the specified area based on the object parameters thereof is subjected to tracking, whereby the input image imaged at the time of start of the processing can be subjected to tracking in real time. Thus, with the image processing device 211 shown in FIG. 31, while performing the general object recognition processing that is highly precise but takes long time, tracking can be performed in real time based on the results of the general object recognition processing thereof, whereby tracking can be performed with high precision in real time.

As shown in FIG. 41, in the case of this embodiment, the first specified area tracking processing based on the second through eighth frames is performed, and after the processing at the image processing device 211 proceeds to the second specified area tracking processing, the second specified area-tracking is not continued as is, but the general object recognition processing and first specified area tracking processing are executed every five frames, and in each case, the second specified area tracking processing is restarted. Thus, more precise tracking can be performed as compared to the case wherein the second specified area tracking processing is not restarted.

Note that with the above description, the image correcting unit 27 has corrected a registered luminance value, but may correct an object luminance value instead. Also, with the above description, the image comparing unit 28 has employed an object area image to create a luminance map, but an arrangement may be made wherein a registered image luminance map is registered in the registered image dictionary registering unit 24 in a correlated manner with registered images beforehand, and the image comparing unit 28 extracts a luminance approximate area within an object area image based on the luminance map thereof and object parameters.

Also, with the above-mentioned image processing device 11 (211), the image display unit 33 has been provided, and a synthetic image where an icon is disposed has been displayed on the image display unit 33, but as long as a mark for user interface is printed on the target object, there is no need to provide the image display unit 33 for feeding back the imaged image imaged by the imaging unit 12. In this case, the image processing device 11 (211) stores the position of the mark beforehand, and issues a command corresponding to the mark existing on an overlapped area.

Note that with the present Specification, the respective steps for describing a program to be stored in a program recording medium include not only processing performed in time sequence in accordance with the described sequence but also processing not necessarily performed in time sequence but performed in parallel or individually.

Note that the embodiments of the present invention are not restricted to the above-mentioned embodiment, and various modifications can be performed without departing from the essence of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
   an imaging unit configured to obtain an input image;
   a recognition unit configured to recognize a first object in the input image by using a registered image of the first object stored in the image processing device;

an image correcting unit configured to correct a luminance of the first object to be equal to a luminance of the registered image;

a detection unit configured to detect an overlapping area in the input image where another object is overlapping with the first object based on the corrected luminance of the first object and the luminance of the registered image, and generate overlapped position information representing the overlapping area;

a control unit configured to control a display of an icon at an area other than the overlapping area in the input image based on the overlapped position information; and a command issuing unit configured to issue a command corresponding to the icon, wherein the imaging unit, the recognition unit, the image correcting unit, the detection unit, the control unit, and the command issuing unit are each implemented via at least one processor.

2. The image processing device according to claim 1, wherein the detection unit detects the overlapping area based on a difference between a luminance of the first object and a luminance of the registered image.

3. The image processing device according to claim 2, wherein the detection unit is further configured to determine an area as the overlapping area when the difference between the luminance of the first object and the luminance of the registered image is greater than a predetermined value.

4. An image processing method executed using at least one processor, the method comprising:

obtaining an input image;

recognizing a first object in the input image by using a registered image of the first object;

correcting a luminance of the first object to be equal to a luminance of the registered image;

detecting an overlapping area in the input image where another object is overlapping with the first object based on the corrected luminance of the first object and the luminance of the registered image;

generating overlapped position information representing the overlapping area;

displaying an icon at an area other than the overlapping area in the input image based on the overlapped position information; and issuing a command corresponding to the icon.

5. A non-transitory computer-readable medium having embodied thereon a program, which when executed by a computer causes the computer to execute a method, the method comprising:

obtaining an input image;

recognizing a first object in the input image by using a registered image of the first object;

correcting a luminance of the first object to be equal to a luminance of the registered image;

detecting an overlapping area in the input image where another object is overlapping with the first object based on the corrected luminance of the first object and the luminance of the registered image;

generating overlapped position information representing the overlapping area;

displaying an icon at an area other than the overlapping area in the input image based on the overlapped position information; and issuing a command corresponding to the icon.

6. The image processing device according to claim 1, wherein the another object is different than the icon.

* * * * *